(12) United States Patent
Gahan et al.

(10) Patent No.: US 12,004,542 B2
(45) Date of Patent: Jun. 11, 2024

(54) USE AND METHODS OF 1,3-PROPANEDIOL TO IMPROVE TASTE AND/OR OFF-TASTE QUALITIES

(71) Applicant: Primient Covation LLC, Loudon, TN (US)

(72) Inventors: Sean L Gahan, Knoxville, TN (US); Stephen J. Hurff, Newark, DE (US); Rafael I. San Miguel, Atlanta, GA (US); James A. Zahn, Knoxville, TN (US)

(73) Assignee: Primient Covation LLC, Loudon, TN (US)

( * ) Notice: Subject to any disclaimer, the term of this patent is extended or adjusted under 35 U.S.C. 154(b) by 293 days.

(21) Appl. No.: 17/084,747

(22) Filed: Oct. 30, 2020

(65) Prior Publication Data

US 2021/0127724 A1 May 6, 2021

Related U.S. Application Data

(60) Provisional application No. 62/929,444, filed on Nov. 1, 2019.

(51) Int. Cl.
*A23L 27/20* (2016.01)
*A23L 27/00* (2016.01)

(52) U.S. Cl.
CPC .......... *A23L 27/2026* (2016.08); *A23L 27/88* (2016.08); *A23L 27/84* (2016.08)

(58) Field of Classification Search
CPC ...... A23L 27/2026; A23L 27/88; A23L 27/84; A23L 27/86; A23L 27/206
See application file for complete search history.

(56) References Cited

U.S. PATENT DOCUMENTS

| 2,434,110 A | 1/1948 | Hatch et al. |
| 5,034,134 A | 7/1991 | George et al. |
| 5,334,778 A | 8/1994 | Haas et al. |
| 5,510,036 A | 4/1996 | Woyciesjes et al. |
| 5,686,276 A | 11/1997 | Laffend et al. |

(Continued)

FOREIGN PATENT DOCUMENTS

| EP | 2926673 | 10/2015 |
| WO | 2018222818 | 12/2018 |

OTHER PUBLICATIONS

Bonnans, S., et al., "Effect of Sweetener Type and of Sweetener and Acid Levels on Temporal Perception of Sweetness, Sourness and Fruitiness", Chemical Senses. 1993, vol. 18, No. 3, pp. 273-283.

(Continued)

*Primary Examiner* — Jenna A Watts
(74) *Attorney, Agent, or Firm* — McCarter & English, LLP

(57) ABSTRACT

A method of improving taste and/or off-taste of a food, beverage, confection, or concentrate composition includes a step of providing a food, beverage, confection, or concentrate composition that includes two or more of: a sour additive; a bitter additive; and a sweetener. The method also includes a step of adding 1,3-propanediol to the food, beverage, confection, or concentrate composition to form a tasteful composition, whereby said tasteful composition has improved taste and/or off-taste as compared to a food, beverage, confection, or concentrate composition that does not include 1,3-propanediol.

2 Claims, 9 Drawing Sheets

(56) References Cited

U.S. PATENT DOCUMENTS

| | | | |
|---|---|---|---|
| 7,919,658 | B2 | 4/2011 | Adkesson et al. |
| 9,408,406 | B2 | 8/2016 | Dierbach et al. |
| 9,545,119 | B2 | 1/2017 | Backes et al. |
| 9,883,691 | B2 | 2/2018 | Dierbach et al. |
| 10,201,176 | B2 | 2/2019 | Herrera-Gomez et al. |
| 10,238,135 | B2 | 3/2019 | Dierbach et al. |
| 2005/0069997 | A1 | 3/2005 | Adkesson et al. |
| 2007/0275139 | A1 | 11/2007 | Joerger et al. |
| 2011/0293538 | A1 | 12/2011 | Ley et al. |
| 2013/0236597 | A1 | 9/2013 | Dierbach et al. |
| 2013/0236620 | A1 | 9/2013 | Herrera-Gomez et al. |
| 2014/0037823 | A1* | 2/2014 | Kehoe .................. A23L 2/385 426/590 |
| 2021/0127724 | A1 | 5/2021 | Gahan et al. |

OTHER PUBLICATIONS

Keast, Russell S.J., et al., "A Complex Relationship Among Chemical Concentration, Detection Threshold, and Suprathreshold Intensity of Bitter Compounds", Chemical Senses, Jan. 13, 2007, vol. 32, pp. 245-253.

Mouritsen, Ole G., "The Science of Taste", Mouritsen Flavour, 2015, vol. 4, No. 18, pp. 1-2.

Pangborn, Rose Marie, "Taste Interrelationships. II. Suprathreshold Solutions of Sucrose and Citric Acid", Food Fraud: A Food Safety and Authenticity Resource Kit, May 26, 1961, pp. 648-655.

Siegenthaler, Urs, et al., "Stable Carbon Cycle-Climate Relationship During the Late Pleistocene", Science, Nov. 25, 2005, vol. 310, pp. 1313-1317.

Smith, Barry, "Complexities of Flavour", Nature, Jun. 21, 2012, vol. 486, p. 1.

Tournier, Carole, et al., "Flavour Perception: Aroma, Taste and Texture Interactions", Food, Jun. 30, 2007, pp. 246-257.

Yu, Lili, et al., "1,3-Propanediol Binds Deep Inside the Channel to Inhibit Water Permeation Through Aquaporins", Protein Science, 2016, pp. 433-441.

Aging, Nutrition and Taste, Chapter 7, "Flavor Enhancement Techniques", pp. 207-247 (2019).

International Search Report based on co-pending International Application No. PCT/US2020/058101, dated Feb. 22, 2021, pp. 1-4.

Written Opinion based on co-pending International Application No. PCT/US2020/058101, dated Feb. 22, 2021, pp. 1-6.

\* cited by examiner

USE AND METHODS OF 1,3-PROPANEDIOL TO IMPROVE TASTE AND/OR OFF-TASTE QUALITIES

CROSS-REFERENCE TO RELATED APPLICATIONS

This application claims priority to U.S. Provisional Application No. 62/929,444, filed on Nov. 1, 2019, the content of which is incorporated herein by reference in its entirety.

FIELD

The present disclosure relates to the area of beverages, foods, confections, and concentrates and provides improved taste and/or off-taste quality compositions for preparations with high sweet, bitter, and sour additives at their high concentrations.

BACKGROUND

Many beverages, foods, confections, and concentrates that provide energy and/or certain claimed health benefits tend to have high concentration(s) of sweet, bitter, and/or sour additive(s). However, it is well known that any high concentration(s) of sweet, bitter, off-tastes, and/or acidic additive(s) result in off-taste, off-flavor and/or unpleasant tasting qualities.

For example, energy drinks are popular, and sales of energy drinks amount to billions of dollars annually. In 2018, top selling energy drinks in the United States were 5-HOUR ENERGY® shot (Living Essentials LLC); RED BULL® Energy Drink and Sugarfree drink (Red Bull North America, Inc.); MONSTER ENERGY®, MONSTER ENERGY ZERO ULTRA®, and NOS® drinks (Monster Beverage Corp.); and ROCKST★R® Energy Drink (Rockstar, Inc.). Energy drinks include sodas, juices, coffees, 2 to 2.5 ounce "shots" of concentrated liquid, and powders that can be mixed with water or other beverages. The advertised increase in energy, alertness, and/or physical performance primarily arises from high amounts of caffeine, which is present at about 70 to 240 mg in a 16-oz. drink and 113 to 200 mg in an energy shot. Other energy drink additives include guarana, taurine, ginseng, B vitamins, glucuronolactone, yohimbe, carnitine, flavors (e.g., bitter orange), malic acid, citric acid, and sweeteners. However, the unpleasant taste of energy drinks limits consumers' enjoyment of these products.

The unpleasant taste of energy drinks arises from the high concentrations of bitter additives (e.g., caffeine), delivering extreme bitterness; sweeteners providing extreme sweetness; sour additives providing extreme sourness; and other additives, such as B vitamins, taurine, and creatine, which are potentially unpleasant or off-tastes. Attempts to reduce or mask unpleasant taste(s) have included addition of stronger flavoring(s) and sweetener(s), for example. However, these efforts have been unsuccessful. Additionally, flavorings used to mask unpleasant and/or off-tastes are typically high value additives that add cost to the production of energy drinks. Sweeteners pose problems as well. The addition of sugar is undesirable to many consumers looking to limit their sugar and/or caloric intake. However, artificial sweeteners, especially at high concentrations, have their own distinct sweet-tasting qualities that are perceived to be off-taste, metallic, or unpleasant.

Efforts to reduce bitter tastes and bitter aftertastes with flavorless compounds include the use of hydroxyflavones, such as naringenin, eriodictyol, homoeriodictyol, eriodictyol-7-methyl ether, and eriodictyol-5-methyl-ether as described in U.S. Pat. No. 8,685,436 to Ley et al. For example, 0.05% homoeriodictyol disodium salt reduced the perceived bitterness of black tea. However, the effects of these hydroxyflavones was only studied up to 500 ppm and has not shown that they can mask the bitter flavors of foods, beverages, and confections having greater concentrations of caffeine or complex mixtures.

U.S. Pat. No. 9,545,119 to Backes et al. is directed to the use of vanillyl lignans as taste-modifiers, in particular reducing or masking unpleasant bitter, astringent, and/or metallic taste impressions. Backes et al. demonstrated that vanillyl lignans reduced the bitterness of solutions containing 500 ppm caffeine, 300 ppm theobromine, 250 ppm salicin, 5 ppm quinine hydrochloride dihydrate, or 100 ppm naringin. However, Backes et al. is silent in regard to use of vanillyl lignans to reduce the bitterness of compositions having greater than 500 ppm caffeine. Moreover, although Backes employs 1,2-propylene glycol as a carrier, Backes et al. fails to appreciate that 1,2-propylene glycol may also modify taste impressions.

U.S. Pat. Nos. 9,408,406, 9,883,691, 10,201,176, and 10,238,135 disclose food or beverages prepared with 1,3-propanediol having modified flavor profiles.

Thus, there remains a need for compositions and methods that improve taste and/or off-taste of foods, beverages, and confections, in particular energy drinks and shots.

SUMMARY

In certain aspects, the disclosure relates to a method of improved taste and/or off-taste of a food, beverage, confection, or concentrate composition includes steps of: A. providing a food, beverage, confection, or concentrate composition comprising two or more of: about 3,000 ppm to about 15,000 ppm of a sour additive; about 250 ppm to about 4,000 ppm of a bitter additive; and about 600 ppm to about 3,000 ppm of a sweetener; and B. adding an amount of 1,3-propanediol, in some embodiments biologically-produced 1,3-propanediol, from about 10 ppm to about 2,500 ppm to the food, beverage, confection, or concentrate composition to form a tasteful composition, whereby said tasteful composition has improved taste and/or off-taste as compared to a food, beverage, confection, or concentrate composition that does not include said amount of 1,3-propanediol, in some embodiments biologically-produced 1,3-propanediol.

In one embodiment, the biologically-produced 1,3-propanediol has an ultraviolet absorption at 220 nm of less than about 0.200 and at 250 nm of less than about 0.075 and at 275 nm of less than about 0.075.

In a further embodiment, the biologically-produced 1,3-propanediol has a "b" color value of less than about 0.15 and an absorbance at 275 nm of less than about 0.050.

In one embodiment, the biologically-produced 1,3-propanediol has a peroxide concentration of less than about 10 ppm.

In another embodiment, the biologically-produced 1,3-propanediol has a concentration of total organic impurities of less than about 400 ppm, less than about 300 ppm, or less than about 150 ppm.

In a further embodiment, the one or more sour additive(s) is malic acid, citric acid, or a combination thereof.

In one embodiment, the one or more sweetener(s) is sucralose, sucrose, glucose, sugar, acesulfame potassium, aspartame, erythritol, high fructose corn syrup, or a combination thereof.

In one embodiment, the one or more bitter additive(s) is caffeine, caffeine-containing ingredients, or a combination thereof.

In another embodiment, the food, beverage, confection, or concentrate composition further includes a vitamin selected from the group consisting of Vitamin A, Vitamin C, Vitamin D, Vitamin E, Vitamin K, Vitamin B1, Vitamin B2, Vitamin B3, Vitamin B5, Vitamin B7, Vitamin B6, Vitamin B9, Vitamin B12, and a combination thereof. In some embodiments, the food, beverage, confection, or concentrate composition can include "vitamin-like" additives, such as choline and carnitine.

In further embodiments, the food, beverage, confection, or concentrate composition includes about 60 ppm to about 2,500 ppm 1,3-propanediol, about 7,500 ppm to about 12,500 ppm malic acid, about 2,000 ppm to about 4,000 ppm caffeine, and about 600 ppm to about 3,000 ppm sucralose. In yet further embodiments, the food, beverage, confection, or concentrate composition includes about 100 ppm to about 2,500 ppm 1,3-propanediol, about 3,000 ppm to about 7,000 ppm citric acid, about 500 ppm to about 1,000 ppm caffeine, and about 600 ppm to about 3,000 ppm sucralose.

In certain aspects, the disclosure relates to a food, beverage, confection, or concentrate composition includes about 10 ppm to about 5,000 ppm of 1,3-propanediol, in some embodiments biologically-produced 1,3-propanediol; and two or more of: about 5,000 ppm to about 15,000 ppm of a sour additive; about 250 ppm to about 4,000 ppm of a bitter additive; and about 600 ppm to about 3,000 ppm of a sweetener.

In some embodiments of the food, beverage, confection, or concentrate composition, the biologically-produced 1,3-propanediol has an ultraviolet absorption at 220 nm of less than about 0.200 and at 250 nm of less than about 0.075 and at 275 nm of less than about 0.075.

In other embodiments of the food, beverage, confection, or concentrate composition, the biologically-produced 1,3-propanediol has a "b" color value of less than about 0.15 and an absorbance at 275 nm of less than about 0.050.

In further embodiments of the food, beverage, confection, or concentrate composition, the biologically-produced 1,3-propanediol has a peroxide concentration of less than about 10 ppm.

In one embodiment of the food, beverage, confection, or concentrate composition, the biologically-produced 1,3-propanediol has a concentration of total organic impurities of less than about 400 ppm, less than about 300 ppm, or less than about 150 ppm.

In another embodiment of the food, beverage, confection, or concentrate composition, the sour additive is malic acid, citric acid, or a combination thereof.

In one embodiment, the bitter additive is caffeine, caffeine-containing ingredients or a combination thereof.

In a further embodiment of the food, beverage, confection, or concentrate composition, the sweetener is sucralose, sucrose, glucose, sugar, acesulfame potassium, aspartame, erythritol, high fructose corn syrup, or a combination thereof.

In another embodiment, the food, beverage, confection, or concentrate composition further includes a vitamin selected from the group consisting of Vitamin A, Vitamin C, Vitamin D, Vitamin E, Vitamin K, Vitamin B1, Vitamin B2, Vitamin B3, Vitamin B5, Vitamin B7, Vitamin B6, Vitamin B9, Vitamin B12, and a combination thereof. In some embodiments, the food, beverage, confection, or concentrate composition can include "vitamin-like" additives, such as choline and carnitine.

In further embodiments, the food, beverage, confection, or concentrate composition includes about 100 ppm to about 2,500 ppm 1,3-propanediol, about 7,500 ppm to about 12,500 ppm malic acid, about 2,000 ppm to about 4,000 ppm caffeine, and about 600 ppm to about 3,000 ppm sucralose.

In yet further embodiments, the food, beverage, confection, or concentrate composition comprises about 100 ppm to about 2,500 ppm 1,3-propanediol, about 3,000 ppm to about 7,000 ppm citric acid, about 500 ppm to about 1,000 ppm caffeine, and about 600 ppm to about 3,000 ppm sucralose.

In certain aspects, the disclosure relates to use of a 1,3-propanediol, in some embodiments biologically-produced 1,3-propanediol, to improve taste and/or off-taste of a food, beverage, confection, or concentrate composition comprising two or more of about 5,000 ppm to about 15,000 ppm of a sour additive, about 250 ppm to about 4,000 ppm of a bitter additive, and about 600 ppm to about 3,000 ppm of a sweetener, wherein the 1,3-propanediol, in some embodiments biologically-produced 1,3-propanediol, is present in the composition at about 10 ppm to about 2,500 ppm.

In one embodiment of such uses, the biologically-produced 1,3-propanediol has an ultraviolet absorption at 220 nm of less than about 0.200 and at 250 nm of less than about 0.075 and at 275 nm of less than about 0.075. In another embodiment, the biologically-produced 1,3-propanediol has a "b" color value of less than about 0.15 and an absorbance at 275 nm of less than about 0.050. In a further embodiment, the biologically-produced 1,3-propanediol has a peroxide concentration of less than about 10 ppm.

In another embodiment of uses according to the disclosure, the biologically-produced 1,3-propanediol has a concentration of total organic impurities of less than about 400 ppm, the biologically-produced 1,3-propanediol has a concentration of total organic impurities of less than about 300 ppm.

In a further embodiment of the use, the biologically-produced 1,3-propanediol has a concentration of total organic impurities of less than about 150 ppm.

In a further embodiment of the use, the 1,3-propanediol can be either biologically or chemically sourced.

In one embodiment, the sour additive is malic acid, citric acid, or a combination thereof.

In one embodiment, the sweetener is sucralose, sucrose, glucose, sugar, acesulfame potassium, aspartame, erythritol, high fructose corn syrup, or a combination thereof.

In one embodiment, the bitter additive is caffeine, caffeine-containing ingredients, or a combination thereof.

In one embodiment, the composition further comprises a vitamin selected from the group consisting of Vitamin A, Vitamin C, Vitamin D, Vitamin E, Vitamin K, Vitamin B1, Vitamin B2, Vitamin B3, Vitamin B5, Vitamin B7, Vitamin B6, Vitamin B9, Vitamin B12, and a combination thereof. In some embodiments, the composition further comprises "vitamin-like" additives, such as choline, carnitine, myo-inositol, para-aminobenzoic acid, and lipoic acid.

In one embodiment, the composition includes about 10 ppm to about 2,500 ppm 1,3-propanediol, about 7,500 ppm to about 12,500 ppm malic acid, about 2,000 ppm to about 4,000 ppm caffeine, and about 600 ppm to about 3,000 ppm sucralose.

In one embodiment, the composition includes about 10 ppm to about 2,500 ppm 1,3-propanediol, about 3,000 ppm to about 7,000 ppm citric acid, about 500 ppm to about 1,000 ppm caffeine, and about 600 ppm to about 3,000 ppm sucralose.

In certain aspects, the disclosure relates to a method of modulating a taste impression in a food, beverage, confection, or concentrate composition comprises including from about 10 ppm to about 10,000 ppm 1,3-propanediol, in some embodiments biologically-produced 1,3-propanediol, in the food, beverage, confection, or concentrate composition. In certain aspects, the food, beverage, confection, or concentrate comprises about 75 ppm to about 1,000 ppm 1,3-propanediol.

In certain aspects, the disclosure relates to a method of improving mouthfeel of a food, beverage, confection, or concentrate composition comprising a large amount of bitter additive, the method comprising including from about 10 ppm to about 10,000 ppm 1,3-propanediol, in some embodiments biologically-produced 1,3-propanediol, in the composition and reducing the large amount of bitter additive in the composition. In some embodiments, the composition comprises about 250 ppm to about 4,000 ppm the bitter additive. In some embodiments, the amount of bitter additive in the composition is reduced at least 5%, at least 10%, at least 20%, at least 30%, at least 40%, at least 50%, at least 60%, at least 70%, at least 80%, at least 90%, or at least 95%.

In some embodiments, the composition comprises about 60 ppm to about 2,500 ppm 1,3-propanediol; about 75 ppm to about 1,250 ppm 1,3-propanediol; or about 900 ppm to about 1,100 ppm 1,3-propanediol. In some embodiments, the improved mouthfeel is a reduction in harsh mouthfeel. In some embodiments, the improved mouthfeel is a reduction in astringent mouthfeel. In some embodiments, the improved mouthfeel is a reduction in drying after feel. In some embodiments, the composition comprises a sour additive and/or a sweetener. In some embodiments, the bitter additive is caffeine and/or caffeine-containing ingredients.

Another aspect is for a method of improving the taste of a food, beverage, confection, or concentrate composition comprising from about 10 ppm to about 2,500 ppm of 1,3-propanediol, in some embodiments biologically-produced 1,3-propanediol, the method comprising providing an improved food, beverage confection, or concentrate composition comprising from about 10 ppm to about 2,500 ppm of 1,3-propanediol, in some embodiments biologically-produced 1,3-propanediol, a large amount of sour additive and a large amount of sweetener as compared to a control food, beverage, confection, or concentrate composition comprising from about 10 ppm to about 2,500 ppm of 1,3-propanediol, in some embodiments biologically-produced 1,3-propanediol, a large amount of sour additive, and a large amount of sweetener, wherein the large amount of sour additive and/or the large amount of sweetener in the improved food, beverage confection, or concentrate composition is less than the amount of sour additive and/or the large amount of sweetener in the control food, beverage, confection, or concentrate composition. In some embodiments, the sour additive in the improved food, beverage, confection, or concentrate composition is present in amount at least 5%, 10%, 15%, 20%, 25%, 30%, 35%, 40%, 45%, or 50% less than the amount of sour additive in the control food, beverage, confection, or concentrate composition. In some embodiments, the sweetener in the improved food, beverage, confection, or concentrate composition is present in amount at least 5%, 10%, 15%, 20%, 25%, 30%, 35%, 40%, 45%, or 50% less than the amount of sour additive in the control food, beverage, confection, or concentrate composition. In some embodiments, the large amount of sour additive in the improved food, beverage, confection, or concentrate composition is in a range of from about 3,000 ppm to about 15,000 ppm. In some embodiments, the large amount of sweetener in the improved food, beverage, confection, or concentrate composition is in a range of from about 600 ppm to about 3,000 ppm. In some embodiments, the sour additive is maleic acid. In some embodiments, the sweetener is sucralose. In some embodiments, the improved food, beverage, confection, or concentrate composition and the control food, beverage, confection, or concentrate composition comprise substantially the same large amount of a bitter additive; in some embodiments the bitter additive is caffeine; and in some embodiments, the bitter additive is present in a range of from about 250 ppm to about 4,000 ppm.

DETAILED DESCRIPTION

Figure 1:
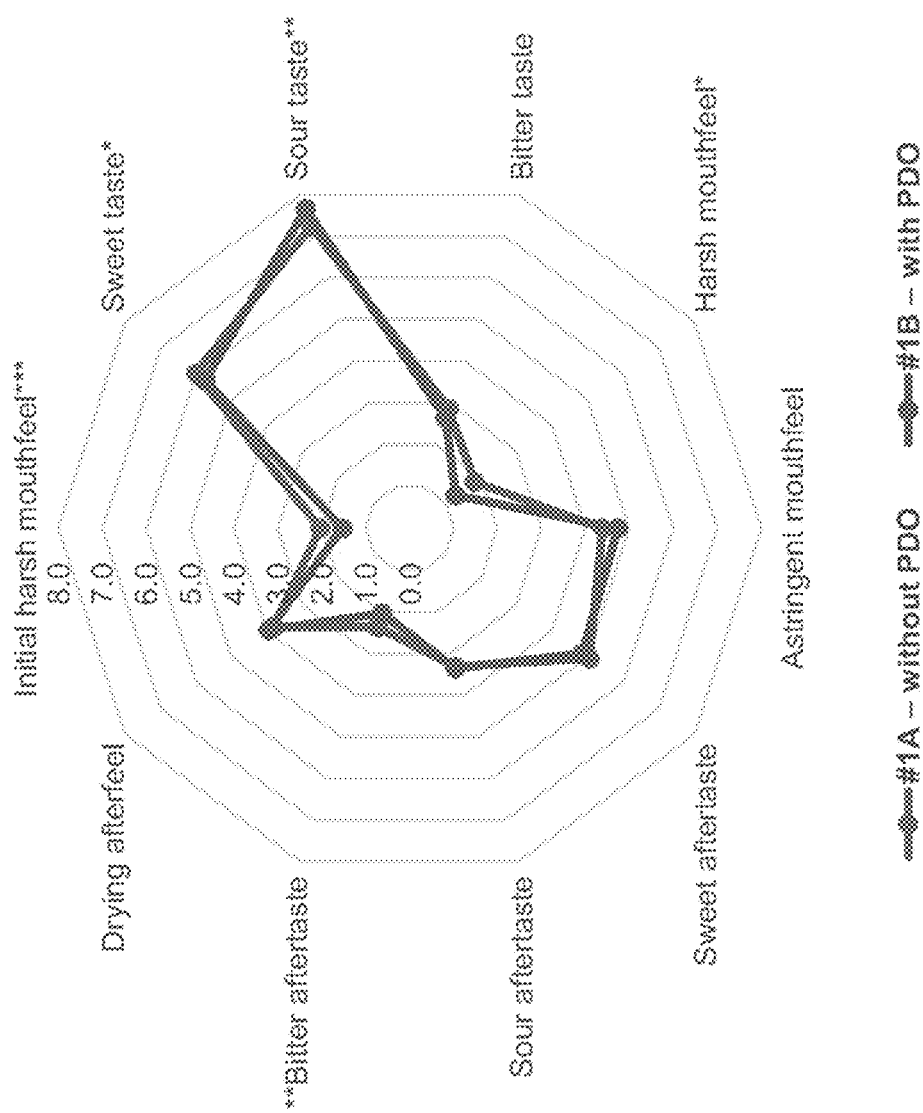
FIG. 1 shows a graphical illustration of the average sensory scores for all attributes measured in Example 2 (n=24). *Significantly different at p≤0.1 (90% confidence). Significantly different at p≤0.05 (95% confidence. *Significantly different at p≤0.01 (99% confidence).

[55] The inventors have discovered that 1,3-propanediol, in some embodiments biologically-produced 1,3-propanediol, may improve taste qualities and/or off-tastes in foods, beverages, and confections.

As used herein, the term "taste" on one hand and "flavor" on the other are not interchangeably under the professional gustation chemistry, biology, neuroscience, and medical perspectives. "Taste" is a perception that results from stimulation of a gustatory nerve via a taste sense or receptor of each salt, sour, bitter, sweet, umami, and fat, which is known as the chemical sensing system. The term "flavor" is based on the complex and varied dimension of aroma from any aromatic or volatile compounds mainly through the sense of smell. See, e.g., Mourtisen, *Flavour* (2015) 4:18 and Smith, *Nature* (2012) 486:S6. Taste can affect the aromatic/volatile flavor perception via cognition and/or physico-chemical mechanisms (an explanation can be found, by ways of example, in Tournier et al., *Food* 2007 1(2) 246:257).

"Taste modulator" or "taste modulating", as used herein, refers to a taste compound that positively impacts the perception of another taste additive(s) and/or an off-taste additive(s) in food, beverage, confection, or concentrate. For example, certain negative taste properties of off-taste additive(s) can be masked with taste modulators, e.g., bitterness, sourness, umami, sweetness, saltiness, licorice, fat, burning, hot, cool and metallic notes. In another example, mouthfeel can be improved. In still other examples, off-taste linger can be decreased. In yet another examples, off-taste onset can be decreased. In a further example, taste onset can be improved.

"Sweetener", as used herein, refers to a substance that provides detectable sweetness when present in a food, beverage, confection, or concentrate. Accordingly, "sweetening amount", as used herein, refers to the amount of compound required to provide detectable sweetness when present in a food, beverage, confection, or concentrate. A sweetener can be natural, synthetic, or a combination thereof. A sweetener can be a salt of a compound, an acid of a compound, or have no salt and/or acid presence.

A "concentrate", as used herein, means a liquid or powdered composition that can be diluted with an aqueous, potable liquid or a dry bulk powder to prepare a finished product. It also refers to a beverage or food precursor or "syrup" or "beverage syrup" to which a fluid, typically water or other diluting agent, is removed. It is then re-added to form a ready-to-drink high concentration beverage, or a "beverage", or an "energy shot", and ready-to-eat high concentration food, or a "food", or a "condiment". Typically, it can be up to about 2, about 3, about 4, about 5, about 6, about 7, about 8, about 9, or about 10 fold or more or about 2, about 3, about 4, about 5, about 6, about 7, about 8, about 9, or about 10 times or more larger quantity of a substance(s) present in a unit amount of mixture, meaning a significant amount of solute dissolved in a given solvent or solution. An exemplary concentrate is "frozen concentrate" orange juice. Its undiluted concentrate has much stronger flavor and sourness, and is sweeter than the normal, diluted juice.

"High concentration" and "large amount", as used herein, refers to a large amount of a substance that provides high or strong detectable taste sense(s) when present in a food, beverage, confection, or concentrate. Non-limiting examples of high concentration include any above normal taste threshold concentration(s) used for strong food, beverages, and confections such as energy drinks, protein drinks, energy shots, protein shots and the like in super-concentrated additive products. A normal or acceptable taste quality can be found at between low and medium taste threshold, while a taste quality intensity range found at between medium and moderate and strong and extreme and offensive off-taste threshold is considered as high concentration. Each taste additive can have different taste thresholds and over-time intensity levels. For example, typical lemon-lime sodas contain about 1,700 ppm citric acid, which produced a normal sourness taste in the presence of normal sweet concentration(s) of sweet additive(s) or at about 10% sweetness equivalence or less, or even in plain water. Any extra amounts of citric acid will result lowering the soda's pH and increasing sourness intensities from low or normal or mild or medium to moderate or strong or extreme or offensive off-tastes. Another example is the strong bitter grapefruit juice that actually contains about 300 ppm naringin (a bitter additive). A further example is the sucrose equivalence comparison of extreme strong sweetness or 800 ppm sucralose (at its lower claim range) versus 10% sucrose-equivalence of about 225 ppm sucralose in water.

"Off-taste", as used herein, refers to unpleasant and/or unacceptable tasting quality/perception. Non-limiting examples of off-taste include soapy taste, chemical taste, medical taste, bitter taste, strong sour taste, strong salt taste, strong mouthfeel, harsh mouthfeel, strong sweet taste, sticky taste, coating taste, astringent taste, dry taste, dry after feel, strong savory taste, strong fat taste, metallic, cooling sensation or numb feeling of the tongue or oral cavity that subsides under significant water or food exposure, and/or the like in time. The off-taste can also be one that diminishes in intensity with time or temperature, when the other tastes present in a food, beverage, confection, or concentrate do not. The off-taste can, in some cases, be one that produces delayed taste onset, fast taste onset, unbalance taste quality, different maximum taste intensity response(s) over time, taste adaptation issue, lingering taste aftertaste(s), carryover taste(s), recurring taste(s), and the like in taste quality. There are six basic tastes: bitter, sweet, sour, salt, fat, and umami. Bitterness is most commonly associated with off-taste.

As used herein, the term "about" or "approximately" means within 20%, 19%, 18%, 17%, 16%, 15%, 14%, 13%, 12%, 11%, 10%, 9%, 8%, 7%, 6%, 5%, 4%, 3%, 2%, 1%, 0.9%, 0.8%, 0.7%, 0.6%, 0.5%, 0.4%, 0.3%, 0.2%, or 0.1%, or less or more of a given value or range.

The term "comprising" is intended to include embodiments encompassed by the terms "consisting essentially of" and "consisting of". Similarly, the term "consisting essentially of" is intended to include embodiments encompassed by the term "consisting of".

Because the food, beverage, confection, or concentrate composition provided according to the methods of the disclosure are not limited, it should be appreciated that the step of adding 1,3-propanediol, in some embodiments biologically-produced 1,3-propanediol, to the food, beverage, confection, or concentrate composition may be accomplished by any suitable method for each specific food, beverage, confection, or concentrate composition. For example, 1,3-propanediol, in some embodiments biologically-produced 1,3-propanediol, may be added directly to beverages and mixed, e.g., by stirring. In one embodiment, 1,3-propanediol, in some embodiments biologically-produced 1,3-propanediol, may be added as an aqueous solution or in a mixture with another additive, e.g., high fructose corn syrup, simple syrup, agave nectar, or aqueous solutions of sweeteners such as sucralose, sucrose, glucose, sugar, acesulfame potassium, aspartame, erythritol, high fructose corn syrup, or a combination thereof. These methods of addition would be suitable to prepare beverages, such as fruit juices, juice punches, concentrates, dilutions, "ades", and sodas, for example.

For the first time, the inventors have shown that 1,3-propanediol, in some embodiments biologically-produced 1,3-propanediol, improves the taste and/or off-taste of commercial energy drinks. Surprisingly, including 1,3-propanediol, in some embodiments biologically-produced 1,3-propanediol, in aqueous solutions containing two or more of about 250 ppm to about 4,000 ppm of a bitter additive, about 3,000 ppm to about 15,000 ppm of a sour additive, and about 600 ppm to about 3,000 ppm of a sweetener improved taste and/or off-taste of those solutions.

Further aspects of the compositions and methods disclosed herein are provided in the following description.

In addition to improving taste and/or off-taste, 1,3-propanediol, in some embodiments biologically-produced 1,3-propanediol, may modulate a taste impression of a food, beverage, confection, or concentrate composition. As used herein, the term "modulating a taste impression" means changing at least one aspect of a sensory description obtained using the methods described in the examples as compared to a composition that does not include any 1,3-propanediol. In another aspect, 1,3-propanediol, in some embodiments biologically-produced 1,3-propanediol, may mask or reduce one or more tastes reported in a sensory description as compared to the sensory description of a food, beverage, confection, or concentrate composition that does not include any 1,3-propanediol.

In one embodiment, 1,3-propanediol, in some embodiments biologically-produced 1,3-propanediol, may be added to juices. For example, 1,3-propanediol, in some embodiments biologically-produced 1,3-propanediol, has been found to decrease the bitterness and increase the sweetness of grapefruit juice. For example, orange juice that contained biologically-produced 1,3-propanediol was less bitter and somewhat sweeter than without biologically-produced 1,3-propanediol. In another non-limiting example, including 1,3-propanediol in cranberry juice reduced both the bitterness and the sweetness of the cranberry juice. Other suitable beverage compositions include coffee, cocoa, tea (e.g., black tea, green tea, oolong tea etc.), or kombucha.

In one embodiment, 1,3-propanediol, in some embodiments biologically-produced 1,3-propanediol, may be added to milk, which optionally is further mixed with coffee, espresso, or tea. In another embodiment, the milk containing 1,3-propanediol, in some embodiments biologically-produced 1,3-propanediol, is used to make cheese, yogurt, kefir, butter, puddings, custards, ice cream, or other dairy products. In the case of yogurts, 1,3-propanediol, in some embodiments biologically-produced 1,3-propanediol, may be mixed with the yogurt after it is cultured rather than mixing it with the milk before the culturing step.

In one embodiment, 1,3-propanediol, in some embodiments biologically-produced 1,3-propanediol, is added to fruit by soaking fruit in an aqueous liquid or syrup that contains 1,3-propanediol, in some embodiments biologically-produced 1,3-propanediol. Fruits may be whole (e.g., berries), pitted (e.g., cherries, peaches, nectarines, plums), peeled (e.g., citrus fruits), and/or sliced. In one embodiment, 1,3-propanediol, in some embodiments biologically-produced 1,3-propanediol, is added to a brine used to pickle a fruit, vegetable, or meats. In one embodiments, fruits or vegetables are cleaned, and 1,3-propanediol, in some embodiments biologically-produced 1,3-propanediol, is added to the fruits or vegetables by spraying a water or ethanol-based solution containing 1,3-propanediol, in some embodiments biologically-produced 1,3-propanediol, on the fruits, vegetables, or mixtures thereof (e.g., fruit or vegetable salads). In one embodiment, 1,3-propanediol, in some embodiments biologically-produced 1,3-propanediol, is added to jams or jellies, e.g., orange marmalade, before or after cooking.

In one embodiment, 1,3-propanediol, in some embodiments biologically-produced 1,3-propanediol, may be added into a batter or dough before baking to make bakery products. In one embodiment, 1,3-propanediol, in some embodiments biologically-produced 1,3-propanediol, may be added to the meal used to make chips or crackers.

In one embodiment, adding 1,3-propanediol, in some embodiments biologically-produced 1,3-propanediol, to a food, beverage, confection, or concentrate produces a tasteful composition. As used herein, the term "tasteful composition" means a food, beverage, confection, or concentrate composition that includes suprathreshold concentrations of at least one bitter, sour, fat, salt, umami, or sweet chemical component. It should be appreciated that both suprathreshold and detection threshold concentrations for chemicals vary widely from individual to individual. S. J. K. Russell & J. Roper, *A Complex Relationship among Chemical Concentration, Detection Threshold, and Supra-threshold Intensity of Bitter Compounds*, 32(3) CHEMICAL SENSES 245-253 (Mar. 1, 2007). Suitable methods for obtaining sensory descriptions are provided in the Examples.

In one embodiment, 1,3-propanediol, in some embodiments biologically-produced 1,3-propanediol, may be added to dessert or savory sauces to make tasteful compositions. For example, dessert sauces such as chocolate, caramel, butterscotch, strawberry, cherry, pineapple, or other fruit flavors may include 1,3-propanediol, in some embodiments biologically-produced 1,3-propanediol. It is expected that addition of 1,3-propanediol would reduce the amount of sugar and/or sweetener required to balance the bitterness of chocolate and the sourness of the fruits. Additionally, where such syrups are made with sweeteners, such as sucralose, acesulfame potassium, aspartame, or erythritol, 1,3-propanediol, in some embodiments biologically-produced 1,3-propanediol, is expected to reduce the commonly perceived metallic or off-flavors of those sweeteners. Savory sauces suitable for mixing with 1,3-propanediol, in some embodiments biologically-produced 1,3-propanediol, include barbecue sauce, teriyaki sauce, oyster sauce, spice sauce, and other sauces that have high concentrations of sweet, salty, umami, and/or sour additives.

In one embodiment, 1,3-propanediol, in some embodiments biologically-produced 1,3-propanediol, is added to confections, such as chocolate, chewing gum, sour soft candies, and sour hard candies. Without wishing to be bound by a particular hypothesis, the inventors postulate that adding 1,3-propanediol, in some embodiments biologically-produced 1,3-propanediol, to chocolate would neutralize or mask the bitterness of the theobromine and other chocolate alkaloids, reducing the amount of sugar or other sweetener required to balance the tastes of chocolates. Because chewing gums include sweeteners such as sucralose, acesulfame potassium, aspartame, or erythritol, which as noted above are commonly found to have metallic or off-tastes, adding 1,3-propanediol, in some embodiments biologically-produced 1,3-propanediol, to chewing gum is expected to mask or reduce the perception of the off-tastes attributable to these sweeteners.

In some embodiments, the food, beverage, confection, or concentrate product comprises 1,3-propanediol, in some embodiments biologically-produced 1,3-propanediol, and a sweetener and a sour additive. In some embodiments, the food, beverage, confection, or concentrate product comprises 1,3-propanediol, in some embodiments biologically-produced 1,3-propanediol, and a sweetener and a bitter additive. In some embodiments, the food, beverage, confection, or concentrate product comprises 1,3-propanediol, in some embodiments biologically-produced 1,3-propanediol, and a sour additive and a bitter additive. In some embodiments, the food, beverage, confection, or concentrate product comprises 1,3-propanediol, in some embodiments biologically-produced 1,3-propanediol, and a sweetener, a sour additive, and a bitter additive.

Certain aspects are directed to methods of improving mouthfeel of a food, beverage, confection, or concentrate composition comprising an amount of bitter additive, the method comprising including from 1,3-propanediol, in some embodiments biologically-produced 1,3-propanediol, in the composition and reducing the amount of bitter additive in the composition. By "mouthfeel" is meant the sensation produced by a food, beverage, confection, or concentrate in the mouth. Tactile perceptions because of pressure and contact in the mouth communicate size, form, as well as on first textural impressions. Exemplary sensations include biting (from, e.g., chili peppers and garlic), coating (from, e.g., ice cream and yogurt), cooling (from, e.g., ice cubes and menthol), drying (from, e.g., crackers and breakfast cereals), puckering (from, e.g., citrus slices and vinaigrette salad dressing), stimulating (from, e.g., oleocanthal in extra virgin olive oil or ginger), stinging (from, e.g., carbonated beverages and some candies/gum), tearing (from, e.g., roughly cut onions and pepper seeds), and warming (from, e.g., coffee or tea and soup). See, e.g., Marcus J B in Aging, Nutrition and Taste, Chp. 7, Flavor Enhancement Techniques, pp. 207-247 (2019).

Improving mouthfeel, in some embodiments, refers to improving a harsh mouthfeel. By "harsh" mouthfeel is meant an aggressive, penetrating mouthfeel. Harsh mouthfeel can result from any of the aforementioned exemplary sensations. In some embodiments, harsh mouthfeel results from a bitter additive in the food, beverage, confection, or concentrate composition, and in some embodiments, the harsh mouthfeel results from caffeine.

Improving mouthfeel, in some embodiments, refers to improving an astringent mouthfeel. By "astringent" mouthfeel is meant the complex of drying, puckering, and shrinking sensations in the oral cavity causing contraction of the body tissues. Astringent mouthfeel can result from any of the aforementioned exemplary sensations. In some embodiments, astringent mouthfeel results from a bitter additive in the food, beverage, confection, or concentrate composition, and in some embodiments, the astringent mouthfeel results from caffeine.

Improving mouthfeel, in some embodiments, refers to improving a drying after feel. By "drying after feel" is meant the perception of dryness left in the mouth. Drying after feel can result from any of the aforementioned exemplary sensations. In some embodiments, drying after feel results from a bitter additive in the food, beverage, confection, or concentrate composition, and in some embodiments, the drying after feel results from caffeine.

Some embodiments are for methods of improving taste, off-taste, and taste and off-taste of a food, beverage, confection, or concentrate composition comprising providing an improved food, beverage, confection, or concentrate composition comprising (a) an amount of 1,3-1,3-propanediol, in some embodiments biologically-produced 1,3-propanediol, and (b) less sour additive and/or less sweetener as compared to a control food, beverage, confection, or concentrate composition comprising substantially the same amount of 1,3-propanediol, in some embodiments biologically-produced 1,3-propanediol, an amount of sour additive, and an amount of sweetener. In some embodiments, the sour additive in the improved food, beverage, confection, or concentrate composition is present in amount at least 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34% 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99% less than the amount of sour additive in the control food, beverage, confection, or concentrate composition. In some embodiments, the sweetener in the improved food, beverage, confection, or concentrate composition is present in amount at least 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34% 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99% less than the amount of sour additive in the control food, beverage, confection, or concentrate composition. In some embodiments, the amount of 1,3-propanediol, in some embodiments biologically-produced 1,3-propanediol, in the improved food, beverage, confection, or concentrate composition is the same as the amount of 1,3-propanediol, in some embodiments biologically-produced 1,3-propanediol, in the control food, beverage, confection, or concentrate composition. In some embodiments, the improved food, beverage, confection, or concentrate composition and the control food, beverage, confection, or concentrate composition comprise substantially the same, or the same, amount of a bitter additive; in some embodiments, the improved food, beverage, confection, or concentrate composition comprises less bitter additive than the control food, beverage, confection, or concentrate composition; and in some embodiments, in some embodiments, the improved food, beverage, confection, or concentrate composition comprises more bitter additive than the control food, beverage, confection, or concentrate composition.

In some embodiments, an improvement in taste and off-taste in a food, beverage, confection, or concentrate composition results from a reduction in the amount of sour additive and/or sweetener without changing, or insignificantly changing, the amount of 1,3-propanediol, in some embodiments biologically-produced 1,3-propanediol, in the composition. In some embodiments the improved taste is, e.g., reduction in sourness and/or increase in sweetness with a correlated improvement in off-taste, e.g., reduction in harsh mouthfeel.

In some embodiments, where the inclusion of 1,3-propanediol, in some embodiments biologically-produced 1,3-propanediol, in a food, beverage, confection, or concentrate composition increases the apparent sourness of the composition while reducing the apparent sweetness of the composition through masking of bitterness (whether true bitterness or bitterness reflected in initial harsh mouthfeel), (i) sourness can be reduced to levels substantially similar to or improved over that of a comparative composition lacking 1,3-propanediol, in some embodiments biologically-produced 1,3-propanediol, and/or (ii) sweetness can be increased to levels substantially similar to or improved over that of a comparative composition lacking 1,3-propanediol through reduction of the amount of sour additive in the composition. In some embodiments, where the inclusion of 1,3-propanediol, in some embodiments biologically-produced 1,3-propanediol, in a food, beverage, confection, or concentrate composition increases the apparent sourness of the composition while reducing the apparent sweetness of the composition through masking of bitterness (whether true bitterness or bitterness reflected in initial harsh mouthfeel), (i) sourness can be reduced to levels substantially similar to or improved over that of a comparative composition lacking 1,3-propanediol, in some embodiments biologically-produced 1,3-propanediol, and/or (ii) sweetness can be increased to levels substantially similar to or improved over that of a comparative composition lacking 1,3-propanediol, in some embodiments biologically-produced 1,3-propanediol, through reduction of the amount of sweetener in the composition. In some embodiments, where the inclusion of 1,3-1,3-propanediol, in some embodiments biologically-produced 1,3-propanediol, in a food, beverage, confection, or concentrate composition increases the apparent sourness of the composition while reducing the apparent sweetness of the composition through masking of bitterness (whether true bitterness or bitterness reflected in initial harsh mouthfeel), (i) sourness can be reduced to levels substantially similar to or improved over that of a comparative composition lacking 1,3-propanediol, in some embodiments biologically-produced 1,3-propanediol, and/or (ii) sweetness can be increased to levels substantially similar to or improved over that of a comparative composition lacking 1,3-propanediol, in some embodiments biologically-produced 1,3-propanediol, through reduction of the amount of sour additive and sweetener in the composition.

1,3-Propanediol

"1,3-propanediol" or "PDO" refers to either chemically- or biologically-produced 1,3-propanediol. The terms "biologically-produced 1,3-propanediol", "bioPDO", "biologically-produced, biodegradable 1,3-propanediol", "renewably-based 1,3-propanediol", "renewably-based, biodegradable 1,3-propanediol," "biosourced," and "biologically-produced 1,3-propanediol" and similar terms as used herein refer to 1,3-propanediol derived from microorganism metabolism of plant-derived sugars composed of carbon of atmospheric origin, and not composed of fossil-fuel carbon.

When selecting food, beverage, and confection products, consumers consider product safety, environmental impact, the extent to which the components are natural, and the aesthetic quality of the overall product. Biologically-produced 1,3-propanediol (e.g., Zemea® Propanediol by DuPont Tate & Lyle) is well suited to meet these consumer demands. High-purity 1,3-propanediol can be obtained from fermentation-based processes for incorporation into food, beverage, and confection compositions. It has less environmental impact than synthetically produced glycols, because biodegradation of biologically-produced 1,3-propanediol contributes no anthropogenic $CO_2$ emissions to the atmosphere.

In some embodiments, the 1,3-propanediol can be biologically-produced 1,3-propanediol, chemically-produced 1,3-propanediol, or a combination thereof.

1.1 Environmental Impact

Advantageously, biologically-produced 1,3-propanediol can be biodegradable and can have an anthropogenic $CO_2$ emission profile of zero (0). The term "biodegradable" means the capacity of a composition or compound to be broken down by living organisms to simple, stable compounds such as carbon dioxide and water in a relatively short time, e.g., less than years or months, as opposed to plastics. An "anthropogenic emission profile" means anthropogenic $CO_2$ emissions that are contributed to the atmosphere upon biodegradation of a compound or composition.

Whereas photosynthesis is the process of creating growing matter through the conversion of carbon dioxide ($CO_2$) and water ($H_2O$) into plant material through the action of the sun, biodegradation is the process of converting organic material back into $CO_2$ and $H_2O$ through the activity of living organisms. There are many published test methods for measuring the biodegradability of organic chemicals such as glycols. One internationally recognized method is ASTM E1720-01, Standard Test Method for Determining Ready, Ultimate Biodegradability of Organic Chemicals in a Sealed Vessel $CO_2$ Production Test. Chemicals that demonstrate 60% biodegradation or better in this test method will biodegrade in most aerobic environments and are classified as ready biodegradable. All of the glycols referred to in this document meet this criterion.

Glycols such as ethylene glycol, propylene glycol, 1,3-butylene glycol, and 2-methyl-1,3-propanediol are biodegradable compounds useful in compositions ranging from cosmetics and personal care formulations to detergents to heat transfer compositions. While biodegradability is an important factor in protecting the environment, biodegradation of glycols derived from fossil-based sources has the unavoidable consequence of releasing previously fixed $CO_2$ into the atmosphere. Thus, while glycols in general are advantageous for their biodegradability, the resulting global warming potential of fossil-based glycols during biodegradation is significant.

Carbon dioxide is singled out as the largest component of the collection of greenhouse gases in the atmosphere. The level of atmospheric carbon dioxide has increased 50% in the last two hundred years. Recent reports indicate that the current level of atmospheric carbon dioxide is higher than the peak level in the late Pleistocene, the epoch before modern humans (Siegenthaler, U. et al. Stable Carbon Cycle-Climate Relationship During the Late Pleistocene, Science, Vol. 310, no. 5752 (Nov. 25, 2005), pp. 1313-1317). Therefore, any further addition of carbon dioxide to the atmosphere is thought to further shift the effect of greenhouse gases from stabilization of global temperatures to that of heating. Consumers and environmental protection groups alike have identified industrial release of carbon into the atmosphere as the source of carbon causing the greenhouse effect.

Greenhouse gas emission can occur at any point during the lifetime of a product. Consumers and environmental groups consider the full lifespan of a product when evaluating a product's environmental impact. Consumers look for products that do not contribute new carbon to the atmosphere considering the environmental impact of production, use and degradation. Only organic products composed of carbon molecules from plant sugars and starches and ultimately atmospheric carbon are considered to not further contribute to the greenhouse effect.

In addition to adding carbon dioxide to the atmosphere, current methods of industrial production of glycols produce contaminants and waste products that include among them sulfuric acid, hydrochloric acid, hydrofluoric acid, phosphoric acid, oxalic acid tartaric acid, acetic acids, Alkali metals, alkaline earth metals, transitional metals and heavy metals, including iron, cobalt, nickel, copper, silver, molybdenum, tungsten, vanadium, chromium, rhodium, palladium, osmium, iridium, rubidium, and platinum (U.S. Pat. Nos. 2,434,110, 5,034,134, 5,334,778, and 510,036).

1.1.1 Fossil Fuel Derived Carbon Feedstock Release

Calculations setting forth the finding that the 1,3-propanediol disclosed herein provides no anthropogenic $CO_2$ emissions upon biodegradation is set forth below. When one molecule of 1,3-propanediol degrades, three molecules of $CO_2$ are released into the atmosphere. Because all of these molecules of $CO_2$ released during degradation from "fermentatively-derived" 1,3-propanediol have an atmospheric origin, the net release of $CO_2$ to the atmosphere is thus zero. Comparatively, because a fossil fuel-derived propylene glycol and fossil-derived 1,3-propanediol contains three carbon atoms which originate from a fixed carbon source (i.e., the fossil fuel), degradation of one molecule of fossil fuel-derived propylene glycol or 1,3-propanediol results in a net release of three molecules of $CO_2$ into the atmosphere. Similarly, because fossil fuel-derived ethylene glycol contains two carbon atoms, which originate from a fixed carbon source, degradation of one molecule of fossil fuel-derived ethylene glycol results in a net release of two molecules of $CO_2$ into the atmosphere.

In order to quantify the $CO_2$ released for one kilogram of each ethylene glycol, propylene glycol, chemical 1,3-propanediol and "fermentatively-derived" 1,3 propanediol (Bio-PDO™), the product weight (1 kg) is divided by its molecular weight. For each carbon atom present in the molecule, one molecule of $CO_2$ is released. The molecules of $CO_2$ are multiplied by the molecular weight of $CO_2$ (44 kg/kmole) to quantify the impact of $CO_2$ release (kg) per one unit (kg) of product.

Fossil Fuel Derived Ethylene Glycol (EG)

$$1\left(\frac{1}{62.068}\right)\left(\frac{2_2}{1}\right)\left(\frac{44_2}{1_2}\right) = 1.4_2$$

Fossil Fuel Derived Propylene Glycol (PG)

$$1\left(\frac{1}{76.094}\right)\left(\frac{3_2}{1}\right)\left(\frac{44_2}{1_2}\right) = 1.7_2$$

Fossil Fuel Derived 1, 3-Propanediol (PDO)

$$1\left(\frac{1}{76.094}\right)\left(\frac{3_2}{1}\right)\left(\frac{44_2}{1_2}\right) = 1.7_2$$

Biologically-produced 1, 3-Propanediol (Bio-$PDO^{TM}$)

Carbon Feedstock Balance

Capture:

$$1 - {}^{TM}\left(\frac{1 - {}^{TM}}{76.094 - {}^{TM}}\right)\left(\frac{-3_2}{1 - {}^{TM}}\right)\left(\frac{44_2}{1_2}\right) = -1.7_2$$

Release:

$$1 - {}^{TM}\left(\frac{1 - {}^{TM}}{76.094 - {}^{TM}}\right)\left(\frac{3_2}{1 - {}^{TM}}\right)\left(\frac{44_2}{1_2}\right) = 1.7_2$$

Net:

$$-1.7_2 + 1.7_2 = 0_2$$

This Biologically-produced 1,3-Propanediol Carbon Feedstock Balance result demonstrates that there are no anthropogenic $CO_2$ emissions from the biodegradation of the renewably sourced biologically-produced 1,3-propanediol.

The term "anthropogenic" means man-made or fossil-derived.

"Carbon of atmospheric origin" as used herein refers to carbon atoms from carbon dioxide molecules that have recently, in the last few decades, been free in the earth's atmosphere. Such carbons in mass are identifiable by the presence of particular radioisotopes as described herein. "Green carbon", "atmospheric carbon", "environmentally friendly carbon", "life-cycle carbon", "non-fossil fuel based carbon", "non-petroleum based carbon", "carbon of atmospheric origin", and "biobased carbon" are used synonymously herein.

"Carbon of fossil origin" as used herein refers to carbon of petrochemical origin. Such carbon has not been exposed to UV rays as atmospheric carbon has, therefore masses of carbon of fossil origin has few radioisotopes in their population. Carbon of fossil origin is identifiable by means described herein. "Fossil fuel carbon", "fossil carbon", "polluting carbon", "petrochemical carbon", "petro-carbon" and carbon of fossil origin are used synonymously herein.

The abbreviation "IRMS" refers to measurements of $CO_2$ by high precision stable isotope ratio mass spectrometry.

The term "carbon substrate" means any carbon source capable of being metabolized by a microorganism wherein the substrate contains at least one carbon atom.

"Renewably-based" denotes that the carbon content of the 1,3-propanediol is from a "new carbon" source as measured by ASTM test method D 6866-05 Determining the Biobased Content of Natural Range Materials Using Radiocarbon and Isotope Ratio Mass Spectrometry Analysis, incorporated herein by reference. This test method measures the C-14/C-12 isotope ratio in a sample and compares it to the C-14/C-12 isotope ratio in a standard 100% biobased material to give percent biobased content of the sample. "Biobased materials" are organic materials in which the carbon comes from recently (on a human time scale) fixated $CO_2$ present in the atmosphere using sunlight energy (photosynthesis). On land, this $CO_2$ is captured or fixated by plant life (e.g., agricultural crops or forestry materials). In the oceans, the $CO_2$ is captured or fixated by photosynthesizing bacteria or phytoplankton. A biobased material has a C-14/C-12 isotope ratio in range of from 1:0 to greater than 0:1. Contrarily, a fossil-based material, has a C-14/C-12 isotope ratio of 0:1.

A small amount of the carbon dioxide in the atmosphere is radioactive. This 14C carbon dioxide is created when nitrogen is struck by an ultra-violet light produced neutron, causing the nitrogen to lose a proton and form carbon of molecular weight 14 which is immediately oxidized in carbon dioxide. This radioactive isotope represents a small but measurable fraction of atmospheric carbon. Atmospheric carbon dioxide is cycled by green plants to make organic molecules during the process known as photosynthesis. The cycle is completed when the green plants or other forms of life metabolize the organic molecules producing carbon dioxide which is released back to the atmosphere. Virtually all forms of life on Earth depend on this green plant production of organic molecule to produce the chemical energy that facilitates growth and reproduction. Therefore, the 14C that exists in the atmosphere becomes part of all life forms, and their biological products. These renewably based organic molecules that biodegrade to $CO_2$ do not contribute to global warming as there is no net increase of carbon emitted to the atmosphere. In contrast, fossil fuel based carbon does not have the signature radiocarbon ratio of atmospheric carbon dioxide.

Atmospheric origin and fixed carbon source as used herein are relative terms in that the time period of when $CO_2$ is of atmospheric or fixed origin relates to the life cycle of the 1,3-propanediol. Thus, while it is quite possible that, at one time, carbon from a fossil fuel was found in the atmosphere (and, as a corollary, that atmospheric $CO_2$ may one day be incorporated into a fixed carbon source), for purposes herein carbon is considered to be from a fixed carbon source until it is released into the atmosphere by degradation.

Assessment of the renewably based carbon in a material can be performed through standard test methods. Using radiocarbon and isotope ratio mass spectrometry analysis, the biobased content of materials can be determined. ASTM International, formally known as the American Society for Testing and Materials, has established a standard method for assessing the biobased content of materials. The ASTM method is designated ASTM-D6866.

The application of ASTM-D6866 to derive a "biobased content" is built on the same concepts as radiocarbon dating, but without use of the age equations. The analysis is performed by deriving a ratio of the amount of radiocarbon (14C) in an unknown sample to that of a modern reference standard. The ratio is reported as a percentage with the units "pMC" (percent modern carbon). If the material being analyzed is a mixture of present day radiocarbon and fossil carbon (containing no radiocarbon), then the pMC value obtained correlates directly to the amount of biomass material present in the sample.

The modern reference standard used in radiocarbon dating is a NIST (National Institute of Standards and Technology) standard with a known radiocarbon content equivalent approximately to the year AD 1950. AD 1950 was chosen since it represented a time prior to thermo-nuclear weapons testing which introduced large amounts of excess radiocarbon into the atmosphere with each explosion (termed "bomb carbon"). The AD 1950 reference represents 100 pMC.

"Bomb carbon" in the atmosphere reached almost twice normal levels in 1963 at the peak of testing and prior to the treaty halting the testing. Its distribution within the atmosphere has been approximated since its appearance, showing values that are greater than 100 pMC for plants and animals living since AD 1950. It's gradually decreased over time with today's value being near 107.5 pMC. This means that a fresh biomass material such as corn could give a radiocarbon signature near 107.5 pMC.

Combining fossil carbon with present day carbon into a material will result in a dilution of the present day pMC content. By presuming 107.5 pMC represents present day biomass materials and 0 pMC represents petroleum derivatives, the measured pMC value for that material will reflect the proportions of the two component types. A material derived 100% from present day soybeans would give a radiocarbon signature near 107.5 pMC. If that material was diluted with 50% petroleum derivatives, it would give a radiocarbon signature near 54 pMC.

A biomass content result is derived by assigning 100% equal to 107.5 pMC and 0% equal to 0 pMC. In this regard, a sample measuring 99 pMC will give an equivalent biobased content result of 93%.

A sample of "fermentatively-derived" 1,3-propanediol was submitted by DuPont to Iowa State University for biobased content analysis using ASTM method D 6866-05. The results received from Iowa State University demonstrated that the above sample was 100% bio-based content (ref: Norton, Glenn. Results of Radiocarbon Analyses on samples from DuPont Bio-Based Materials—reported 07-08-05).

Assessment of the materials described herein were done in accordance with ASTM-D6866. The mean values quoted in this report encompass an absolute range of 6% (plus and minus 3% on either side of the biobased content value) to account for variations in end-component radiocarbon signatures. It is presumed that all materials are present day or fossil in origin and that the desired result is the amount of biobased component "present" in the material, not the amount of biobased material "used" in the manufacturing process.

There may be certain instances wherein a combination of a biologically-produced 1,3-propanediol and one or more non biologically-produced glycol components, such as, for example, chemically synthesized 1,3-propanediol may be included in a composition. In such compositions, it may be difficult, if not impossible, to determine which percentage of the glycol composition is biologically-produced, other than by calculating the bio-based carbon content of the glycol component. In this regard, in the compositions, the glycol component, and in particular, the 1,3-propanediol, can comprise at least about 1% bio-based carbon content up to 100% bio-based carbon content, and any percentage therebetween. For example, a composition may include 1,3-propanediol that has at least 5%, at least 10%, at least 25%, at least 50%, at least 75%, at least 90%, at least 99%, or 100% biobased carbon. In one embodiment, the 1,3-propanediol comprises substantially all of the glycol component of the composition. In another embodiment, the 1,3-propanediol comprises all of the glycol component of the composition. Compositions that have a bio-based carbon content of at least 1% have a lower anthropogenic $CO_2$ emission profile as compared to a composition comprising 1,3-propanediol with a bio-based carbon content of 0%.

1.2 1,3-Propanediol Content

In one embodiment, the food, beverage, confection, or concentrate compositions of the disclosure may contain about 10 ppm, about 11 ppm, about 12 ppm, about 13 ppm, about 14 ppm, about 15 ppm, about 16 ppm, about 17 ppm, about 18 ppm, about 19 ppm, about 20 ppm, about 21 ppm, about 22 ppm, about 23 ppm, about 24 ppm, about 25 ppm, about 26 ppm, about 27 ppm, about 28 ppm, about 29 ppm, about 30 ppm, about 31 ppm, about 32 ppm, about 33 ppm, about 34 ppm, about 35 ppm, about 36 ppm, about 37 ppm, about 38 ppm, about 39 ppm, about 40 ppm, about 41 ppm, about 42 ppm, about 43 ppm, about 44 ppm, about 45 ppm, about 46 ppm, about 47 ppm, about 48 ppm, about 49 ppm, about 50 ppm, about 51 ppm, about 52 ppm, about 53 ppm, about 54 ppm, about 55 ppm, about 56 ppm, about 57 ppm, about 58 ppm, about 59 ppm, about 60 ppm, about 61 ppm, about 62 ppm, about 63 ppm, about 64 ppm, about 65 ppm, about 66 ppm, about 67 ppm, about 68 ppm, about 69 ppm, about 70 ppm, about 71 ppm, about 72 ppm, about 73 ppm, about 74 ppm, about 75 ppm, about 76 ppm, about 77 ppm, about 78 ppm, about 79 ppm, about 80 ppm, about 81 ppm, about 82 ppm, about 83 ppm, about 84 ppm, about 85 ppm, about 86 ppm, about 87 ppm, about 88 ppm, about 89 ppm, about 90 ppm, about 91 ppm, about 92 ppm, about 93 ppm, about 94 ppm, about 95 ppm, about 96 ppm, about 97 ppm, about 98 ppm, about 99 ppm about 100 ppm, about 110 ppm, about 120 ppm, about 130 ppm, about 140 ppm, about 150 ppm, about 160 ppm, about 170 ppm, about 180 ppm, about 190 ppm, about 200 ppm, about 210 ppm, about 220 ppm, about 230 ppm, about 240 ppm, about 250 ppm, about 260 ppm, about 270 ppm, about 280 ppm, about 290 ppm, about 300 ppm, about 310 ppm, about 320 ppm, about 330 ppm, about 340 ppm, about 350 ppm, about 360 ppm, about 370 ppm, about 380 ppm, about 390 ppm, about 400 ppm, about 410 ppm, about 420 ppm, about 430 ppm, about 440 ppm, about 450 ppm, about 460 ppm, about 470 ppm, about 480 ppm, about 490 ppm, about 500 ppm, about 510 ppm, about 520 ppm, about 530 ppm, about 540 ppm, about 550 ppm, about 560 ppm, about 570 ppm, about 580 ppm, about 590 ppm, about 600 ppm, about 610 ppm, about 620 ppm, about 630 ppm, about 640 ppm, about 650 ppm, about 660 ppm, about 670 ppm, about 680 ppm, about 690 ppm, about 700 ppm, about 710 ppm, about 720 ppm, about 730 ppm, about 740 ppm, about 750 ppm, about 760 ppm, about 770 ppm, about 780 ppm, about 790 ppm, about 800 ppm, about 810 ppm, about 820 ppm, about 830 ppm, about 840 ppm, about 850 ppm, about 860 ppm, about 870 ppm, about 880 ppm, about 890 ppm, about 900 ppm, about 910 ppm, about 920 ppm, about 930 ppm, about 940 ppm, about 950 ppm, about 960 ppm, about 970 ppm, about 980 ppm, about 990 ppm, about 1,000 ppm, about 1,010 ppm, about 1,020 ppm, about 1,030 ppm, about 1,040 ppm, about 1,050 ppm, about 1,060 ppm, about 1,070 ppm, about 1,080 ppm, about 1,090 ppm, about 1,100 ppm, about 1,110 ppm, about 1,120 ppm, about 1,130 ppm, about 1,140 ppm, about 1,150 ppm, about 1,160 ppm, about 1,170 ppm, about 1,180 ppm, about 1,190 ppm, about 1,200 ppm, about 1,210 ppm, about 1,220 ppm, about 1,230 ppm, about 1,240 ppm, about 1,250 ppm, about 1,260 ppm, about 1,270 ppm, about 1,280 ppm, about 1,290 ppm, about 1,300 ppm, about 1,310 ppm, about 1,320 ppm, about 1,330 ppm, about 1,340 ppm, about 1,350 ppm, about 1,360 ppm, about 1,370 ppm, about 1,380 ppm, about 1,390 ppm, about 1,400 ppm, about 1,410 ppm, about 1,420 ppm, about 1,430 ppm, about 1,440 ppm, about 1,450 ppm, about 1,460 ppm, about 1,470 ppm, about 1,480 ppm, about 1,490 ppm, about 1,500 ppm, about 1,510 ppm, about 1,520 ppm, about 1,530 ppm, about 1,540 ppm, about 1,550 ppm, about 1,560 ppm, about 1,570 ppm, about 1,580 ppm, about 1,590 ppm, about 1,600 ppm, about 1,610 ppm, about 1,620 ppm, about 1,630 ppm, about 1,640 ppm, about 1,650 ppm, about 1,660 ppm, about 1,670 ppm, about 1,680 ppm, about 1,690 ppm, about 1,700 ppm, about 1,710 ppm, about 1,720 ppm, about 1,730 ppm, about 1,740 ppm, about 1,750 ppm, about 1,760 ppm, about 1,770 ppm, about 1,780 ppm, about 1,790 ppm, about 1,800 ppm, about 1,810 ppm, about 1,820 ppm, about 1,830 ppm, about 1,840 ppm, about 1,850 ppm, about 1,860 ppm, about 1,870 ppm, about 1,880 ppm, about 1,890 ppm, about 1,900 ppm, about 1,910 ppm, about 1,920 ppm, about 1,930 ppm, about 1,940 ppm, about 1,950 ppm, about 1,960 ppm, about 1,970 ppm, about 1,980 ppm, about 1,990 ppm, about 2,000 ppm, about 2,100 ppm, about 2,110 ppm, about 2,120 ppm, about 2,130 ppm, about 2,140 ppm, about 2,150 ppm, about 2,160 ppm, about 2,170 ppm, about 2,180 ppm, about 2,190 ppm, about 2,200 ppm, about 2,210 ppm, about 2,220 ppm, about 2,230 ppm, about 2,240 ppm, about 2,250 ppm, about 2,260 ppm, about 2,270 ppm, about 2,280 ppm, about 2,290 ppm, about 2,300 ppm, about 2,310 ppm, about 2,320 ppm, about 2,330 ppm, about 2,340 ppm, about 2,350 ppm, about 2,360 ppm, about 2,370 ppm, about 2,380 ppm, about 2,390 ppm, about 2,400 ppm, about 2,410 ppm, about 2,420 ppm, about 2,430 ppm, about 2,440 ppm, about 2,450 ppm, about 2,460 ppm, about 2,470 ppm, about 2,480 ppm, about 2,490 ppm, or about 2,500 ppm 1,3-propanediol, in some embodiments biologically-produced 1,3-propanediol, in the composition. These values can also be expressed as ranges. For example, about 10 ppm to about 2,500 ppm, about 50 ppm to about 2,500 ppm, about 75 ppm to about 2,500 ppm, about 100 ppm to about 2,500 ppm, about 200 ppm to about 2,500 ppm, about 250 ppm to about 2,500 ppm, about 3000 ppm to about 2,500 ppm, about 400 ppm to about 2,500 ppm, about 5000 ppm to about 2,500 ppm, about 600 ppm to about 2,500 ppm, about 700 ppm to about 2,500 ppm, about 800 ppm to about 2,500 ppm, about 900 ppm to about 2,500 ppm, about 1,000 ppm to about 2,500 ppm, about 1,100 ppm to about 2,500 ppm, about 1,200 ppm to about 2,500 ppm, about 1,300 ppm to about 2,500 ppm, about 1,400 ppm to about 2,500 ppm, about 1,500 ppm to about 2,500 ppm, about 1,600 ppm to about 2,500 ppm, about 1,700 ppm to about 2,500 ppm, about 1,800 ppm to about 2,500 ppm, about 1,900 ppm to about 2,500 ppm, about 2,000 ppm to about 2,500 ppm, about 2,100 ppm to about 2,500 ppm, about 2,200 ppm to about 2,500 ppm, about 2,300 ppm to about 2,500 ppm, about 2,400 ppm to about 2,500 ppm, about 2,500 ppm to about 2,500 ppm, about 25 ppm to about 2,400 ppm, about 50 ppm to about 2,300 ppm, about 100 ppm to about 2,300 ppm, about 200 ppm to about 2,200 ppm, about 300 ppm to about 2,100 ppm, about 400 ppm to about 2,000 ppm, about 500 ppm to about 1,900 ppm, about 600 ppm to about 1,800 ppm, about 700 ppm to about 1,700 ppm, about 800 ppm to about 1,600 ppm, about 900 ppm to about 1,500 ppm, about 1,000 ppm to about 1,400 ppm, about 1,100 ppm to about 1,300 ppm, about 1,150 ppm to about 1,250 ppm, about 10 ppm to about 2,450 ppm, about 10 ppm to about 2,400 ppm, about 10 ppm to about 2,300 ppm, about 10 ppm to about 2,200 ppm, about 10 ppm to about 2,100 ppm, about 10 ppm to about 2,000 ppm, about 10 ppm to about 1,900 ppm, about 10 ppm to about 1,800 ppm, about 10 ppm to about 1,700 ppm, about 10 ppm to about 1,600 ppm, about 10 ppm to about 1,500 ppm, about 10 ppm to about 1,400 ppm, about 10 ppm to about 1,300 ppm, about 10 ppm to about 1,200 ppm, about 10 ppm to about 1,100 ppm, about 10 ppm to about 1,000 ppm, about 10 ppm to about 900 ppm, about 10 ppm to about 800 ppm, about 10 ppm to about 700 ppm, about 10 ppm to about 600 ppm, about 10 ppm to about 500 ppm, about 10 ppm to about 400 ppm, about 10 ppm to about 300 ppm, about 10 ppm to about 200 ppm, about 10 ppm to about 100 ppm, about 10 ppm to about 50 ppm, about 50 ppm to about 2,500 ppm, about 50 ppm to about 2,000 ppm, about 50 ppm to about 1,500 ppm, about 50 ppm to about 1,250 ppm, about 50 ppm to about 1,000 ppm, about 50 ppm to about 900 ppm, about 50 ppm to about 800 ppm, about 50 ppm to about 750 ppm, about 75 ppm to about 2,500 ppm, about 75 ppm to about 2,000 ppm, about 75 ppm to about 1,500 ppm, about 75 ppm to about 1,250 ppm, about 75 ppm to about 1,000 ppm, about 75 ppm to about 900 ppm, about 75 ppm to about 800 ppm, about 75 ppm to about 750 ppm 1,3-propanediol, in some embodiments biologically-produced 1,3-propanediol, may be included in the food, beverage, confection, or concentrate composition of the disclosure.

In some embodiments, the food, beverage, confection, or concentrate compositions of the disclosure may contain about 3,000 ppm, about 3,500 ppm, about 4,000 ppm, about 4,500 ppm, about 5,000 ppm, about 5,500 ppm, about 6,000 ppm, about 6,500 ppm, about 7,000 ppm, about 7,500 ppm, about 8,000 ppm, about 8,500 ppm, about 9,000 ppm, about 9,500 ppm, about 10,000 ppm, about 10,500 ppm, about 11,000 ppm, about 11,500 ppm, about 12,000 ppm, about 12,500 ppm, about 13,000 ppm, about 13,500 ppm, about 14,000 ppm, about 14,500 ppm, about 15,000 ppm, about 15,500 ppm, about 16,000 ppm, about 16,500 ppm, about 17,000 ppm, about 17,500 ppm, about 18,000 ppm, about 18,500 ppm, about 19,000 ppm, about 19,500 ppm, about 20,000 ppm or more 1,3-propanediol, in some embodiments biologically-produced 1,3-propanediol, may be included in the food, beverage, confection, or concentrate composition of the disclosure.

Food, beverage, confection, or concentrate compositions of the present disclosure may include 1,3-propanediol, in some embodiments biologically-produced 1,3-propanediol, as part of the, or as the sole, glycol component of the composition. It is contemplated that other renewably-based or biologically-produced glycols, such as ethylene glycol, dietheylene glycol, triethylene glycol, 1,2 propylene glycol, dipropylene glycol, tripropylene glycol, neopentyl glycol and bisphenol A, among others, can be used in the food, beverage, and confection compositions of the disclosure.

1.3 Purity

Consumers seek products that are composed of additives of a more purified source and/or of all natural composition. Also of concern to consumers, especially consumers of food products, is among other things, an individual's reaction to such a product. The rate of development of hypersensitivity has markedly increased in the US in the last two decades. Many of these reactions are attributed to trace amount of substances. Other reactions are of idiopathic origin.

In one embodiment, the biologically-produced 1,3-propanediol of the present disclosure can be substantially purified. "Substantially purified," as used herein, denotes a composition comprising 1,3-propanediol having one or more of the following characteristics: (1) an ultraviolet absorption at 220 nm of less than about 0.200 and at 250 nm of less than about 0.075 and at 275 nm of less than about 0.075 absorbance units using a one centimeter path length and dilution of the 1,3-propanediol in a 1 to 5 dilution with glass-distilled water; (2) a composition having L*a*b* "b*" color value of less than about 0.15 and an absorbance at 270 nm of less than about 0.075 absorbance units using a one centimeter path length and dilution of the 1,3-propanediol in a 1 to 5 dilution with glass-distilled water; (3) a peroxide composition of less than about 200, 150, 100, 50, 40, 30, 20, 10, 5, 1 or about 0.5 ppm; and (4) a concentration of total organic impurities of less than about 1,000, 900, 800, 700, 600, 500, 400, 300, 200, 150, 100, 50 or about 10 ppm. Any of these sets of values can be used to define a range, such as a peroxide composition of about 0.5 ppm to about 200 ppm, about 1 ppm to about 150 ppm, about 5 ppm to about 100 ppm, about 10 ppm to about 50 ppm, or about 20 ppm to about 40 ppm. The concentration of total organic impurities may range from about 10 ppm to about 1,000 ppm, about 50 ppm to about 900 ppm, about 100 ppm to about 800 ppm, about 150 ppm to about 700 ppm, about 200 ppm to about 600 ppm, or about 300 ppm to about 500 ppm.

A "b*" value is the spectrophotometrically determined "Yellow Blue" measurement as defined by the CIE L*a*b* measurement ASTM D6290.

By the terms "color" and "color bodies" is meant the existence of visible color that can be quantified using a spectrocolorimeter in the range of visible light, using wavelengths of approximately 400-800 nm, and by comparison with pure water. Reaction conditions can have an important effect on the nature of color production. Examples of relevant conditions include the temperatures used, the catalyst and amount of catalyst. While not wishing to be bound by theory, color precursors are believed to include trace amounts of impurities comprising olefinic bonds, acetals and other carbonyl compounds, peroxides, etc. At least some of these impurities may be detected by such methods as UV spectroscopy, or peroxide titration.

The peroxide composition in ppm and total organic impurities can be determined by standard analytical techniques, including gas chromatography.

It is believed that the aforementioned purity level parameters for biologically-produced and purified 1,3-propanediol distinguishes such compositions from 1,3-propanediol compositions prepared from chemically purified 1,3-propanediol derived from petroleum sources and/or from biologically purified 1,3-propanediol not exhibiting such purity values.

The abbreviation "AMS" refers to accelerator mass spectrometry.

By the acronym "NMR" is meant nuclear magnetic resonance.

"Color index" refers to an analytic measure of the electromagnetic radiation-absorbing properties of a substance or compound.

It is believed that the aforementioned purity level parameters for biologically-produced and purified 1,3-propanediol (using methods similar or comparable to those disclosed in U.S. Patent Application No. 2005/0069997) distinguishes such compositions from 1,3-propanediol compositions prepared from chemically purified 1,3-propanediol derived from petroleum sources, as per the prior art.

In some embodiments, extracts of a glycol or glycols (in some embodiments, 1,3-propanediol) may be used in any purity percentage (e.g., about 25% to 100%, and any increment range described therein in increments of 0.5%). In another embodiment, when a glycol is used as a non-extract, the purity of the glycol can be about 25% to 100%, and any increment range described therein in increments of 0.5%. According to other embodiments, the purity of the glycol (extract or non-extract) can be about 50% to 100%, about 70% to 100%, about 80% to 100%, about 90% to 100%; about 95% to 100%, about 95% to 99.5%, about 96% to 100%, about 97% to 100%, about 98% to 100%, or about 99% to 100%. According to particular embodiments, the purity of a 1,3-propanediol can be about 50% to 100%, about 70% to 100%, about 80% to 100%, about 90% to 100%, about 95% to 100%, about 95% to 99.5%, about 96% to 100%, about 97% to 100%, about 98% to 100%, or about 99% to 100%.

1.4 Biologically-Produced 1,3-Propanediol Production

"Biologically-produced" means organic compounds produced by one or more species or strains of living organisms, including particularly strains of bacteria, yeast, fungus and other microbes. "Bio-produced" and Biologically-produced are used synonymously herein. Such organic compounds are composed of carbon from atmospheric carbon dioxide converted to sugars and starches by green plants.

"Biologically-derived" means that the organic compound is synthesized from biologically produced organic components. It is further contemplated that the synthesis process disclosed herein is capable of effectively synthesizing other monoesters and diesters from bio-produced alcohols other than 1,3-propanediol; particularly including ethylene glycol, diethylene glycol, triethylene glycol, 1,2-propylene glycol, dipropylene diol, tripropylene diol, 2-methyl 1,3-propanediol, neopentyl glycol and bisphenol A. "Biologically-derived", and "bio-derived," "biologically-based," "bio-based", and "bio-sourced" are used synonymously herein.

In one embodiment, biologically-produced 1,3-propanediol can be obtained based upon use of the fermentation broth ("fermentatively-derived") generated by a genetically-engineered *Escherichia coli* (*E. coli*) previously disclosed in, for example, U.S. Pat. No. 5,686,276. In other embodiments, one or more single organisms, or combinations of organisms, may be used to biologically produce 1,3-propanediol, using organisms that have been genetically-engineered according to methods known in the art. "Fermentation" refers to a system that catalyzes a reaction between substrate(s) and other nutrients to product(s) through use of a biocatalyst. The biocatalysts can be a whole organism, an isolated enzyme, or any combination or component thereof that is enzymatically active. Fermentation systems useful for producing and purifying biologically-produced 1,3-propanediol are disclosed in, for example, U.S. Pat. No. 7,919,658 incorporated herein by reference.

1.5 Chemically-Produced 1,3-Propanediol 1,3-propanediol as used herein can also be produced by chemical routes. For example, 1,3-propanediol can be produced by the hydration of acrolein. The process generally involves effecting the simultaneous hydration and condensation of acrolein, preferably in the presence of a hydration catalyst such as dilute sulfuric acid, followed by the catalytic hydrogenation of one or more of the organic constituents of the reaction mixture, such constituents comprising hydracyrlic aldehyde, unreacted acrolein, and their polymerization and condensation products. The condensation step, which again may be accompanied by condensation, produces among other products 1,3-propanediol.

An alternative route involves the hydroformylation of ethylene oxide to afford 3-hydroxypropionaldehyde. Generally, this process for synthesizing 1,3-propanediol comprises intimately contacting ethylene oxide, carbon monoxide and hydrogen (syngas), and a bimetallic catalyst in a liquid-phase solution in an inert reaction solvent at a temperature of from about 30 to 150° C., and an elevated pressure, preferably 100 to 4000 psi.

2 Sour Additives

In some embodiments, the food, beverage, confection, or concentrate composition can comprise one or more sour additives.

In some embodiments, the sour additive is lactate, lactic acid, malate, malic acid, malonate, malonic acid, oxalate, oxalic acid, citrate, citric acid, acetate, acetic acid, fumarate, fumaric acid, phosphate, phosphoric acid, tartarate, tartaric acid, sorbate, sorbic acid, succinate, succinic acid, sodium acid sulfate, pyruvate, pyruvic acid, or a combination thereof. The composition may include sour additive at about 3,000 ppm, about 3,500 ppm, about 4,000 ppm, about 4,500 ppm, about 5,000 ppm, about 5,500 ppm, about 6,000 ppm, about 6,500 ppm, about 7,000 ppm, about 7,500 ppm, about 8,000 ppm, about 8,500 ppm, about 9,000 ppm, about 9,500 ppm, about 10,000 ppm, about 10,500 ppm, about 11,000 ppm, about 11,500 ppm, about 12,000 ppm, about 12,500 ppm, about 13,000 ppm, about 13,500 ppm, about 14,000 ppm, about 14,500 ppm, about 15,000 ppm, about 15,500 ppm, about 16,000 ppm, about 16,500 ppm, about 17,000 ppm, about 17,500 ppm, about 18,000 ppm, about 18,500 ppm, about 19,000 ppm, about 19,500 ppm, or about 20,000 ppm. These sour additive content values can also be expressed as ranges, for example: about 3,000 ppm to about 20,000 ppm, about 4,000 ppm to about 19,000 ppm, about 5,000 ppm to about 18,000 ppm, about 6,000 ppm to about 17,000 ppm, about 7,000 ppm to about 16,000 ppm, about 8,000 ppm to about 15,000 ppm, about 9,000 ppm to about 14,000 ppm, about 1,000 ppm to about 13,000 ppm, about 1,100 ppm to about 12,000 ppm, about 1,500 ppm to about 11,000 ppm, about 3,000 ppm to about 9,000 ppm, about 4,000 ppm to about 8,000 ppm, about 5,000 ppm to about 7,000 ppm, about 3,100 ppm to about 19,500 ppm, about 3,200 ppm to about 19,000 ppm, about 3,300 ppm to about 18,500 ppm, about 3,400 ppm to about 18,000 ppm, about 3,500 ppm to about 17,500 ppm, about 3,600 ppm to about 17,000 ppm, about 3,700 ppm to about 16,500 ppm, about 3,800 ppm to about 16,000 ppm, about 3,900 ppm to about 15,500 ppm, about 4,000 ppm to about 15,000 ppm, about 4,500 ppm to about 14,500 ppm, about 5,000 ppm to about 14,000 ppm, about 5,500 ppm to about 13,500 ppm, about 6,000 ppm to about 13,000 ppm, about 6,500 ppm to about 12,500 ppm, about 7,000 ppm to about 12,000 ppm, about 7,500 ppm to about 11,500 ppm, about 8,000 ppm to about 11,000 ppm, about 8,500 ppm to about 10,500 ppm, about 9,000 ppm to about 10,000 ppm, or about 9,250 ppm to about 9,750 ppm.

In one embodiment, the composition includes malic acid at about 5,000 ppm, about 5,500 ppm, about 6,000 ppm, about 6,500 ppm, about 7,000 ppm, about 7,500 ppm, about 8,000 ppm, about 8,500 ppm, about 9,000 ppm, about 9,500 ppm, about 10,000 ppm, about 10,500 ppm, about 11,000 ppm, about 11,500 ppm, about 12,000 ppm, about 12,500 ppm, about 13,000 ppm, about 13,500 ppm, about 14,000 ppm, about 14,500 ppm, or about 15,000 ppm. These malic acid content values can also be expressed as ranges, for example: about 5,000 ppm to about 15,000 ppm, about 5,500 ppm to about 14,500 ppm, about 6,000 ppm to about 14,000 ppm, about 6,500 ppm to about 13,500 ppm, about 7,000 ppm to about 13,000 ppm, about 7,500 ppm to about 12,500 ppm, about 8,000 ppm to about 12,000 ppm, about 8,500 ppm to about 11,500 ppm, about 9,000 ppm to about 11,000 ppm, or about 9,500 ppm to about 10,500 ppm.

In one embodiment, citric acid is included in the composition at about 3,000 ppm, about 3,500 ppm, about 4,000 ppm, about 4,500 ppm, about 4,750 ppm, about 5,000 ppm, about 5,200 ppm, about 5,400 ppm, about 5,600 ppm, about 5,800 ppm, about 6,000 ppm, about 6,250 ppm, about 6,500 ppm, or about 7,000 ppm. These citric acid content values can also be expressed as ranges, for example: about 3,000 ppm to about 7,000 ppm, about 3,500 ppm to about 6,500 ppm, about 4,000 ppm to about 6,250 ppm, about 4,500 ppm to about 6,000 ppm, about 4,750 ppm to about 5,800 ppm, about 5,000 ppm to about 5,600 ppm, or about 5,200 ppm to about 5,400 ppm.

3 Bitter Additives

In some embodiments, the food, beverage, confection, or concentrate composition can comprise one or more bitter additives.

In some embodiments, the bitter additive is a branched amino acid such as L-leucine, L-valine, or L-isoleucine; caffeine; quinine HCl and its various salts; hesperidin; sucrose octaacetate; quercetin; brucine; quassin; isohumulones; stevia extracts; saccharin; naringin; gustducin; catechin; sesquiterpene lactone; aristolochic acid; phenylthiocarbamide; propylthiouracil; flavones; noscapine; humulone; amarogentin; glucoside; limonin; amarogentin; goitrin; cynaropicrin; quassin; cycloheximide; dipeptides; any other bitter-tasting compounds from vegetables, fruits (for example, naringin and guarana), cocoa (for example, chocolate), cereals, or spices; or a combination thereof.

In some embodiments, compositions include a bitter additive at about 250 ppm, about 275 ppm, about 300 ppm, about 325 ppm, about 350 ppm, about 375 ppm, about 400 ppm, about 425 ppm, about 450 ppm, about 475 ppm, about 500 ppm, about 525 ppm, about 550 ppm, about 575 ppm, about 600 ppm, about 625 ppm, about 650 ppm, about 675 ppm, about 700 ppm, about 725 ppm, about 750 ppm, about 775 ppm, about 800 ppm, about 825 ppm, about 850 ppm, about 875 ppm, about 900 ppm, about 925 ppm, about 950 ppm, about 975 ppm, about 1,000 ppm, about 1,250 ppm, about 1,500 ppm, about 1,750 ppm, about 2,000 ppm, about 2,250 ppm, about 2,500 ppm, about 2,750 ppm, about 3,000 ppm, about 3,250 ppm, about 3,500 ppm, about 3, 750 ppm, or about 4,000 ppm. These bitter additive content values can also be expressed as ranges, for example: about 250 ppm to about 4,000 ppm, about 275 ppm to about 3, 750 ppm, about 300 ppm to about 3,500 ppm, about 325 ppm to about 3,250 ppm, about 350 ppm to about 3,000 ppm, about 375 ppm to about 2,750 ppm, about 400 ppm to about 2,500 ppm, about 425 ppm to about 2,250 ppm, about 450 ppm to about 2,000 ppm, about 475 ppm to about 1,750 ppm, about 500 ppm to about 1,500 ppm, about 525 ppm to about 1,250 ppm, about 550 ppm to about 1,000 ppm, about 575 ppm to about 975 ppm, about 600 ppm to about 950 ppm, about 625 ppm to about 925 ppm, about 650 ppm to about 900 ppm, about 675 ppm to about 875 ppm, about 700 ppm to about 850 ppm, about 725 ppm to about 825 ppm, or about 750 ppm to about 800 ppm.

4 Sweeteners

In some embodiments, the food, beverage, confection, or concentrate composition can comprise one or more sweeteners.

In some embodiments, the sweetener can be providing in pure or less pure form or as part of a mixture, i.e. a sweetener blend or a carbohydrate blend or a carbohydrate/high-potency sweetener blend or high-potency sweetener blend or a steviol glycoside blend or a mogroside blend. Exemplary carbohydrade sweeteners include, but are not limited to, cane sucrose, beet sucrose, sucrose, high fructose corn/starch syrup, glucose syrup, glyceraldehyde, dihydroxyacetone, erythrose, threose, erythrulose, arabinose, lyxose, ribose, xylose, ribulose, xylulose, allose, altrose, galactose, glucose, gulose, idose, mannose, talose, fructose, psicose, sorbose, tagatose, mannoheptulose, sedoheptulose, octolose, fucose, rhamnose, arabinose, turanose, sialose, sorbose, lyxose, ribulose, xylose, xylulose, D-allose, L-ribose, D-tagatose, L-glucose, L-fucose, L-arabinose, turanose, erythritol, hydrogenated starch hydrolysates (HSH), isomalt, lactitol, maltitol, mannitol, sorbitol, allulose, xylitol, and combinations thereof.

Exemplary high-potency sweeteners include, but are not limited to, monatin, curculin, glycyrrhizic acid, thaumatin, modnellin, mabinlin, brazzein, hernandulcin, phyllodulcin, glycyphyllin, phloridzin, trilobatin, baiyunoside, osladin, polypodoside A, pterocaryoside, cyclocarioside I, sucralose, potassium acesulfame, acesulfame acid, aspartame, alitame, saccharin, neohesperidin dihydrochalcone, cyclamate, cyclamic acid, neotame, advantame, allulose, xylitol, rebaudioside A, rebaudioside B, rebaudioside C, rebaudioside D, rebaudioside D2, rebaudioside E, rebaudioside F, rebaudioside G, rebaudioside H, rebaudioside I, rebaudioside J, rebaudioside K, rebaudioside L, rebaudioside M, rebaudioside M2, rebaudioside N, rebaudioside O, rebaudioside S, rebaudioside T, rebaudioside U, rebaudioside V, rebaudioside W, rebaudioside Z1, rebaudioside Z2, rebaudioside IX, dulcoside A, dulcoside B, rubusoside, steviolbioside, steviolmonoside, grosmogroside I, mogroside IA, mogroside IE, 11-oxo-mogroside IA, mogroside II, mogroside IIA, mogroside IIB, mogroside IIE, 7-oxo-mogroside IV, 11-oxo-mogroside IVA, mogroside V, isomogroside V, 11-deoxymogroside V, 7-oxo-mogroside V, 11-oxo-mogroside V, isomogroside V, mogroside VI, mogrol, 11-oxomogrol, siamenoside I, enzymatically glucosylated steviol glycosides, and combinations thereof.

In one embodiment, the composition includes one or more high-potency sweeteners depending on their sweet potencies except advantame, alitame, monatin, neotame, thaumatin and brazzein, with each sweetener in the composition at about 600 ppm, about 700 ppm, about 800 ppm, about 900 ppm, 1,000 ppm, about 1,100 ppm, about 1,200 ppm, about 1,300 ppm, about 1,400 ppm, about 1,500 ppm, about 1,600 ppm, about 1,700 ppm, about 1,800 ppm, about 1,900 ppm, about 2,000 ppm, about 2,100 ppm, about 2,200 ppm, about 2,300 ppm, about 2,400 ppm, about 2,500 ppm, about 2,600 ppm, about 2,700 ppm, about 2,800 ppm, about 2,900 ppm, or about 3,000 ppm. These sweetener content values can also be expressed as ranges, about 600 ppm to about 3,000 ppm, 700 ppm to about 2,900 ppm, about 800 ppm to about 2,800 ppm, about 900 ppm to about 2,700 ppm, about 1,000 ppm to about 2,600 ppm, about 1,100 ppm to about 2,500 ppm, about 1,200 ppm to about 2,400 ppm, about 1,300 ppm to about 2,300 ppm, about 1,400 ppm to about 2,200 ppm, about 1,500 ppm to about 2,100 ppm, about 1,600 ppm to about 2,000, or about 1,700 ppm to about 1,900 ppm.

In one embodiment, the composition includes one or more high-potency sweeteners of alitame, monatin, thaumatin and brazzein, depending on their sweet potencies with each sweetener in the composition at about 120 ppm, about 220 ppm, about 320 ppm, about 420 ppm, 520 ppm, about 620 ppm, about 720 ppm, about 820 ppm, about 920 ppm, about 1,020 ppm, about 1,120 ppm, about 1,220 ppm, about 1,320 ppm, about 1,420 ppm, about 1,520 ppm, about 1,620 ppm, about 1,720 ppm, about 1,820 ppm, about 1,920 ppm, about 2,020 ppm, about 2,120 ppm, about 2,220 ppm, about 2,320 ppm, or about 2,420 ppm. These sweetener content values can also be expressed as ranges, about 120 ppm to about 2,420 ppm, 220 ppm to about 2,320 ppm, about 320 ppm to about 2,220 ppm, about 420 ppm to about 2,120 ppm, about 520 ppm to about 2,020 ppm, about 620 ppm to about 1,920 ppm, about 720 ppm to about 1,820 ppm, about 820 ppm to about 1,720 ppm, about 920 ppm to about 1,620 ppm, or about 1,020 ppm to about 1,520 ppm.

In one embodiment, the composition includes one or more high-potency sweeteners of advantame and neotame, depending on their sweet potencies with each sweetener in the composition at about 13 ppm, about 23 ppm, about 33 ppm, about 43 ppm, 53 ppm, about 63 ppm, about 73 ppm, about 83 ppm, about 93 ppm, about 103 ppm, about 113 ppm, about 123 ppm, about 133 ppm, about 143 ppm, about 153 ppm, about 163 ppm, about 173 ppm, about 183 ppm, about 193 ppm, about 203 ppm, about 213 ppm, about 223 ppm, about 233 ppm, or about 243 ppm. These sweetener content values can also be expressed as ranges, about 13 ppm to about 243 ppm, 23 ppm to about 233 ppm, about 33 ppm to about 223 ppm, about 43 ppm to about 213 ppm, about 53 ppm to about 203 ppm, about 63 ppm to about 193 ppm, about 73 ppm to about 183 ppm, about 83 ppm to about 173 ppm, about 93 ppm to about 163 ppm, or about 103 ppm to about 153 ppm.

In one embodiment, the composition includes one or more carbohydrate sweeteners, depending on their sweet potencies, with each sweetener in the composition at about 120,000 ppm, about 120,500 ppm, about 130,000 ppm, about 130,500 ppm, about 140,000 ppm, about 140,500 ppm, about 150,000 ppm, about 150,500 ppm, about 160,000 ppm, about 160,500 ppm, about 170,000 ppm, about 170,500 ppm, about 180,000 ppm, about 180,500 ppm, about 190,000 ppm, about 190,500 ppm, about 200,000 ppm, about 200,500 ppm, about 210,000 ppm, about 210,500 ppm, about 220,000 ppm, about 220,500 ppm, about 230,000 ppm, about 230,500 ppm, about 240,000 ppm, about 240,500 ppm, about 250,000 ppm, about 250,500 ppm, about 260,000 ppm, about 260,500 ppm, about 270,000 ppm, about 270,500 ppm, about 280,000 ppm, about 280,500 ppm, about 290,000 ppm, about 290,500 ppm, about 300,000 ppm, about 300,500 ppm, about 310,000 ppm, about 310,500 ppm, about 320,000 ppm, about 320,500 ppm, about 330,000 ppm, about 330,500 ppm, about 340,000 ppm, about 340,500 ppm, about 350,000 ppm, about 350,500 ppm, about 360,000 ppm, about 360,500 ppm, about 370,000 ppm, about 370,500 ppm, about 380,000 ppm, about 380,500 ppm, about 390,000 ppm, about 390,500 ppm, about 400,000 ppm, about 400,500 ppm, about 410,000 ppm, about 410,500 ppm, about 420,000 ppm, about 420,500 ppm, about 430,000 ppm, about 430,500 ppm, about 440,000 ppm, about 440,500 ppm, about 450,000 ppm, about 450,500 ppm, about 460,000 ppm, about 460,500 ppm, about 470,000 ppm, about 470,500 ppm, about 480,000 ppm, about 480,500 ppm, about 490,000 ppm, about 490,500 ppm, or about 500,000 ppm. These sweetener content values can also be expressed as ranges, about 120,000 ppm to about 500,000 ppm, 120,100 ppm to about 490,900 ppm, about 120,200 ppm to about 490,800 ppm, about 120,300 ppm to about 490,700 ppm, about 120,400 ppm to about 490,600 ppm, about 120,500 ppm to about 490,500 ppm, about 120,600 ppm to about 49,400 ppm, about 120,700 ppm to about 490,300 ppm, about 120,800 ppm to about 490,200 ppm, or about 120,900 ppm to about 490,100 ppm.

5 Other Additives 5.1 Vitamins

In any of the embodiments disclosed above, the composition may further include a vitamin selected from the group consisting of Vitamin A (retinoids, carotene), Vitamin C (ascorbic acid), Vitamin D (calciferol; and D2, D3, D4 and D5), Vitamin E (α-tocopherol), Vitamin K (and K2 and K3), Vitamin B1 (thiamine), Vitamin B2 (riboflavin), Vitamin B3 (niacin), Vitamin B5 (pantothenic acid), Vitamin B7 (Biotin), Vitamin B6 (pyridoxine), Vitamin B9 (folic acid, folate, folacin), Vitamin B12 (cyanocobalamin), and a combination thereof. In some embodiments, the food, beverage, confection, or concentrate composition can include "vitamin-like" additives, such as choline, carnitine, myo-inositol, para-aminobenzoic acid, and lipoic acid. Contemplated compositions include one, two, three, four, five, or more vitamins. For example, the composition may include niacin, pyridoxine, folic acid, and cyanocobalamin. In another exemplary embodiment, the composition may include niacin, pyridoxine, and cyanocobalamin. In further embodiments, the composition may include niacin, pantothenic acid, pyridoxine, and cyanocobalamin. In some embodiments, the composition may include riboflavin, niacin, pyridoxine, and cyanocobalamin. In other embodiments, the composition may include riboflavin, pantothenic acid, pyridoxine, and cyanocobalamin. In further embodiments, the composition may include pyridoxine and cyanocobalamin. In yet further embodiments, the composition may include riboflavin, niacin, pantothenic acid, pyridoxine, and cyanocobalamin.

In any of the foregoing embodiments, the composition can include riboflavin at about 0.5 mg, about 1.0 mg, about 1.5 mg, about 2.0 mg, about 2.5 mg, about 3.0 mg, about 3.5 mg, about 4.0 mg, about 4.5 mg, about 5.0 mg, about 5.5 mg, about 6.0 mg, about 6.5 mg, about 7.0 mg, about 7.5 mg, about 8.0 mg, about 8.5 mg, about 9.0 mg, about 9.5 mg, about 10.0 mg, about 11 mg, about 12 mg, about 13 mg, about 14 mg, about 15 mg, about 16 mg, about 17 mg, about 18 mg, about 19 mg, about 20 mg, about 21 mg, about 22 mg, about 23 mg, about 24 mg, about 25 mg, about 26 mg, about 27 mg, about 28 mg, about 29 mg, about 30 mg, about 31 mg, about 32 mg, about 33 mg, about 34 mg, about 35 mg, about 36 mg, about 37 mg, about 38 mg, about 39 mg, about 40 mg, about 41 mg, about 42 mg, about 43 mg, about 44 mg, about 45 mg, about 46 mg, about 47 mg, about 48 mg, about 49 mg, about 50 mg, about 51 mg, about 52 mg, about 53 mg, about 54 mg, about 55 mg, about 56 mg, about 57 mg, about 58 mg, about 59 mg, about 60 mg, about 61 mg, about 62 mg, about 63 mg, about 64 mg, about 65 mg, about 66 mg, about 67 mg, about 68 mg, about 69 mg, about 70 mg, about 71 mg, about 72 mg, about 73 mg, about 74 mg, about 75 mg, about 76 mg, about 77 mg, about 78 mg, about 79 mg, about 80 mg, about 81 mg, about 82 mg, about 83 mg, about 84 mg, about 85 mg, about 86 mg, about 87 mg, about 88 mg, about 89 mg, about 90 mg, about 91 mg, about 92 mg, about 93 mg, about 94 mg, about 95 mg, about 96 mg, about 97, about 98 mg, about 99 mg, about 100 mg, about 110 mg, about 120 mg, about 130 mg, about 140 mg, about 150 mg, about 160 mg, about 170 mg, about 180 mg, about 190 mg, about 200 mg, about 210 mg, about 220 mg, about 230 mg, about 240 mg, about 250 mg, about 260 mg, about 270 mg, about 280 mg, about 290 mg, about 300 mg, about 310 mg, about 320 mg, about 330 mg, about 340 mg, about 350 mg, about 360 mg, about 370 mg, about 380 mg, about 390 mg, about 400 mg, about 410 mg, about 420 mg, about 430 mg, about 440 mg, about 450 mg, about 460 mg, about 470 mg, about 480 mg, about 490 mg, about 500 mg, about 510 mg, about 520 mg, about 530 mg, about 540 mg, about 550 mg, about 560 mg, about 570 mg, about 580 mg, about 590 mg, about 600 mg, about 610 mg, about 620 mg, about 630 mg, about 640 mg, about 650 mg, about 660 mg, about 670 mg, about 680 mg, about 690 mg, about 700 mg, about 710 mg, about 720 mg, about 730 mg, about 740 mg, about 750 mg, about 760 mg, about 770 mg, about 780 mg, about 790 mg, about 800 mg, about 810 mg, about 820 mg, about 830 mg, about 840 mg, about 850 mg, about 860 mg, about 870 mg, about 880 mg, about 890 mg, or about 900 mg.

Riboflavin content values can also be expressed as ranges, for example: about 0.5 mg to about 900 mg, about 1 mg to about 900 mg, about 2 mg to about 900 mg, about 5 mg to about 900 mg, about 10 mg to about 900 mg, about 25 mg to about 900 mg, about 50 mg to about 900 mg, about 100 mg to about 900 mg, about 150 mg to about 900 mg, about 200 mg to about 900 mg, about 300 mg to about 900 mg, about 400 mg to about 900 mg, about 500 mg to about 900 mg, about 600 mg to about 900 mg, about 700 mg to about 900 mg, about 800 mg to about 900 mg, about 0.5 mg to about 850 mg, about 0.5 mg to about 800 mg, about 0.5 mg to about 750 mg, about 0.5 mg to about 600 mg, about 0.5 mg to about 500 mg, about 0.5 mg to about 400 mg, about 0.5 mg to about 300 mg, about 0.5 mg to about 200 mg, about 0.5 mg to about 100 mg, about 0.5 mg to about 50 mg, about 0.5 mg to about 25 mg, about 0.5 mg to about 10 mg, about 0.5 mg to about 5 mg, about 0.5 mg to about 2.5 mg, about 0.5 mg to about 2 mg, about 0.5 mg to about 1.5 mg, or about 0.5 mg to about 1 mg.

In any of the foregoing embodiments, the composition can include pantothenic acid at about 2 mg, about 3 mg, about 4 mg, about 5 mg, about 6 mg, about 7 mg, about 8 mg, about 9 mg, about 10 mg, about 11 mg, about 12 mg, about 13 mg, about 14 mg, about 15 mg, about 16 mg, about 17 mg, about 18 mg, about 19 mg, about 20 mg, about 21 mg, about 22 mg, about 23 mg, about 24 mg, about 25 mg, about 26 mg, about 27 mg, about 28 mg, about 29 mg, about 30 mg, about 31 mg, about 32 mg, about 33 mg, about 34 mg, about 35 mg, about 36 mg, about 37 mg, about 38 mg, about 39 mg, about 40 mg, about 41 mg, about 42 mg, about 43 mg, about 44 mg, about 45 mg, about 46 mg, about 47 mg, about 48 mg, about 49 mg, about 50 mg, about 51 mg, about 52 mg, about 53 mg, about 54 mg, about 55 mg, about 56, about 57 mg, about 58 mg, about 59 mg, about 60 mg, about 61 mg, about 62 mg, about 63 mg, about 64 mg, about 65 mg, about 66 mg, about 67 mg, about 68 mg, about 69 mg, about 70 mg, about 71 mg, about 72 mg, about 73 mg, about 74 mg, about 75 mg, about 76 mg, about 77 mg, about 78 mg, about 79 mg, about 80 mg, about 81 mg, about 82 mg, about 83 mg, about 84 mg, about 85 mg, about 86 mg, about 87 mg, about 88 mg, about 89 mg, about 90 mg, about 90 mg, about 91 mg, about 92 mg, about 93 mg, about 94 mg, about 95 mg, about 96 mg, about 97 mg, about 98 mg, about 99 mg, about 100 mg, about 110 mg, about 120 mg, about 130 mg, about 140 mg, about 150 mg, about 160 mg, about 170 mg, about 180 mg, about 190 mg, about 200 mg, about 210 mg, about 220 mg, about 230 mg, about 240 mg, about 250 mg, about 260 mg, about 270 mg, about 280 mg, about 290 mg, about 300 mg, about 310 mg, about 320 mg, about 330 mg, about 340 mg, about 350 mg, about 360 mg, about 370 mg, about 380 mg, about 390 mg, about 400 mg, about 410 mg, about 420 mg, about 430 mg, about 440 mg, about 450 mg, about 460 mg, about 470 mg, about 480 mg, about 490 mg, about 500 mg, about 550 mg, about 600 mg, about 650 mg, about 700 mg, about 750 mg, about 800 mg, about 850 mg, about 900 mg, about 950 mg, about 1,000 mg, about 1,050 mg, about 1,100 mg, about 1,150 mg, about 1,200 mg, about 1,250 mg, about 1,300 mg, about 1,350 mg, about 1,400 mg, about 1,450 mg, about 1,500 mg, about 1,550 mg, about 1,600 mg, about 1,650 mg, about 1,700 mg, about 1,750 mg, or about 1,800 mg.

Pantothenic acid content values can also be expressed as ranges, for example: about 2 mg to about 1,800 mg, about 3 mg to about 1,800 mg, about 4 mg to about 1,800 mg, about 5 mg to about 1,800 mg, about 7.5 mg to about 1,800 mg, about 10 mg to about 1,800 mg, about 15 mg to about 1,800 mg, about 20 mg to about 1,800 mg, about 25 mg to about 1,800 mg, about 50 mg to about 1,800 mg, about 100 mg to about 1,800 mg, about 200 mg to about 1,800 mg, about 300 mg to about 1,800 mg, about 400 mg to about 1,800 mg, about 500 mg to about 1,800 mg, about 600 mg to about 1,800 mg, about 700 mg to about 1,800 mg, about 800 mg to about 1,800 mg, about 900 mg to about 1,800 mg, about 1,000 mg to about 1,800 mg, about 1,100 mg to about 1,800 mg, about 1,200 mg to about 1,800 mg, about 1,300 mg to about 1,800 mg, about 1,400 mg to about 1,800 mg, about 1,500 mg to about 1,800 mg, about 1,600 mg to about 1,800 mg, about 1,000 mg to about 1,800 mg, about 2 mg to about 1,750 mg, about 2 mg to about 1,700 mg, about 2 mg to about 1,600 mg, about 2 mg to about 1,500 mg, about 2 mg to about 1,400 mg, about 2 mg to about 1,300 mg, about 2 mg to about 1,200 mg, about 2 mg to about 1,100 mg, about 2 mg to about 1,000 mg, about 2 mg to about 900 mg, about 2 mg to about 800 mg, about 2 mg to about 700 mg, about 2 mg to about 600 mg, about 2 mg to about 500 mg, about 2 mg to about 400 mg, about 2 mg to about 300 mg, about 2 mg to about 200 mg, about 2 mg to about 100 mg, about 2 mg to about 75 mg, about 2 mg to about 50 mg, about 2 mg to about 25 mg, about 2 mg to about 20 mg, about 2 mg to about 15 mg, about 2 mg to about 10 mg, about 2 mg to about 7.5 mg, about 2 mg to about 5 mg, about 2 mg to about 4 mg, or about 2 mg to about 3 mg.

In any of the foregoing embodiments, the composition can include pyridoxine at about 0.75 mg, about 1 mg, about 2 mg, about 3 mg, about 4 mg, about 5 mg, about 6 mg, about 7 mg, about 8 mg, about 9 mg, about 10 mg, about 20 mg, about 30 mg, about 40 mg, about 50 mg, about 60 mg, about 70, about 80 mg, 90 mg, about 100 mg, about 150 mg, about 200 mg, about 250 mg, about 300 mg, 350 mg, about 400 mg, about 450 mg, about 500 mg, about 550 mg, about 600 mg, about 650 mg, about 700 mg, about 750 mg, about 800 mg, about 850 mg, about 900 mg, about 950 mg, 1,000 mg, about 1,500 mg, 2,000 mg, about 2,500 mg, about 3,000 mg, about 3,500 mg, about 4,000 mg, about 4,500 mg, about 5,000 mg, about 5,500 mg, about 6,000 mg, about 6,500 mg, about 7,000 mg, about 7,500 mg, about 8,000 mg, about 8,500 mg, about 9,000 mg, about 9,500 mg, about 10,000 mg, about 10,500 mg, about 11,000 mg, about 11,500 mg, about 12,000 mg, about 12,500 mg, about 13,000 mg, about 13,500 mg, about 14,000 mg, about 14,500 mg, about 15,000 mg, about 15,500 mg, 16,000 mg, about 16,500 mg, about 17,000 mg, about 17,500 mg, about 18,000 mg, about 18,500 mg, about 19,000 mg, about 19,500 mg, about 20,000 mg, about 25,000 mg, about 30,000 mg, about 35,000 mg, about 40,000 mg, or about 45,000 mg.

Pyridoxine content values can also be expressed as ranges, for example: about 0.75 mg to about 45,000 mg, about 1 mg to about 45,000 mg, about 2 mg to about 45,000 mg, about 3 mg to about 45,000 mg, about 4 mg to about 45,000 mg, about 5 mg to about 45,000 mg, about 10 mg to about 45,000 mg, about 15 mg to about 45,000 mg, about 20 mg to about 45,000 mg, about 25 mg to about 45,000 mg, about 50 mg to about 45,000 mg, about 100 mg to about 45,000 mg, about 250 mg to about 45,000 mg, about 500 mg to about 45,000 mg, about 1,000 mg to about 45,000 mg, about 2,500 mg to about 45,000 mg, about 5,000 mg to about 45,000 mg, about 7,500 mg to about 45,000 mg, about 10,000 mg to about 45,000 mg, about 15,000 mg to about 45,000 mg, about 20,000 mg to about 45,000 mg, about 25,000 mg to about 45,000 mg, about 30,000 mg to about 45,000 mg, about 35,000 mg to about 45,000 mg, about 40,000 mg to about 45,000 mg, about 0.25 mg to about 40,000 mg, about 0.25 mg to about 35,000 mg, about 0.25 mg to about 30,000 mg, about 0.25 mg to about 25,000 mg, about 0.25 mg to about 20,000 mg, about 0.25 mg to about 15,000 mg, about 0.25 mg to about 10,000 mg, about 0.25 mg to about 7,500 mg, about 0.25 mg to about 5,000 mg, about 0.25 mg to about 2,500 mg, about 0.25 mg to about 1,000 mg, about 0.25 mg to about 750 mg, about 0.25 mg to about 500 mg, about 0.25 mg to about 250 mg, about 0.25 mg to about 100 mg, about 0.25 mg to about 75 mg, about 0.25 mg to about 50 mg, about 0.25 mg to about 25 mg, about 0.25 mg to about 20 mg, about 0.25 mg to about 15 mg, about 0.25 mg to about 10 mg, about 0.25 mg to about 7.5 mg, about 0.25 mg to about 5 mg, about 0.25 mg to about 2.5 mg, about 0.25 mg to about 2 mg, about 0.25 mg to about 1 mg, or about 0.25 mg to about 0.5 mg.

In any of the foregoing embodiments, the composition can include biotin at about 0.015 mg, about 0.020 mg, about 0.025 mg, about 0.030 mg, about 0.035 mg, about 0.040 mg, about 0.045 mg, about 0.050 mg, about 0.055 mg, about 0.060 mg, about 0.065 mg, about 0.070 mg, about 0.075 mg, about 0.080 mg, about 0.085 mg, about 0.090 mg, about 0.095 mg, about 1 mg, about 2 mg, about 3 mg, about 4 mg, about 5 mg, about 6 mg, about 7 mg, about 8 mg, about 9 mg, about 10 mg, about 20 mg, about 30 mg, about 40 mg, about 50 mg, about 60 mg, about 70, about 80 mg, 90 mg, about 100 mg, about 150 mg, about 200 mg, about 250 mg, about 300 mg, 350 mg, about 400 mg, about 450 mg, about 500 mg, about 550 mg, about 600 mg, about 650 mg, about 700 mg, about 750 mg, about 800 mg, about 850 mg, about 900 mg, about 950 mg, 1,000 mg, about 1,500 mg, 2,000 mg, about 2,500 mg, about 3,000 mg, about 3,500 mg, about 4,000 mg, about 4,500 mg, about 5,000 mg, about 5,500 mg, about 6,000 mg, about 6,500 mg, about 7,000 mg, about 7,500 mg, about 8,000 mg, about 8,500 mg, about 9,000 mg, about 9,500 mg, about 10,000 mg, about 10,500 mg, about 11,000 mg, about 11,500 mg, about 12,000 mg, about 12,500 mg, about 13,000 mg, or about 13,500 mg.

Biotin content values can also be expressed as ranges, for example: about 0.015 mg to about 13,500 mg, about 0.025 mg to about 13,500 mg, about 0.05 mg to about 13,500 mg, about 0.075 mg to about 13,500 mg, about 0.1 mg to about 13,500 mg, about 0.2 mg to about 13,500 mg, about 0.5 mg to about 13,500 mg, about 0.75 mg to about 13,500 mg, about 1 mg to about 13,500 mg, about 2 mg to about 13,500 mg, about 5 mg to about 13,500 mg, about 10 mg to about 13,500 mg, about 25 mg to about 13,500 mg, about 50 mg to about 13,500 mg, about 100 mg to about 13,500 mg, about 250 mg to about 13,500 mg, about 500 mg to about 13,500 mg, about 1,000 mg to about 13,500 mg, about 2,500 mg to about 13,500 mg, about 5,000 mg to about 13,500 mg, about 7,500 mg to about 13,500 mg, about 10,000 mg to about 13,500 mg, about 11,000 mg to about 13,500 mg, about 12,000 mg to about 13,500 mg, about 13,000 mg to about 13,500 mg, about 0.015 mg to about 13,000 mg, about 0.015 mg to about 12,000 mg, about 0.015 mg to about 11,000 mg, about 0.015 mg to about 10,000 mg, about 0.015 mg to about 7,500 mg, about 0.015 mg to about 5,000 mg, about 0.015 mg to about 2,500 mg, about 0.015 mg to about 1,000 mg, about 0.015 mg to about 750 mg, about 0.015 mg to about 500 mg, about 0.015 mg to about 250 mg, about 0.015 mg to about 100 mg, about 75 mg to about 13,000 mg, about 0.015 mg to about 50 mg, about 0.015 mg to about 25 mg, about 10 mg to about 13,000 mg, about 0.015 mg to about 5 mg, about 0.015 mg to about 2.5 mg, about 0.015 mg to about 1 mg, about 0.015 mg to about 0.75 mg, about 0.015 mg to about 0.5 mg, about 0.015 mg to about 0.1 mg, about 0.015 mg to about 0.05 mg, or about 0.015 mg to about 0.025 mg.

In any of the foregoing embodiments, the composition can include niacin at about 7 mg, about 8 mg, about 9 mg, about 10 mg, about 11 mg, about 12 mg, about 13 mg, about 14 mg, about 15 mg, about 18 mg, about 19 mg, about 20 mg, about 21 mg, about 22 mg, about 23 mg, about 24 mg, about 25 mg, about 26 mg, about 27 mg, about 28 mg, about 30 mg, about 30 mg, about 31 mg, about 32 mg, about 33 mg, about 34 mg, about 35 mg, about 36 mg, about 37 mg, about 38 mg, about 39 mg, about 40 mg, about 41 mg, about 42 mg, about 43 mg, about 44 mg, about 45 mg, about 46 mg, about 47 mg, about 48 mg, about 49 mg, about 50 mg, about 51 mg, about 52 mg, about 53 mg, about 54 mg, about 55 mg, about 56, about 57 mg, about 58 mg, about 59 mg, about 60 mg, about 61 mg, about 62 mg, about 63 mg, about 64 mg, about 65 mg, about 66 mg, about 67 mg, about 68 mg, about 69 mg, about 70 mg, about 71 mg, about 72 mg, about 73 mg, about 74 mg, about 75 mg, about 76 mg, about 77 mg, about 78 mg, about 79 mg, about 80 mg, about 81 mg, about 82 mg, about 83 mg, about 84 mg, about 85 mg, about 86 mg, about 87 mg, about 88 mg, about 89 mg, about 90 mg, about 90 mg, about 91 mg, about 92 mg, about 93 mg, about 94 mg, about 95 mg, about 96 mg, about 97 mg, about 98 mg, about 99 mg, about 100 mg, about 110 mg, about 120 mg, about 130 mg, about 140 mg, about 150 mg, about 160 mg, about 170 mg, about 180 mg, about 190 mg, about 200 mg, about 210 mg, about 220 mg, about 230 mg, about 240 mg, about 250 mg, about 260 mg, about 270 mg, about 280 mg, about 290 mg, about 300 mg, about 310 mg, about 320 mg, about 330 mg, about 340 mg, about 350 mg, about 360 mg, about 370 mg, about 380 mg, about 390 mg, about 400 mg, about 410 mg, about 420 mg, about 430 mg, about 440 mg, about 450 mg, about 460 mg, about 470 mg, about 480 mg, about 490 mg, about 500 mg, about 550 mg, about 600 mg, about 650 mg, about 700 mg, about 750 mg, about 800 mg, about 850 mg, about 900 mg, about 950 mg, about 1,000 mg, about 1,050 mg, about 1,100 mg, about 1,150 mg, about 1,200 mg, about 1,250 mg, about 1,300 mg, about 1,350 mg, about 1,400 mg, about 1,450 mg, about 1,500 mg, about 1,550 mg, about 1,600 mg, about 1,650 mg, about 1,700 mg, about 1,750 mg, about 1,800 mg, about 1,850 mg, about 1,9000 mg, about 1,950 mg, about 2,000 mg, about 2,100 mg, about 2,200 mg, about 2,300 mg, about 2,400 mg, 2, 500 mg, 2,600 mg, 2,700 mg, about 2,800 mg, about 2,900 mg, about 3,000 mg, about 3,100 mg, about 3,200 mg, about 3,300 mg, about 3,400 mg, 3,500 mg, 3,600 mg, 3,700 mg, about 3,800 mg, about 3,900 mg, about 4,000 mg, about 4,100 mg, about 4,200 mg, about 4,300 mg, about 4,400 mg, 4,500 mg, 4,600 mg, 4,700 mg, about 4,800 mg, about 4,900 mg, about 5,000 mg, about 5,200 mg, about 5,300 mg, about 5,400 mg, about 5,500 mg, about 5,600 mg, about 5,700 mg, about 5,800 mg, about 5,900 mg, about 6,000 mg, about 6,100 mg, about 6,200 mg, or about 6,300 mg.

Niacin content values can also be expressed as ranges, for example: about 7 mg to about 6,300 mg, about 8 mg to about 6,300 mg, about 9 mg to about 6,300 mg, about 10 mg to about 6,300 mg, about 12.5 mg to about 6,300 mg, about 15 mg to about 6,300 mg, about 20 mg to about 6,300 mg, about 25 mg to about 6,300 mg, about 50 mg to about 6,300 mg, about 75 mg to about 6,300 mg, about 100 mg to about 6,300 mg, about 250 mg to about 6,300 mg, about 500 mg to about 6,300 mg, about 750 mg to about 6,300 mg, about 1,000 mg to about 6,300 mg, about 2,500 mg to about 6,300 mg, about 3,500 mg to about 6,300 mg, about 4,000 mg to about 6,300 mg, about 5,000 mg to about 6,300 mg, about 6,000 mg to about 6,300 mg, about 7 mg to about 6,200 mg, about 7 mg to about 6,100 mg, about 7 mg to about 6,000 mg, about 7 mg to about 5,750 mg, about 7 mg to about 5,500 mg, about 7 mg to about 5,250 mg, about 7 mg to about 5,000 mg, about 7 mg to about 4,000 mg, about 7 mg to about 3,000 mg, about 7 mg to about 2,000 mg, about 7 mg to about 1,000 mg, about 7 mg to about 900 mg, about 7 mg to about 800 mg, about 7 mg to about 700 mg, about 7 mg to about 600 mg, about 7 mg to about 500 mg, about 7 mg to about 400 mg, about 7 mg to about 300 mg, about 7 mg to about 200 mg, about 7 mg to about 100 mg, about 7 mg to about 75 mg, about 7 mg to about 50 mg, about 7 mg to about 25 mg, about 7 mg to about 15 mg, about 7 mg to about 12.5 mg, about 7 mg to about 10 mg, about 7 mg to about 9 mg, or about 7 mg to about 8 mg.

In any of the foregoing embodiments, the composition can include folic acid at about 0.2 mg, about 0.3 mg, about 0.4 mg, about 0.5 mg, about 0.6 mg, about 0.7 mg, about 0.8 mg, about 0.9 mg, about 1 mg, about 2 mg, about 3 mg, about 4 mg, about 5 mg, about 6 mg, about 7 mg, about 8 mg, about 9 mg, about 10 mg, about 11 mg, about 12 mg, about 13 mg, about 14 mg, about 15 mg, about 18 mg, about 19 mg, about 20 mg, about 21 mg, about 22 mg, about 23 mg, about 24 mg, about 25 mg, about 26 mg, about 27 mg, about 28 mg, about 30 mg, about 30 mg, about 31 mg, about 32 mg, about 33 mg, about 34 mg, about 35 mg, about 36 mg, about 37 mg, about 38 mg, about 39 mg, about 40 mg, about 41 mg, about 42 mg, about 43 mg, about 44 mg, about 45 mg, about 46 mg, about 47 mg, about 48 mg, about 49 mg, about 50 mg, about 51 mg, about 52 mg, about 53 mg, about 54 mg, about 55 mg, about 56, about 57 mg, about 58 mg, about 59 mg, about 60 mg, about 61 mg, about 62 mg, about 63 mg, about 64 mg, about 65 mg, about 66 mg, about 67 mg, about 68 mg, about 69 mg, about 70 mg, about 71 mg, about 72 mg, about 73 mg, about 74 mg, about 75 mg, about 76 mg, about 77 mg, about 78 mg, about 79 mg, about 80 mg, about 81 mg, about 82 mg, about 83 mg, about 84 mg, about 85 mg, about 86 mg, about 87 mg, about 88 mg, about 89 mg, about 90 mg, about 90 mg, about 91 mg, about 92 mg, about 93 mg, about 94 mg, about 95 mg, about 96 mg, about 97 mg, about 98 mg, about 99 mg, about 100 mg, about 110 mg, about 120 mg, about 130 mg, about 140 mg, about 150 mg, about 160 mg, about 170 mg, or about 180 mg.

Folic acid content values can also be expressed as ranges, for example: about 0.2 mg to about 180 mg, about 0.3 mg to about 180 mg, about 0.4 mg to about 180 mg, about 0.5 mg to about 180 mg, about 0.75 mg to about 180 mg, about 1 mg to about 180 mg, about 2.5 mg to about 180 mg, about 5 mg to about 180 mg, about 10 mg to about 180 mg, about 15 mg to about 180 mg, about 25 mg to about 180 mg, about 50 mg to about 180 mg, about 75 mg to about 180 mg, about 100 mg to about 180 mg, about 125 mg to about 180 mg, about 150 mg to about 180 mg, about 160 mg to about 180 mg, about 170 mg to about 180 mg, about 175 mg to about 180 mg, about 0.2 mg to about 170 mg, about 0.2 mg to about 160 mg, about 0.2 mg to about 150 mg, about 0.2 mg to about 140 mg, about 0.2 mg to about 130 mg, about 0.2 mg to about 120 mg, about 0.2 mg to about 110 mg, about 0.2 mg to about 100 mg, about 0.2 mg to about 75 mg, about 0.2 mg to about 50 mg, about 0.2 mg to about 25 mg, about 0.2 mg to about 10 mg, about 0.2 mg to about 7.5 mg, about 0.2 mg to about 5 mg, about 0.2 mg to about 4 mg, about 0.2 mg to about 3 mg, about 0.2 mg to about 2 mg, about 0.2 mg to about 1 mg, about 0.2 mg to about 0.75 mg, about 0.2 mg to about 0.5 mg, about 0.2 mg to about 0.4 mg, or about 0.2 mg to about 0.3 mg.

In any of the foregoing embodiments, the composition can include cyanocobalamin at about 0.001 mg, about 0.002 mg, about 0.003 mg, about 0.004 mg, about 0.005 mg, about 0.006 mg, about 0.007 mg, about 0.008 mg, about 0.009 mg, about 0.010 mg, about 0.011 mg, about 0.012 mg, about 0.013 mg, about 0.014 mg, about 0.015 mg, about 0.016 mg, about 0.017 mg, about 0.018 mg, about 0.019 mg, about 0.020 mg, about 0.25 mg, about 0.30 mg, about 0.35 mg, about 0.40 mg, about 0.45 mg, about 0.50 mg, about 0.55 mg, about 0.65 mg, about 0.70 mg, about 0.75 mg, about 0.80 mg, about 0.85 mg, about 0.90 mg, about 0.95 mg, about 1 mg, about 1.5 mg, about 2 mg, about 2.5 mg, about 3 mg, about 3.5 mg, about 4 mg, about 4.5 mg, about 5 mg, about 5.5 mg, about 6 mg, about 6.5 mg, about 7 mg, about 7.5 mg, about 8 mg, about 8.5 mg, about 9 mg, about 9.5 mg, 10.0 mg, about 11 mg, about 12 mg, about 13 mg, about 14 mg, about 15 mg, about 16 mg, about 17 mg, about 18 mg, about 19 mg, about 20 mg, about 21 mg, about 22 mg, about 23 mg, about 24 mg, about 25 mg, about 26 mg, about 27 mg, about 28 mg, about 29 mg, about 30 mg, about 31 mg, about 32 mg, about 33 mg, about 34 mg, about 35 mg, about 36 mg, about 37 mg, about 38 mg, about 39 mg, about 40 mg, about 41 mg, about 42 mg, about 43 mg, about 44 mg, about 45 mg, about 46 mg, about 47 mg, about 48 mg, about 49 mg, about 50 mg, about 51 mg, about 52 mg, about 53 mg, about 54 mg, about 55 mg, about 56 mg, about 57 mg, about 58 mg, about 59 mg, about 60 mg, about 61 mg, about 62 mg, about 63 mg, about 64 mg, about 65 mg, about 66 mg, about 67 mg, about 68 mg, about 69 mg, about 70 mg, about 71 mg, about 72 mg, about 73 mg, about 74 mg, about 75 mg, about 76 mg, about 77 mg, about 78 mg, about 79 mg, about 80 mg, about 81 mg, about 82 mg, about 83 mg, about 84 mg, about 85 mg, about 86 mg, about 87 mg, about 88 mg, about 89 mg, about 90 mg, about 91 mg, about 92 mg, about 93 mg, about 94 mg, about 95 mg, about 96 mg, about 97, about 98 mg, about 99 mg, about 100 mg, about 150 mg, about 200 mg, about 250 mg, about 300 mg, 350 mg, about 400 mg, about 450 mg, about 500 mg, about 510 mg, about 520 mg, about 530 mg, about 540 mg, about 550 mg, about 560 mg, about 570 mg, about 580 mg, about 590 mg, about 600 mg, about 610 mg, about 620 mg, about 630 mg, about 640 mg, about 650 mg, about 660 mg, about 670 mg, about 680 mg, about 690 mg, about 700 mg, about 710 mg, about 720 mg, about 730 mg, about 740 mg, about 750 mg, about 760 mg, about 770 mg, about 780 mg, about 790 mg, about 800 mg, about 810 mg, about 820 mg, about 830 mg, about 840 mg, about 850 mg, about 860 mg, about 870 mg, about 880 mg, about 890 mg, about 900 mg, about 1,010 mg, about 1,020 mg, about 1,030 mg, about 1,040 mg, about 1,050 mg, about 1,060 mg, about 1,070 mg, or about 1,080 mg.

Cyanocobalamin content values can also be expressed as ranges, for example: about 0.001 mg to about 1,080 mg, about 0.0025 mg to about 1,080 mg, about 0.005 mg to about 1,080 mg, about 0.0075 mg to about 1,080 mg, about 0.01 mg to about 1,080 mg, about 0.025 mg to about 1,080 mg, about 0.05 mg to about 1,080 mg, about 0.075 mg to about 1,080 mg, about 0.1 mg to about 1,080 mg, about 0.25 mg to about 1,080 mg, about 0.5 mg to about 1,080 mg, about 0.75 mg to about 1,080 mg, about 1 mg to about 1,080 mg, about 2 mg to about 1,080 mg, about 2.5 mg to about 1,080 mg, about 5 mg to about 1,080 mg, about 10 mg to about 1,080 mg, about 25 mg to about 1,080 mg, about 50 mg to about 1,080 mg, about 75 mg to about 1,080 mg, about 100 mg to about 1,080 mg, about 200 mg to about 1,080 mg, about 500 mg to about 1,080 mg, about 750 mg to about 1,080 mg, about 800 mg to about 1,080 mg, about 900 mg to about 1,080 mg, about 1,000 mg to about 1,080 mg, about 1,025 mg to about 1,080 mg, about 1,050 mg to about 1,080 mg, about 1,060 mg to about 1,080 mg, about 1,070 mg to about 1,080 mg, about 1,075 mg to about 1,080 mg, about 0.001 mg to about 1,050 mg, about 0.001 mg to about 1,000 mg, about 0.001 mg to about 900 mg, about 0.001 mg to about 800 mg, about 0.001 mg to about 700 mg, about 0.001 mg to about 600 mg, about 0.001 mg to about 500 mg, about 0.001 mg to about 400 mg, about 0.001 mg to about 300 mg, about 0.001 mg to about 200 mg, about 0.001 mg to about 100 mg, about 0.001 mg to about 75 mg, about 0.001 mg to about 50 mg, about 0.001 mg to about 25 mg, about 0.001 mg to about 10 mg, about 0.001 mg to about 5 mg, about 0.001 mg to about 2.5 mg, about 0.001 mg to about 1 mg, about 0.001 mg to about 0.5 mg, about 0.001 mg to about 0.1 mg, about 0.001 mg to about 0.05 mg, about 0.001 mg to about 0.01 mg, about 0.001 mg to about 0.0075 mg, about 0.001 mg to about 0.005 mg, about 0.001 mg to about 0.0025 mg, or about 0.001 mg to about 0.002 mg.

In any of the foregoing embodiments, the composition can include thiamin at about 0.55 mg, 0.60 mg, about 0.65 mg, 0.70 mg, about 0.75 mg, about 0.80 mg, about 0.85 mg, about 0.90 mg, about 0.95 mg, about 1 mg, about 2 mg, about 3 mg, about 4 mg, about 5 mg, about 6 mg, about 7 mg, about 8 mg, about 9 mg, about 10 mg, about 11 mg, about 12 mg, about 13 mg, about 14 mg, about 15 mg, about 18 mg, about 19 mg, about 20 mg, about 21 mg, about 22 mg, about 23 mg, about 24 mg, about 25 mg, about 26 mg, about 27 mg, about 28 mg, about 30 mg, about 30 mg, about 31 mg, about 32 mg, about 33 mg, about 34 mg, about 35 mg, about 36 mg, about 37 mg, about 38 mg, about 39 mg, about 40 mg, about 41 mg, about 42 mg, about 43 mg, about 44 mg, about 45 mg, about 46 mg, about 47 mg, about 48 mg, about 49 mg, about 50 mg, about 51 mg, about 52 mg, about 53 mg, about 54 mg, about 55 mg, about 56, about 57 mg, about 58 mg, about 59 mg, about 60 mg, about 61 mg, about 62 mg, about 63 mg, about 64 mg, about 65 mg, about 66 mg, about 67 mg, about 68 mg, about 69 mg, about 70 mg, about 71 mg, about 72 mg, about 73 mg, about 74 mg, about 75 mg, about 76 mg, about 77 mg, about 78 mg, about 79 mg, about 80 mg, about 81 mg, about 82 mg, about 83 mg, about 84 mg, about 85 mg, about 86 mg, about 87 mg, about 88 mg, about 89 mg, about 90 mg, about 90 mg, about 91 mg, about 92 mg, about 93 mg, about 94 mg, about 95 mg, about 96 mg, about 97 mg, about 98 mg, about 99 mg, about 100 mg, about 110 mg, about 120 mg, about 130 mg, about 140 mg, about 150 mg, about 160 mg, about 170 mg, about 180 mg, about 190 mg, about 200 mg, about 210 mg, about 220 mg, about 230 mg, about 240 mg, about 250 mg, about 260 mg, about 270 mg, about 280 mg, about 290 mg, about 300 mg, about 310 mg, about 320 mg, about 330 mg, about 340 mg, about 350 mg, about 360 mg, about 370 mg, about 380 mg, about 390 mg, about 400 mg, about 410 mg, about 420 mg, about 430 mg, about 440 mg, or about 450 mg.

Thiamin content values can also be expressed as ranges, for example: about 0.55 mg to about 450 mg, about 0.6 mg to about 450 mg, about 0.7 mg to about 450 mg, about 0.8 mg to about 450 mg, about 0.9 mg to about 450 mg, about 1 mg to about 450 mg, about 2.5 mg to about 450 mg, about 5 mg to about 450 mg, about 7.5 mg to about 450 mg, about 10 mg to about 450 mg, about 25 mg to about 450 mg, about 50 mg to about 450 mg, about 75 mg to about 450 mg, about 100 mg to about 450 mg, about 150 mg to about 450 mg, about 200 mg to about 450 mg, about 250 mg to about 450 mg, about 300 mg to about 450 mg, about 350 mg to about 450 mg, about 400 mg to about 450 mg, about 410 mg to about 450 mg, about 420 mg to about 450 mg, about 430 mg to about 450 mg, about 1 mg to about 450 mg, about 440 mg to about 450 mg, about 445 mg to about 450 mg, about 0.55 mg to about 425 mg, about 0.55 mg to about 400 mg, about 0.55 mg to about 375 mg, about 0.55 mg to about 350 mg, about 0.55 mg to about 325 mg, about 0.55 mg to about 300 mg, about 0.55 mg to about 200 mg, about 0.55 mg to about 100 mg, about 0.55 mg to about 75 mg, about 0.55 mg to about 50 mg, about 0.55 mg to about 25 mg, about 0.55 mg to about 10 mg, about 0.55 mg to about 5 mg, about 0.55 mg to about 2.5 mg, about 0.55 mg to about 2 mg, about 0.55 mg to about 1 mg, about 0.55 mg to about 0.9 mg, about 0.55 mg to about 0.8 mg, about 0.55 mg to about 0.7 mg, or about 0.55 mg to about 0.6 mg.

In any of the foregoing embodiments, the composition can include Vitamin A at about 0.35 mg, about 0.40 mg, about 0.45 mg, about 0.50 mg, about 0.55 mg, about 0.60 mg, about 0.65 mg, about 0.70 mg, about 0.75 mg, about 0.80 mg, about 0.85 mg, about 0.90 mg, about 0.95 mg, about 1 mg, about 2 mg, about 3 mg, about 4 mg, about 5 mg, about 6 mg, about 7 mg, about 8 mg, about 9 mg, about 10 mg, about 10.5 mg, about 11 mg, about 11.5 mg, about 12 mg, about 12.5 mg, about 13 mg, about 13.5 mg, about 14 mg, about 14.5 mg, about 15 mg, about 15.5 mg, about 16 mg, about 16.5 mg, about 17 mg, or about 17.5 mg.

Vitamin A content values can also be expressed as ranges, for example: about 0.35 mg to about 17.5 mg, about 0.4 mg to about 17.5 mg, about 0.5 mg to about 17.5 mg, about 0.6 mg to about 17.5 mg, about 0.7 mg to about 17.5 mg, about 0.8 mg to about 17.5 mg, about 0.9 mg to about 17.5 mg, about 1 mg to about 17.5 mg, about 2 mg to about 17.5 mg, about 3 mg to about 17.5 mg, about 4 mg to about 17.5 mg, about 5 mg to about 17.5 mg, about 6 mg to about 17.5 mg, about 7 mg to about 17.5 mg, about 8 mg to about 17.5 mg, about 9 mg to about 17.5 mg, about 10 mg to about 17.5 mg, about 11 mg to about 17.5 mg, about 12 mg to about 17.5 mg, about 13 mg to about 17.5 mg, about 14 mg to about 17.5 mg, about 15 mg to about 17.5 mg, about 16 mg to about 17.5 mg, about 17 mg to about 17.5 mg, about 0.35 mg to about 17 mg, about 0.35 mg to about 16 mg, about 0.35 mg to about 15 mg, about 0.35 mg to about 14 mg, about 0.35 mg to about 13 mg, about 0.35 mg to about 12 mg, about 0.35 mg to about 11 mg, about 0.35 mg to about 10 mg, about 0.35 mg to about 9 mg, about 0.35 mg to about 8 mg, about 0.35 mg to about 7 mg, about 0.35 mg to about 6 mg, about 0.35 mg to about 5 mg, about 0.35 mg to about 4 mg, about 0.35 mg to about 3 mg, about 0.35 mg to about 2 mg, about 0.35 mg to about 1 mg, about 0.35 mg to about 0.9 mg, about 0.35 mg to about 0.8 mg, about 0.35 mg to about 0.7 mg, about 0.35 mg to about 0.6 mg, about 0.35 mg to about 0.5 mg, or about 0.35 mg to about 0.4 mg.

In any of the foregoing embodiments, the composition can include Vitamin C at about 37.5 mg, about 38 mg, about 38.5 mg, about 39 mg, about 39.5 mg, about 40 mg, about 40.5 mg, about 41 mg, about 41.5 mg, about 42 mg, about 42.5 mg, about 43 mg, about 43.5 mg, about 44 mg, about 44.5 mg, about 45 mg, about 45.5 mg, about 46 mg, about 46.5 mg, about 47 mg, about 47.5 mg, about 48 mg, about 48.5 mg, about 49 mg, about 49.5 mg, about 50 mg, about 50.5 mg, about 60 mg, about 60.5 mg, about 70, about 70.5 about 80 mg, about 80.5, about 90 mg, about 90.5, about 100 mg, about 110 mg, about 111 mg, about 112 mg, about 113 mg, about 114 mg, about 115 mg, about 116 mg, about 117 mg, about 118 mg, about 119 mg, about 120 mg, about 130 mg, about 140 mg, about 150 mg, about 200 mg, about 250 mg, about 300 mg, 350 mg, about 400 mg, about 450 mg, about 500 mg, about 550 mg, about 600 mg, about 650 mg, about 700 mg, about 750 mg, about 800 mg, about 850 mg, about 900 mg, about 950 mg, 1,000 mg, about 1,500 mg, 2,000 mg, about 2,500 mg, about 3,000 mg, about 3,500 mg, about 4,000 mg, about 4,500 mg, about 5,000 mg, about 5,500 mg, about 6,000 mg, about 6,500 mg, about 7,000 mg, about 7,500 mg, about 8,000 mg, about 8,500 mg, about 9,000 mg, about 9,500 mg, about 10,000 mg, about 11,000 mg, about 12,000 mg, about 13,000 mg, about 14,000 mg, about 15,000 mg, about 16,000 mg, about 17,000 mg, about 18,000 mg, about 19,000 mg, about 20,000 mg, about 21,000 mg, about 22,000 mg, about 23,000 mg, about 24,000 mg, about 25,000 mg, about 26,000 mg, about 27,000 mg, about 28,000 mg, about 29,000 mg, about 30,000 mg, about 31,000 mg, about 32,000 mg, about 33,000 mg, about 34,000 mg, about 35,000 mg, or about 36,000 mg.

Vitamin C content values can also be expressed as ranges, for example: about 37.5 mg to about 36,000 mg, about 38 mg to about 36,000 mg, about 39 mg to about 36,000 mg, about 40 mg to about 36,000 mg, about 42.5 mg to about 36,000 mg, about 45 mg to about 36,000 mg, about 47.5 mg to about 36,000 mg, about 50 mg to about 36,000 mg, about 75 mg to about 36,000 mg, about 100 mg to about 36,000 mg, about 250 mg to about 36,000 mg, about 500 mg to about 36,000 mg, about 750 mg to about 36,000 mg, about 1,000 mg to about 36,000 mg, about 1,000 mg to about 36,000 mg, about 2,000 mg to about 36,000 mg, about 3,000 mg to about 36,000 mg, about 5,000 mg to about 36,000 mg, about 7,500 mg to about 36,000 mg, about 10,000 mg to about 36,000 mg, about 12,500 mg to about 36,000 mg, about 15,000 mg to about 36,000 mg, about 20,000 mg to about 36,000 mg, about 25,000 mg to about 36,000 mg, about 30,000 mg to about 36,000 mg, about 31,000 mg to about 36,000 mg, about 32,000 mg to about 36,000 mg, about 33,000 mg to about 36,000 mg, about 34,000 mg to about 36,000 mg, about 35,000 mg to about 36,000 mg, about 35,500 mg to about 36,000 mg, about 37.5 mg to about 35,000 mg, about 37.5 mg to about 34,000 mg, about 37.5 mg to about 32,500 mg, about 37.5 mg to about 30,000 mg, about 37.5 mg to about 25,000 mg, about 37.5 mg to about 20,000 mg, about 37.5 mg to about 15,000 mg, about 37.5 mg to about 10,000 mg, about 37.5 mg to about 7,500 mg, about 37.5 mg to about 5,000 mg, about 37.5 mg to about 2,500 mg, about 37.5 mg to about 1,000 mg, about 37.5 mg to about 900 mg, about 37.5 mg to about 800 mg, about 37.5 mg to about 700 mg, about 37.5 mg to about 600 mg, about 37.5 mg to about 500 mg, about 37.5 mg to about 400 mg, about 37.5 mg to about 300 mg, about 37.5 mg to about 200 mg, about 37.5 mg to about 100 mg, about 37.5 mg to about 75 mg, about 37.5 mg to about 50 mg, about 37.5 mg to about 47.5 mg, about 37.5 mg to about 45 mg, about 37.5 mg to about 40 mg, about 37.5 mg to about 39 mg, to about 37.5 mg to about 38 mg.

In any of the foregoing embodiments, the composition can include Vitamin D at about 0.01 mg, about 0.02 mg, about 0.03 mg, about 0.04 mg, about 0.05 mg, about 0.06 mg, about 0.07 mg, about 0.08 mg, about 0.09 mg, about 0.1 mg, about 0.5 mg, about 1 mg, about 2 mg, about 3 mg, about 4 mg, about 5 mg, about 6 mg, about 7 mg, about 8 mg, about 9 mg, about 10 mg, about 11 mg, about 12 mg, about 13 mg, about 14 mg, about 15 mg, about 18 mg, about 19 mg, about 20 mg, about 21 mg, about 22 mg, about 23 mg, about 24 mg, about 25 mg, about 26 mg, about 27 mg, about 28 mg, about 30 mg, about 30 mg, about 31 mg, about 32 mg, about 33 mg, about 34 mg, about 35 mg, about 36 mg, about 37 mg, about 38 mg, about 39 mg, about 40 mg, about 41 mg, about 42 mg, about 43 mg, about 44 mg, about 45 mg, about 46 mg, about 47 mg, about 48 mg, about 49 mg, about 50 mg, about 51 mg, about 52 mg, about 53 mg, about 54 mg, about 55 mg, about 56 mg, about 57 mg, about 58 mg, about 59 mg, about 60 mg, about 61 mg, about 62 mg, about 63 mg, about 64 mg, about 65 mg, about 66 mg, about 67 mg, about 68 mg, about 69 mg, about 70 mg, about 71 mg, about 72 mg, about 73 mg, about 74 mg, about 75 mg, about 76 mg, about 77 mg, about 78 mg, about 79 mg, about 80 mg, about 81 mg, about 82 mg, about 83 mg, about 84 mg, about 85 mg, about 86 mg, about 87 mg, about 88 mg, about 89 mg, about 90 mg, about 90 mg, about 91 mg, about 92 mg, about 93 mg, about 94 mg, about 95 mg, about 96 mg, about 97 mg, about 98 mg, about 99 mg, about 100 mg, about 110 mg, about 120 mg, about 130 mg, about 140 mg, about 150 mg, about 160 mg, about 170 mg, about 180 mg, about 190 mg, about 200 mg, about 210 mg, about 220 mg, about 230 mg, about 240 mg, about 250 mg, about 260 mg, about 270 mg, about 280 mg, about 290 mg, about 300 mg, about 310 mg, about 320 mg, about 330 mg, about 340 mg, about 350 mg, about 360 mg, about 370 mg, about 380 mg, about 390 mg, about 400 mg, about 410 mg, about 420 mg, about 430 mg, about 440 mg, about 450 mg, about 460 mg, about 470 mg, about 480 mg, about 490 mg, about 500 mg, about 550 mg, about 600 mg, about 650 mg, about 700 mg, about 750 mg, about 800 mg, about 850 mg, about 900 mg, about 950 mg, about 1,000 mg, about 1,050 mg, about 1,100 mg, about 1,150 mg, about 1,200 mg, about 1,250 mg, about 1,300 mg, about 1,350 mg, about 1,400 mg, about 1,450 mg, about 1,500 mg, about 1,550 mg, about 1,600 mg, about 1,650 mg, about 1,700 mg, about 1,750 mg, about 1,800 mg, about 1,850 mg, about 1,900 mg, about 1,950 mg, about 2,000 mg, about 2,100 mg, about 2,200 mg, about 2,300 mg, about 2,400 mg, 2, 500 mg, 2,600 mg, 2,700 mg, about 2,800 mg, about 2,900 mg, about 3,000 mg, about 3,100 mg, about 3,200 mg, about 3,300 mg, about 3,400 mg, 3,500 mg, 3,600 mg, 3,700 mg, about 3,800 mg, about 3,900 mg, about 4,000 mg, about 4,100 mg, about 4,200 mg, about 4,300 mg, about 4,400 mg, 4,500 mg, 4,600 mg, 4,700 mg, about 4,800 mg, about 4,900 mg, about 5,000 mg, about 5,200 mg, about 5,300 mg, about 5,400 mg, about 5,500 mg, about 5,600 mg, about 5,700 mg, about 5,800 mg, about 5,900 mg, about 6,000 mg, about 6,100 mg, about 6,200 mg, or about 6,300 mg.

Vitamin D content values can also be expressed as ranges, for example: about 0.01 mg to about 6,300 mg, about 0.025 mg to about 6,300 mg, about 0.05 mg to about 6,300 mg, about 0.075 mg to about 6,300 mg, about 0.1 mg to about 6,300 mg, about 0.2 mg to about 6,300 mg, about 0.3 mg to about 6,300 mg, about 0.4 mg to about 6,300 mg, about 0.5 mg to about 6,300 mg, about 0.6 mg to about 6,300 mg, about 0.7 mg to about 6,300 mg, about 0.8 mg to about 6,300 mg, about 0.9 mg to about 6,300 mg, about 1 mg to about 6,300 mg, about 2 mg to about 6,300 mg, about 3 mg to about 6,300 mg, about 4 mg to about 6,300 mg, about 5 mg to about 6,300 mg, about 6 mg to about 6,300 mg, about 7 mg to about 6,300 mg, about 8 mg to about 6,300 mg, about 9 mg to about 6,300 mg, about 10 mg to about 6,300 mg, about 12.5 mg to about 6,300 mg, about 15 mg to about 6,300 mg, about 20 mg to about 6,300 mg, about 25 mg to about 6,300 mg, about 50 mg to about 6,300 mg, about 75 mg to about 6,300 mg, about 100 mg to about 6,300 mg, about 250 mg to about 6,300 mg, about 500 mg to about 6,300 mg, about 750 mg to about 6,300 mg, about 1,000 mg to about 6,300 mg, about 2,500 mg to about 6,300 mg, about 3,500 mg to about 6,300 mg, about 4,000 mg to about 6,300 mg, about 5,000 mg to about 6,300 mg, about 6,000 mg to about 6,300 mg, about 0.01 mg to about 6,200 mg, about 0.01 mg to about 6,100 mg, about 0.01 mg to about 6,000 mg, about 0.01 mg to about 5,750 mg, about 0.01 mg to about 5,500 mg, about 0.01 mg to about 5,250 mg, about 0.01 mg to about 5,000 mg, about 0.01 mg to about 4,000 mg, about 0.01 mg to about 3,000 mg, about 0.01 mg to about 2,000 mg, about 0.01 mg to about 1,000 mg, about 0.01 mg to about 900 mg, about 0.01 mg to about 800 mg, about 0.01 mg to about 700 mg, about 0.01 mg to about 600 mg, about 0.01 mg to about 500 mg, about 0.01 mg to about 400 mg, about 0.01 mg to about 300 mg, about 0.01 mg to about 200 mg, about 0.01 mg to about 100 mg, about 0.01 mg to about 75 mg, about 0.01 mg to about 50 mg, about 0.01 mg to about 25 mg, about 0.01 mg to about 15 mg, about 0.01 mg to about 12.5 mg, about 0.01 mg to about 10 mg, about 0.01 mg to about 9 mg, about 0.01 mg to about 8 mg, about 0.01 mg to about 7 mg, about 0.01 mg to about 6 mg, about 0.01 mg to about 5 mg, about 0.01 mg to about 4 mg, about 0.01 mg to about 3 mg, about 0.01 mg to about 2 mg, about 0.01 mg to about 1 mg, about 0.01 mg to about 0.1 mg, about 0.01 mg to about 0.075 mg, about 0.01 mg to about 0.05 mg, or about 0.01 mg to about 0.025 mg.

In any of the foregoing embodiments, the composition can include Vitamin E at about 7.5 mg, about 8.0 mg, about 8.5 mg, about 9.0 mg, about 9.5 mg, about 10 mg, 11 mg, about 12 mg, about 13 mg, about 14 mg, about 15 mg, about 18 mg, about 19 mg, about 20 mg, about 21 mg, about 22 mg, about 23 mg, about 24 mg, about 25 mg, about 26 mg, about 27 mg, about 28 mg, about 30 mg, about 30 mg, about 31 mg, about 32 mg, about 33 mg, about 34 mg, about 35 mg, about 36 mg, about 37 mg, about 38 mg, about 39 mg, about 40 mg, about 41 mg, about 42 mg, about 43 mg, about 44 mg, about 45 mg, about 46 mg, about 47 mg, about 48 mg, about 49 mg, about 50 mg, about 51 mg, about 52 mg, about 53 mg, about 54 mg, about 55 mg, about 56, about 57 mg, about 58 mg, about 59 mg, about 60 mg, about 61 mg, about 62 mg, about 63 mg, about 64 mg, about 65 mg, about 66 mg, about 67 mg, about 68 mg, about 69 mg, about 70 mg, about 71 mg, about 72 mg, about 73 mg, about 74 mg, about 75 mg, about 76 mg, about 77 mg, about 78 mg, about 79 mg, about 80 mg, about 81 mg, about 82 mg, about 83 mg, about 84 mg, about 85 mg, about 86 mg, about 87 mg, about 88 mg, about 89 mg, about 90 mg, about 90 mg, about 91 mg, about 92 mg, about 93 mg, about 94 mg, about 95 mg, about 96 mg, about 97 mg, about 98 mg, about 99 mg, about 100 mg, about 110 mg, about 120 mg, about 130 mg, about 140 mg, about 150 mg, about 160 mg, about 170 mg, about 180 mg, about 190 mg, about 200 mg, about 210 mg, about 220 mg, about 230 mg, about 240 mg, about 250 mg, about 260 mg, about 270 mg, about 280 mg, about 290 mg, about 300 mg, about 310 mg, about 320 mg, about 330 mg, about 340 mg, about 350 mg, about 360 mg, about 370 mg, about 380 mg, about 390 mg, about 400 mg, about 410 mg, about 420 mg, about 430 mg, about 440 mg, about 450 mg, about 460 mg, about 470 mg, about 480 mg, about 490 mg, about 500 mg, about 550 mg, about 600 mg, about 650 mg, about 700 mg, about 750 mg, about 800 mg, about 850 mg, about 900 mg, about 950 mg, about 1,000 mg, about 1,050 mg, about 1,100 mg, about 1,150 mg, about 1,200 mg, about 1,250 mg, about 1,300 mg, about 1,350 mg, about 1,400 mg, about 1,450 mg, about 1,500 mg, about 1,550 mg, about 1,600 mg, about 1,650 mg, about 1,700 mg, about 1,750 mg, about 1,800 mg, about 1,850 mg, about 1,9000 mg, about 1,950 mg, about 2,000 mg, about 2,100 mg, about 2,200 mg, about 2,300 mg, about 2,400 mg, 2,500 mg, 2,600 mg, 2,700 mg, about 2,800 mg, about 2,900 mg, or about 3,000 mg.

Vitamin E content values can also be expressed as ranges, for example: about 7.5 mg to about 3,000 mg, about 8 mg to about 3,000 mg, about 9 mg to about 3,000 mg, about 10 mg to about 3,000 mg, about 25 mg to about 3,000 mg, about 50 mg to about 3,000 mg, about 75 mg to about 3,000 mg, about 100 mg to about 3,000 mg, about 250 mg to about 3,000 mg, about 500 mg to about 3,000 mg, about 750 mg to about 3,000 mg, about 1,000 mg to about 3,000 mg, about 1,500 mg to about 3,000 mg, about 2,000 mg to about 3,000 mg, about 2,100 mg to about 3,000 mg, about 2,200 mg to about 3,000 mg, about 2,300 mg to about 3,000 mg, about 2,400 mg to about 3,000 mg, about 2,500 mg to about 3,000 mg, about 2,600 mg to about 3,000 mg, about 2,700 mg to about 3,000 mg, about 2,800 mg to about 3,000 mg, about 2,900 mg to about 3,000 mg, about 2,950 mg to about 3,000 mg, about 7.5 mg to about 2,900 mg, about 7.5 mg to about 2,800 mg, about 7.5 mg to about 2,700 mg, about 7.5 mg to about 2,600 mg, about 7.5 mg to about 2,500 mg, about 7.5 mg to about 2,400 mg, about 7.5 mg to about 2,300 mg, about 7.5 mg to about 2,200 mg, about 7.5 mg to about 2,100 mg, about 7.5 mg to about 2,000 mg, about 7.5 mg to about 1,750 mg, about 7.5 mg to about 1,500 mg, about 7.5 mg to about 1,250 mg, about 7.5 mg to about 1,000 mg, about 7.5 mg to about 750 mg, about 7.5 mg to about 500 mg, about 7.5 mg to about 250 mg, about 7.5 mg to about 100 mg, about 7.5 mg to about 75 mg, about 7.5 mg to about 50 mg, about 7.5 mg to about 25 mg, about 7.5 mg to about 15 mg, about 7.5 mg to about 14 mg, about 7.5 mg to about 13 mg, about 7.5 mg to about 12 mg, about 7.5 mg to about 11 mg, about 7.5 mg to about 10 mg, about 7.5 mg to about 9 mg, or about 7.5 mg to about 8 mg.

In any of the foregoing embodiments, the composition can include Vitamin K at about 0.045 mg, about 0.046 mg, about 0.047 mg, about 0.048 mg, about 0.049 mg, about 0.050 mg, about 0.051 mg, about 0.052 mg, about 0.053 mg, about 0.054 mg, about 0.055 mg, about 0.056 mg, about 0.057 mg, 0.058 mg, about 0.059 mg, about 0.060 mg, about 0.061 mg, about 0.062 mg, about 0.063 mg, about 0.064 mg, about 0.065 mg, about 0.066 mg, about 0.067 mg, 0.068 mg, about 0.069 mg, about 0.070 mg, about 0.071 mg, about 0.072 mg, about 0.073 mg, about 0.074 mg, about 0.075 mg, about 0.076 mg, about 0.077 mg, 0.078 mg, about 0.079 mg, about 0.080 mg, about 0.091 mg, about 0.092 mg, about 0.093 mg, about 0.094 mg, about 0.095 mg, about 0.096 mg, about 0.097 mg, 0.098 mg, about 0.099 mg, about 0.1 mg, about 0.2 mg, about 0.3 mg, about 0.4 mg, about 0.5 mg, about 0.6 mg, about 0.7 mg, about 0.8 mg, about 0.9 mg, about 1 mg, about 2 mg, about 3 mg, about 4 mg, about 5 mg, about 6 mg, about 7 mg, about 8 mg, about 9 mg, about 10 mg, about 20 mg, about 30 mg, about 40 mg, about 50 mg, about 60 mg, about 70, about 80 mg, 90 mg, about 100 mg, about 150 mg, about 200 mg, about 250 mg, about 300 mg, 350 mg, about 400 mg, about 450 mg, about 500 mg, about 550 mg, about 600 mg, about 650 mg, about 700 mg, about 750 mg, about 800 mg, about 850 mg, about 900 mg, about 950 mg, 1,000 mg, about 1,500 mg, 2,000 mg, about 2,500 mg, about 3,000 mg, about 3,500 mg, about 4,000 mg, about 4,500 mg, about 5,000 mg, about 5,500 mg, about 6,000 mg, about 6,500 mg, about 7,000 mg, about 7,500 mg, about 8,000 mg, about 8,500 mg, about 9,000 mg, about 9,500 mg, about 10,000 mg, about 10,500 mg, about 11,000 mg, about 11,500 mg, about 12,000 mg, about 12,500 mg, about 13,000 mg, about 13,500 mg, about 14,000 mg, about 14,500 mg, about 15,000 mg, about 15,500 mg, 16,000 mg, about 16,500 mg, about 17,000 mg, about 17,500 mg, about 18,000 mg, about 18,500 mg, about 19,000 mg, about 19,500 mg, about 20,000 mg, about 25,000 mg, about 30,000 mg, about 35,000 mg, about 40,000 mg, or about 45,000 mg.

Vitamin K content values can also be expressed as ranges, for example: about 0.045 mg to about 40,500 mg, about 0.05 mg to about 40,500 mg, about 0.075 mg to about 40,500 mg, about 0.1 mg to about 40,500 mg, about 0.25 mg to about 40,500 mg, about 0.5 mg to about 40,500 mg, about 0.75 mg to about 40,500 mg, about 1 mg to about 40,500 mg, about 12.5 mg to about 40,500 mg, about 15 mg to about 40,500 mg, about 20 mg to about 40,500 mg, about 50 mg to about 40,500 mg, about 100 mg to about 40,500 mg, about 500 mg to about 40,500 mg, about 1,000 mg to about 40,500 mg, about 2,500 mg to about 40,500 mg, about 5,000 mg to about 40,500 mg, about 7,500 mg to about 40,500 mg, about 10,000 mg to about 40,500 mg, about 12,500 mg to about 40,500 mg, about 15,000 mg to about 40,500 mg, about 17,500 mg to about 40,500 mg, about 20,000 mg to about 40,500 mg, about 22,500 mg to about 40,500 mg, about 25,000 mg to about 40,500 mg, about 27,500 mg to about 40,500 mg, about 30,000 mg to about 40,500 mg, about 31,000 mg to about 40,500 mg, about 32,000 mg to about 40,500 mg, about 33,000 mg to about 40,500 mg, about 34,000 mg to about 40,500 mg, about 35,000 mg to about 40,500 mg, about 36,000 mg to about 40,500 mg, about 37,000 mg to about 40,500 mg, about 38,000 mg to about 40,500 mg, about 39,000 mg to about 40,500 mg, about 39,250 mg to about 40,500 mg, about 39,500 mg to about 40,500 mg, about 39,750 mg to about 40,500 mg, about 40,000 mg to about 40,500 mg, about 40,100 mg to about 40,500 mg, about 40,200 mg to about 40,500 mg, about 40,300 mg to about 40,500 mg, about 40,400 mg to about 40,500 mg, about 0.045 mg to about 40,000 mg, about 0.045 mg to about 39,000 mg, about 0.045 mg to about 38,000 mg, about 0.045 mg to about 37,000 mg, about 0.045 mg to about 35,000 mg, about 0.045 mg to about 32,500 mg, about 0.045 mg to about 30,000 mg, about 0.045 mg to about 25,000 mg, about 0.045 mg to about 20,000 mg, about 0.045 mg to about 10,000 mg, about 0.045 mg to about 7,500 mg, about 0.045 mg to about 5,000 mg, about 0.045 mg to about 2,500 mg, about 0.045 mg to about 2,000 mg, about 0.045 mg to about 1,000 mg, about 0.045 mg to about 750 mg, about 0.045 mg to about 500 mg, about 0.045 mg to about 250 mg, about 0.045 mg to about 100 mg, about 0.045 mg to about 75 mg, about 0.045 mg to about 50 mg, about 0.045 mg to about 25 mg, about 0.045 mg to about 10 mg, about 0.045 mg to about 5 mg, about 0.045 mg to about 1 mg, about 0.045 mg to about 0.75 mg, about 0.045 mg to about 0.5 mg, about 0.045 mg to about 0.25 mg, about 0.045 mg to about 0.1 mg, about 0.045 mg to about 0.075 mg, or about 0.045 mg to about 0.05 mg.

In any of the foregoing embodiments, the composition can include choline at about 212.5 mg, about 213 mg, about 213.5 mg, about 214 mg, about 214.5 mg, about 215 mg, about 215.5 mg, about 216 mg, about 216.5 mg, about 217 mg, about 217.5 mg, about 218 mg, about 218.5 mg, about 219 mg, about 219.5 mg, 220 mg, about 221 mg, about 222 mg, about 223 mg, about 224 mg, about 225 mg, about 226 mg, about 227 mg, about 228 mg, about 229 mg, about 230 mg, about 240 mg, about 250, about 260 mg, about 270 mg, about 280 mg, about 290 mg, about 300 mg, 350 mg, about 400 mg, about 450 mg, about 500 mg, about 550 mg, about 600 mg, about 650 mg, about 700 mg, about 750 mg, about 800 mg, about 850 mg, about 900 mg, about 950 mg, 1,000 mg, about 1,500 mg, 2,000 mg, about 2,500 mg, about 3,000 mg, about 3,500 mg, about 4,000 mg, about 4,500 mg, about 5,000 mg, about 5,500 mg, about 6,000 mg, about 6,500 mg, about 7,000 mg, about 7,500 mg, about 8,000 mg, about 8,500 mg, about 9,000 mg, about 9,500 mg, or about 10,000 mg.

Choline content values can also be expressed as ranges, for example: about 212.5 mg to about 10,000 mg, about 212 mg to about 10,000 mg, about 213 mg to about 10,000 mg, about 214 mg to about 10,000 mg, about 215 mg to about 10,000 mg, about 220 mg to about 10,000 mg, about 225 mg to about 10,000 mg, about 250 mg to about 10,000 mg, about 275 mg to about 10,000 mg, about 300 mg to about 10,000 mg, about 400 mg to about 10,000 mg, about 500 mg to about 10,000 mg, about 750 mg to about 10,000 mg, about 1,000 mg to about 10,000 mg, about 2,000 mg to about 10,000 mg, about 3,000 mg to about 10,000 mg, about 4,000 mg to about 10,000 mg, about 5,000 mg to about 10,000 mg, about 6,000 mg to about 10,000 mg, about 7,000 mg to about 10,000 mg, about 8,000 mg to about 10,000 mg, about 9,000 mg to about 10,000 mg, about 9,100 mg to about 10,000 mg, about 9,200 mg to about 10,000 mg, about 9,300 mg to about 10,000 mg, about 9,400 mg to about 10,000 mg, about 9,500 mg to about 10,000 mg, about 9,600 mg to about 10,000 mg, about 9,700 mg to about 10,000 mg, about 9,800 mg to about 10,000 mg, about 9,900 mg to about 10,000 mg, about 9,950 mg to about 10,000 mg, about 212.5 mg to about 9,900 mg, about 212.5 mg to about 9,800 mg, about 212.5 mg to about 9,700 mg, about 212.5 mg to about 9,600 mg, about 212.5 mg to about 9,500 mg, about 212.5 mg to about 9,400 mg, about 212.5 mg to about 9,300 mg, about 212.5 mg to about 9,200 mg, about 212.5 mg to about 9,100 mg, about 212.5 mg to about 9,000 mg, about 212.5 mg to about 8,000 mg, about 212.5 mg to about 7,000 mg, about 212.5 mg to about 6,000 mg, about 212.5 mg to about 5,000 mg, about 212.5 mg to about 4,000 mg, about 212.5 mg to about 3,000 mg, about 212.5 mg to about 2,000 mg, about 212.5 mg to about 1,000 mg, about 212.5 mg to about 750 mg, about 212.5 mg to about 500 mg, about 212.5 mg to about 400 mg, about 212.5 mg to about 300 mg, about 212.5 mg to about 290 mg, about 212.5 mg to about 280 mg, about 212.5 mg to about 270 mg, about 212.5 mg to about 260 mg, about 212.5 mg to about 250 mg, about 212.5 mg to about 240 mg, about 212.5 mg to about 230 mg, about 212.5 mg to about 220 mg, about 212.5 mg to about 219 mg, about 212.5 mg to about 218 mg, about 212.5 mg to about 217 mg, about 212.5 mg to about 216 mg, about 212.5 mg to about 215 mg, about 212.5 mg to about 214 mg, or about 212.5 mg to about 213 mg.

5.2 Additives

In some embodiments, the food, beverage, confection, or concentrate composition can comprise one or more additives.

In some embodiments, the compositions may further include sugar acids (e.g., glucuronic acid) and/or sugar alcohols (e.g., inositol). Sugar acids may be selected be from, e.g., glyceric acid, xylonic acid, gluconic acid, ascorbic acid, neuraminic acid, keto-deoxyoctulosonic acid, glucuronic acid, galacturonic acid, iduronic acid, tartaric acid, meso-galactaric acid, D-glucaric acid, or a combination thereof. Sugar alcohols may be selected from, e.g., mannitol, sorbitol, arabitol, threitol, xylitol, ribitol, galactitol, fruitol, iditol, inositol, volemitol, lactitol, malitol, or combinations thereof.

In some embodiments, amino acids may also be included in compositions, L-phenylalanine, L-leucine, L-isoleucine, L-valine, L-arginine, L-histidine, L-aspartic acid, L-glutamic acid, L-serine, L-threonine, L-asparagine, L-glutamine, L-cysteine, L-selenocysteine, glycine, L-proline, L-alanine, L-methionine, L-tyrosine, and/or L-tryptophan.

In some embodiments, the compositions can include amino acid derivatives. Such amino acid derivatives can be, e.g., N-acetyl L-tyrosine, taurine, ornithine, sarcosine, citrulline, norvaline, norleucine, α-aminobutyric acid, hydroxyproline, tert-leucine, cycloleucine, α-aminoisobutyric acid (2-methylalanine), penicillamine, homoserine, or a combination thereof. Additionally, any of various derivatives of the amino acids and amino acid derivatives mentioned above can also be included in the compositions. Examples of these amino acid derivatives include, e.g., special amino acids, non-natural amino acids, amino alcohols, and amino acids one or more of which functional groups such as terminal carbonyl group, terminal amino group, and thiol group in the case of cysteine are substituted with any one or more of various substituents. Specific examples of the substituents include, for example, an alkyl group, an acyl group, hydroxyl group, amino group, an alkylamino group, nitro group, sulfonyl group, and various protective groups. Specific examples of these amino acid derivatives include, e.g., N-γ-nitroarginine, S-nitrocysteine, S-methylcysteine, S-allylcysteine, valinamide, 2-amino-3-methyl-1-butanol (valinol), methionine sulfoxide, and S-methylcysteine sulfoxide.

Some embodiments can comprise natural flavors and/or artificial flavors. Natural flavors can be an essential oil, oleoresin, essence or extractive, protein hydrolysate, distillate, or any product of roasting, fermenting, heating or enzymolysis, which contains the flavoring constituents derived from a spice, fruit or fruit juice, vegetable or vegetable juice, edible yeast, herb, bark, bud, root, leaf or similar plant material, meat, seafood, poultry, eggs, dairy products, or fermentation products thereof, whose significant function in food is flavoring rather than nutritional. Artificial flavors are any substance, the function of which is to impart flavor, which are not derived from a spice, fruit or fruit juice, vegetable or vegetable juice, edible yeast, herb, bark, bud, root, leaf or similar plant material, meat, fish, poultry, eggs, dairy products, or fermentation products thereof. Traditional artificial flavoring such as sodium citrate, ascorbic acid, diacetyl, acetylpropinyl, acetoin, isoamyl acetate, benzaldehyde, cinnamaldehyde, ethyl propionate, methyl anthranilate, limonene, ethyl decadienoate, allyl hexanoate, ethyl maltol, ethylvanillin, methyl salicylate, manazanate, or a combination thereof may be used.

Preservatives may also be included in the compositions. For example, in some embodiments, sodium citrate, potassium sorbate, sodium benzoate, potassium benzoate, ethylenediamine tetraacetic acid (EDTA), calcium disodium EDTA, sorbic acid, sodium metabisulfate, sodium sulfite, sodium nitrite, propyl paraben, butylated hydroxyanisole, butylated hydroxytoluene, citric acid, Vitamin E, Vitamin C, and/or benzoic acid may be included in the composition.

In some embodiments, compositions may further include pH buffer(s), such as potassium phosphate, dipotassium phosphate, potassium hydrophosphate, sodium bicarbonate, sodium citrate, sodium phosphate, disodium phosphate, sodium hydrophosphate, sodium tripolyphosphate, potassium citrate, magnesium citrate, or a combination thereof.

Contemplated compositions may also include nutritional supplements including, but not limited to: magnesium carbonate, potassium phosphate dibasic, ascorbic acid, "super creatine", coenzyme Q10 (CoQ10), citicoline, omega-3 fatty acids (such as, e.g., α-linolenic acid, eicosapentaenoic acid, docosahexaenoic acid, hexadecatrienoic acid, stearidonic acid, eicosatrienoic acid, eicosatetraenoic acid, heneicosapentaenoic acid, docosapentaenoic acid, tetracosapentaenoic acid, tetracosahexanenoic acid), omega-6 fatty acids (such as, e.g., linoleic acid, γ-linolenic acid, calendic acid, eicosadienoic acid, dihomo-γ-linolenic acid, arachidonic acid, docosadienoic acid, adrenic acid, osbond acid, tetracosatetraenoic acid, tetracosapentaenoic acid) lutein, zeaxanthin, L-theanine, fish oil, β-alanine, D-ribose, L-glutathione reduced, citrulline, L-alanyl-L-glutamine, L-hydroxyproline, or a combination thereof.

In some embodiments, the composition includes herbal supplements, e.g., ginseng, milk thistle, guarana, gingko biloba, saw palmetto, green tea, black tea, hoodia gordonii, passion flower, horny goat weed, skullcap, Echinacea, dandelion leaf, St. John's wort, green tea, chamomile, or peppermint, or an extract thereof, or a combination thereof. In some embodiments a recovery supplement for hypoxic exercise, such as L-carnitine L-tartrate, creatine, whey protein, citrulline, curcumin, β-hydroxybutyrate, or a combination thereof is included in the composition. In some embodiments, a detoxifying agent, e.g., D-glucuronolactone, milk thistle, magnesium, diatomaceous earth, glutathione, alpha lipoic acid, superoxide dismutase, N-acetyl cysteine, selenium, or a combination thereof may be included in the composition.

In some embodiments, the composition includes electrolytes, e.g., sodium chloride, sodium acetate, acidic sodium citrate, acidic sodium phosphate, sodium chloride, sodium bicarbonate, sodium bromide, sodium citrate, sodium lactate, sodium molybdate, sodium phosphate, anhydrous sodium sulphate, sodium sulphate, sodium tartrate, sodium benzoate, sodium selenite, potassium chloride, potassium acetate, potassium bicarbonate, potassium bromide, potassium citrate, potassium-D-gluconate, monobasic potassium phosphate, potassium tartrate, potassium sorbate, potassium iodide, magnesium carbonate, magnesium citrate, magnesium oxide, magnesium phosphate, magnesium chloride, calcium chloride, calcium carbonate, calcium chelate, calcium di-phosphate, calcium lactate, calcium phosphate tribasic, or a combination thereof.

In some embodiments, the composition includes colors (e.g., yellow #5, yellow #6, blue #1, blue #2, green #3, red #3, red #40, citrus red 2, orange B, caramel color, quinolone yellow (E104), carmoisine (E122), ponceau 4R (E124), patent blue V (E131), green S (E142), annatto extract, dehydrated beets, β-carotene, grape skin extract, or a combination thereof), gums (e.g., xanthan gum, gum Arabic, ester gum, guar gum, carob gum, gellen gum, cellulose gum, tara gum, or a combination thereof), and/or an emulsifier (e.g., monosodium phosphate, disodium phosphate, dipotassium phosphate, trisodium phosphate, sodium metaphosphate (sodium hexametaphosphate), sodium acid pyrophosphate, tetrasodium pyrophosphate, sodium aluminum phosphate, sodium citrate, potassium citrate, calcium citrate, sodium tartrate, sodium potassium tartrate, or a combination thereof).

In some embodiments, the composition includes a bitter additive, e.g., branched amino acids such as L-leucine, L-Valine or L-isoleucine; quinine HCl and its salts; hesperidin; sucrose octaacetate; quercetin; brucine; quassin; isohumulones; stevia extracts; saccharin; naringin; gustducin; catechin; sesquiterpene lactone; aristolochic acid; phenylthiocarbamide; propylthiouracil; flavones; noscapine; humulone; amarogentin; glucoside; limonin; amarogentin; goitrin; cynaropicrin; quassin; cycloheximide; dipeptides; any other bitter-tasting compounds from vegetables, fruits (for example, naringin and guarana), cocoa (for example, chocolate), cereals, or spices; or a combination thereof.

Contemplated compositions include compositions comprising the combinations of additives and as shown in Table 1 and the corresponding commercial products.

TABLE 1

Commercial energy drink additives. Concentrations are provided in ppm. The letter "X" indicates the presence of an additive in an energy drink at an unspecified concentration.

|  | 5-hour ENERGY ® shot | Bang ® energy drink | Red Bull Energy Drink | Monster Energy drink | Red Bull Sugar Free | Monster Energy Zero Ultra | NOS High Performance Energy Drink | Rockstar Original energy drink |
|---|---|---|---|---|---|---|---|---|
| Vit B1 Thiamin |  |  |  |  |  |  |  |  |
| Vit B2 Riboflavin |  |  |  | 7.19 | 78.9 |  |  | 14.4 |

TABLE 1-continued

Commercial energy drink additives. Concentrations are provided in ppm. The letter "X" indicates the presence of an additive in an energy drink at an unspecified concentration.

| | 5-hour ENERGY ® shot | Bang ® energy drink | Red Bull Energy Drink | Monster Energy drink | Red Bull Sugar Free | Monster Energy Zero Ultra | NOS High Performance Energy Drink | Rockstar Original energy drink |
|---|---|---|---|---|---|---|---|---|
| Vit B3 Niacin | 529 | 10.6 | 50.7 | 84.6 | | 84.6 | | 84.6 |
| Vit B5 Pantothenic acid | | | 19.7 | | 19.7 | 42.3 | | 42.3 |
| Vit B6 Pyridoxine | 705 | 1.06 | 20.3 | 8.46 | 20.3 | 8.46 | 8.46 | 8.46 |
| Vit B7 Biotin | | | | | | | | |
| Vit B9 Folic acid | 7.05 | | | | | | | |
| Vit B12 Cyanocobalamin | 8,805 | 0.0030 | 20.3 | 0.0254 | 0.0203 | 0.0254 | 0.0254 | 0.0254 |
| Malic acid | 10,500 | | | | | | | |
| Citric acid | | 5,600 | X | X | X | X | X | X |
| Taurine | X | | X | X | X | X | X | X |
| Glucuronic acid | X | | | | | | | |
| N-acetyl L tyrosine | X | | | | | | | |
| L-phenylalanine | X | | | | | | | |
| Caffeine | 3,382 | 634 | 322 | 339 | 322 | 296 | 338 | 423 |
| Citicoline | X | | | | | | | |
| Purified water | X | | | | | | | |
| Carbonated water | | X | X | | X | X | X | X |
| Natural and artificial flavors | X | X | | | X | X | | X |
| Natural flavors | | | | X | | | X | |
| Sucralose | X | X | | | | X | X | |
| Potassium sorbate | X | X | | | | | X | |
| Sodium benzoate | X | X | | | | | | |
| EDTA (Calcium disodium) | non-Ca Na | X | | | | | X | |
| Sucrose | | | X | | | | | X |
| Glucose | | | X | | | | | X |
| Sodium bicarbonate | | | X | | X | | | |
| Magnesium carbonate | | | X | | X | | | |
| Colors | | | X | X | X | | | |
| Sodium citrate | | | | X | | X | X | X |
| Potassium citrate | | X | | X | | X | X | X |
| Panax ginseng extract | | | | X | | X | | X |
| L-carnitine L-tartrate | | | | X | | X | | |
| Sorbic acid | | | | X | | X | | X |
| Benzoic acid | | | | X | | X | | X |
| Salt | | | | X | | | | |
| D-glucuronolactone | | | | X | | | | X |
| Inositol | | | | X | | X | X | X |
| Guarana extract | | | | X | | | X | X |
| Maltodextrin | | | | X | | | | |
| Acesulfame K | | X | | | X | X | | |
| Aspartame | | | | | X | | | |
| Xanthan gum | | | | | X | | | |
| Erythritol | | | | | | X | | |
| HFCS | | | | | | | X | |
| Sodium hexametaphosphate | | | | | | | X | |
| Gum Arabic | | | | | | | X | |
| Ester gum | | | | | | | X | |
| Yellow #5 | | | | | | | X | |
| Yellow #6 | | | | | | | X | |
| Caramel color | | | | | | | | X |
| L-carnitine | | | | | | | | X |
| Milk thistle extract | | | | | | | | X |
| L-leucine | | X | | | | | | |
| Potassium phosphate dibasic | | X | | | | | | |
| Ascorbic acid | | 63.4 | | | | | | |

TABLE 1-continued

Commercial energy drink additives. Concentrations are provided in ppm. The letter "X" indicates the presence of an additive in an energy drink at an unspecified concentration.

|  | 5-hour ENERGY® shot | Bang® energy drink | Red Bull Energy Drink | Monster Energy drink | Red Bull Sugar Free | Monster Energy Zero Ultra | NOS High Performance Energy Drink | Rockstar Original energy drink |
|---|---|---|---|---|---|---|---|---|
| Calcium chloride |  | X |  |  |  |  |  |  |
| Magnesium chloride |  | X |  |  |  |  |  |  |
| Super creatine |  | X |  |  |  |  |  |  |
| L-isoleucine |  | X |  |  |  |  |  |  |
| L-valine |  | X |  |  |  |  |  |  |
| CoQ10 |  | X |  |  |  |  |  |  |

6 Food, Beverage, and Confection Applications

Below are non-limiting examples of food, beverages, and confections that may be the composition used in the disclosed methods. For example, processed fruits and fruit juices, including all commercially processed fruits, citrus, berries, and mixtures; salads; juices and juice punches; concentrates; dilutions; "ades"; and drink substitutes made therefrom may include up to about 0.25% (2,500 ppm) 1,3-propanediol, in some embodiments biologically-produced 1,3-propanediol, by weight.

Other suitable compositions include beverages such as coffee, cocoa, tea (e.g., black tea, green tea, oolong tea etc.); beverages containing milk components such as milk, coffee drinks, milk tea, fruit milk beverages, or drinkable yogurt; or kombucha.

Contemplated compositions further include dairy products including butter, yogurt, cheese, cottage cheese, sour cream, whipping cream, and frozen desserts (e.g. ice cream). For example, Greek yogurt including biologically-produced 1,3-propanediol was found to be less bitter and sweeter than without the biologically-produced 1,3-propanediol. Vanilla yogurt was less bitter and somewhat sweeter with biologically-produced 1,3-propanediol than without.

Packaged foods, such as drink mixes, dressings, dried soups, cake mix, soft drinks, popcorn, food coloring, fast foods, and breads may also include 1,3-propanediol, in some embodiments biologically-produced 1,3-propanediol, to improve taste and/or off-taste or otherwise modulate the taste of those products.

In other embodiments, the composition is a sherbet. Confections, such as cakes, crackers, biscuits, rice cakes and snacks are also contemplated. Chewing gum, hard candy, soft candy, mints, nougat, jelly beans, and other candies may also be used in the methods disclosed herein. Sauces including fruit flavored sauces, chocolate sauces and the like may also be used as the composition. Jams, including strawberry jam, raspberry jam, blackberry jam, and marmalade, for example may include biologically-produced 1,3-propanediol as a taste modulator. Biologically-produced 1,3-propanediol may improve taste and/or off-taste in condiments including soy sauce, tomato catsup, mustard, and savory sauces. Broth, canned or frozen vegetables, canned meats or seafood, processed meat products (e.g., sausage), pickles, preserves boiled, snacks (e.g., potato chips, cookies), or cereal products are all contemplated.

The food compositions may further include a food or food component consisting of one or more food additives. Further, a food composition includes human food, substances migrating to food from food-contact articles, beverages, pet food, and animal feed compositions.

A "food additive" includes any additive that can be used in a food composition. In some embodiments, an additive is of appropriate food grade, is prepared and handled as a food additive, and/or the quantity of the additive added to food does not exceed the amount reasonably required to accomplish the intended physical, nutritional, or other technical effect in food.

In addition, esters can function as many of the above noted additives. While those having skill in the art can readily determine which esters are most appropriate to provide a particularly desired function, esters used may include the esters produced, including all the appropriate conjugate mono and diesters, from 1,3-propanediol, in some embodiments biologically-produced 1,3-propanediol, using organic carboxylic acids. Some esters in particular that are produced include propanediol distearate and monostearate, propanediol dilaurate and monolaurate, propanediol dioleate and monooleate, propanediol divalerate and monovalerate, propanediol dicaprylate and monocaprylate, propanediol dimyristate and monomyristate, propanediol dipalmitate and monopalmitate, propanediol dibehenate and monobehenate, propanediol diadipate, propanediol dimaleate, propanediol dioxalate, propanediol dibenzoate, propanediol diacetate, and all mixtures thereof.

The food compositions can contain any natural additives where appropriate. Natural additives include any natural or nature-derived additives similar in composition or in function to any of the additives listed above.

While this disclosure has been particularly shown and described with reference to example embodiments thereof, it will be understood by those skilled in the art that various changes in form and details may be made therein without departing from the scope encompassed by the appended claims.

Applicants specifically incorporate the entire content of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope be limited to the specific values recited when defining a range.

The following examples are intended only for illustration and are not intended to limit the scope defined by the claims.

EXAMPLES

Example 1

The objectives of the studies presented herein are to:
1. Obtain sensorial descriptions, including the levels of unpleasant flavors, or off-taste, for bitter additive, sweetener(s), sour additive, and vitamin B complex in commercial energy drinks purchased from a Publix supermarket or a QuikTrip gas station store.
2. Determine the extent to which biologically-produced 1,3-propanediol or propylene glycol reduce the unpleasant tastes, or mask the off-taste, of caffeine, malic acid, sucralose, and vitamin B complex individually in aqueous solutions at their levels in off-tasting commercial products and in commercial energy drinks.
3. Evaluate the reduction in unpleasant tastes at different concentrations of biologically-produced 1,3-propanediol and propylene glycol to determine the effective concentrations of each.

The most popular energy drink products were selected and are listed in Table 2 with the other materials used in these studies.

TABLE 2

List of materials.

| Material | Supplier | Description | Comments |
|---|---|---|---|
| 5-hour Energy shot | Living Essentials | Berry Flavor | Lot # 227418D5 Exp D:10/20 |
| 5-hour Energy shot | Living Essentials | Orange Flavor | Lot # 220518P8 Exp D:07/20 |
| Red Bull Energy Drink | Red Bull NA | — | Lot # 10-30-20/f 2 1682984/09:55 |
| Monster Energy Original drink | Monster Beverage | — | Lot # L1819L3CF 21:19 |
| Red Bull Sugar-Free drink | Red Bull NA | — | Lot # 08/16/19 U6 6 161721885 01:57 |
| Monster Energy Zero Ultra drink | Monster Beverage | — | Lot # L183CCF 01:26 |
| NOS Energy drink | Monster Beverage | — | Lot # A1905CV 09282 |
| Rockstar Original drink | Rockstar | — | Lot # AZP006-19 05:29 |
| Bang Energy drink | Vital Pharma | Blue Razz flavor | Lot # Best By 031420 TP2 0828 |

Results

Sensorial Description of Commercial Energy Drinks.

The sensorial descriptions for each commercial energy drink by an experienced and trained panelist are presented in Table 3 with the additives and respective daily values provided on the labels. The lists of additives in Table 1 show that the most popular energy drinks contain very high concentrations of caffeine, B vitamins, sweeteners, and sour additive, especially sucralose and citric and/or malic acids, which are known to partially suppress the off-tastes, e.g., bitterness of caffeine and may suppress the bitterness of B vitamins.

TABLE 3

Sensorial description of top selling energy drinks.

| Name | Sensorial Description |
|---|---|
| 5-hour ENERGY ® shot (1.92 fl.oz.) | Extreme sweetness, strong sweet lingering, not pleasant taste quality. |
| Red Bull Energy Drink (12 fl.oz.) | Very strong bubblegum flavor, medium off-taste quality (carbonic acid, bitterness and/or sourness), low sweetness, slight astringent/dry on tongue especially aftertaste. |
| Monster Energy drink (16 fl.oz.) | Very strong carbonation (more than Red Bull control), moderate sweetness, carbonic acid off-taste note, strong flavors including low background of bubblegum flavor, ~10% sweetness equivalent (SE), broad sweet temporal profile, moderate sourness. |
| Red Bull Sugar-Free (12 fl.oz.) | Significantly less bubblegum flavor than its Original drink, strong flavor and bubblegum, significant off-taste - very bitter, low sweetness, first flavor, second bitter and then $3^{rd}$ sourness appearance over tasting time, not good overall tasting quality, less carbonation than Monster Energy Original drink, sign. delayed sweetness (overlapped with sourness), kind of non-strong sweetness intensity. |

TABLE 3-continued

Sensorial description of top selling energy drinks.

| Name | Sensorial Description |
| --- | --- |
| Monster Energy Zero Ultra (16 fl.oz.) | Strong citrus flavor, very broad and strong sweetness, significantly delayed sweet onset, moderate sourness, slight bitter-like aftertaste, very strong but low sweetness lingering aftertaste. |
| NOS High Performance Energy Drink (16 fl.oz.) | Appeared to have moderate carbonation, strong citrus-based flavors, broad but low-medium sweet profile, low-medium sourness, not much bitter, citric acid-like sourness (fast onset and gone), and no taste/flavor lingering. |
| Rockstar Original energy drink (16 fl.oz.) | Strongest carbonation of all energy drinks!, unpleasant flavor, medium-moderate off-flavor, sourness, medium sweetness, bitter, not good overall, has bubblegum flavor in background, not upfront. |
| Bang ® energy drink (16 fl.oz) | No color, clear, very sweet (like 5-hour ENERGY ®), not strong flavor, significant sweet lingering, bitter in middle tasting time, kind of sourness across the taste, slight dry-like/astringent aftertaste (after multi-sipping), slight carbonic acid note, medium carbonation, good overall quality v. 5-hour ENERGY ®. |

Sensorial Description of Samples with Propylene Glycol or Biologically-Produced 1,3-Propanediol.

Biologically-produced 1,3-propanediol or propylene glycol was included in samples at 0.01% (100 ppm), 0.1% (1,000 ppm) and 1.0% (10,000 ppm) as shown in Table 4. Each sample included one of the commercial energy drink products from the previous study (Table 3) or a solution of caffeine, sucralose, and/or malic acid in distilled water. An aqueous solution of berry flavor and a separate aqueous solution of B vitamins having concentrations similar to those that would be found in Berry 5-hour ENERGY® shots were also studied to determine whether propylene glycol or biologically-produced 1,3-propanediol modulated the taste and flavor of each solution.

The sample mixtures were prepared and moderately stirred until the materials were completely dispersed and dissolved at room temperature (RT). The samples were evaluated starting with the controls and then followed by the lowest to highest biologically-produced 1,3-propanediol and propylene glycol levels using the multi-sip-and-swallow taste method described above. The samples were evaluated in duplicate and in various sampling orders against each control sample containing no propylene glycol or 1,3-propanediol. The sampling orders per sample group depending on its taste qualities are shown in Table 4. The protocol included up to a one hour break with distilled water sipping between each sample. The experiments were also performed with and without sipping distilled water before tasting the first sample in a group.

TABLE 4

Tasting order for each sample group.

| Tasting Order | 1 | 2 | 3 | 4 |
| --- | --- | --- | --- | --- |
| Propylene Glycol (PG) | 0% (control) | 0.01% | 0.1% | 1% |
| Biologically-produced 1,3-propanediol (PDO) | 0% (control) | 0.01% | 0.1% | 1% |
| 0.01% | PG | PDO | | |
| 0.1% | PG | PDO | | |
| 1% | PG | PDO | | |
| 0.01% | PDO | PG | | |
| 0.1% | PDO | PG | | |
| 1% | PDO | PG | | |

The sensorial descriptions for each sample by the experienced and trained panelist are presented in Table 5 to Table 25. A "positive taste modulation effect of PDO" was observed when biologically-produced 1,3-propanediol was included in 5-hour ENERGY® shots and Bang® energy drink. The pH of 5-hour ENERGY® shots is 2.85 as measured using a calibrated pH meter, and the concentration of malic acid is about 10,700 ppm as measured using acid and base titration (titration acidity). Sucralose at about 2,000 ppm was determined by rough sweetness comparison of prototypes at various 1,000 ppm increment of sucralose concentrations in the presence of malic acid at known concentration (via titratable acidity) and caffeine at known concentration (via label claim) versus 5HE. Bang® energy drink has a pH of 3.05 and a titration acidity of about 5,700 ppm citric acid. These are mega-doses of malic and citric acid, which exceed their normal sourness threshold or taste quality (for example, extreme sourness), which is believed to partially contribute to the significant off-taste of these products.

This work constitutes the first explorative study comparing the taste-modulating properties of biologically-produced 1,3-propanediol and propylene glycol at three concentrations in commercial energy drinks and aqueous solutions of energy drink additives. This work has yielded several unexpected findings.

Biologically-produced 1,3-propanediol improved the taste quality of 5-hour ENERGY® shots and Bang® energy drinks as shown in bold font in Table 5, Table 12, and Table 13. Without wishing to be bound, the inventors hypothesize that the reduction in unpleasant taste, or improvement in taste, was observed only when biologically-produced 1,3-propanediol was included in 5-hour ENERGY® shots and Bang® energy drink, because these energy drinks contain higher levels of caffeine than the other six most popular energy drinks tested.

Including biologically-produced 1,3-propanediol or propylene glycol in separate caffeine, malic acid, and sucralose solutions did not positively modulate the taste or mask the bitter, off, or sour tastes. Biologically-produced 1,3-propanediol and propylene glycol did not reduce the unpleasant taste, or mask the bitterness of 3,382 ppm or 338 ppm caffeine in distilled water (Table 14 and Table 15).

Including biologically-produced 1,3-propanediol or propylene glycol in a solution of malic acid at 10,500 ppm in distilled water showed no positive taste modulation or sour masking effect (Table 17).

No reduction in unpleasant taste, or masking of off-taste was observed when biologically-produced 1,3-propanediol or propylene glycol was included solutions having 2,000 ppm, 238 ppm, or 70 ppm sucralose in distilled water (Table 18, Table 19, and Table 20). Unexpectedly, less sweetness was perceived with increasing sucralose concentration in the presence of propylene glycol or biologically-produced 1,3-propanediol at similar levels.

Biologically-produced 1,3-propanediol and propylene glycol did not positively modulate aqueous solutions of B vitamins at concentrations in distilled water that are comparable to the B vitamin concentrations in 5-hour ENERGY® shots (Table 16).

Neither biologically-produced 1,3-propanediol, nor propylene glycol modulated the flavor of the berry flavor in distilled water as shown in Table 21. These results were surprising in view of the perception of 'less flavor' in some commercial samples. These results suggest that mega-dose tastes in combination with mega-doses of malic acid, sucralose, and caffeine may alter or confuse the taste and/or flavor perceptual results.

Surprisingly, a blend of two out of three taste additives (sweet, sour, bitter) at high concentrations in distilled water that correspond to the high concentration of each component in 5-hour ENERGY® shots revealed positive taste modulation, or a reduction of unpleasant tastes when biologically-produced 1,3-propanediol was included in the three additive solution as compared to the solution with propylene glycol (Table 22). Another unexpected finding is that is the most positive taste modulation effect, or reduction in unpleasant tastes, due to including biologically-produced 1,3-propanediol in the composition occurred in solutions containing a blend of two taste additives. These results were particularly striking in the two additive solutions containing malic acid (Table 23 and Table 24) as compared to the solutions without malic acid (Table 25).

Omitting a step of sipping distilled water before evaluating a sample in the protocol yielded lower positive tasting qualities of the samples with propylene glycol or biologically-produced 1,3-propane diol than the protocol that included a step of first sipping distilled water. These observations suggest that saliva could factor into the sensorial description results.

The order of comparing samples that include propylene glycol and biologically-produced 1,3-propanediol also affected the sensorial description results. When first sampling three additive solutions (malic acid, sucralose, and caffeine) having biologically-produced 1,3-propanediol before comparison to samples containing propylene glycol, a better overall tasting quality was observed in the samples having biologically-produced 1,3-propanediol than propylene glycol at similar levels. However, when the sampling order was reversed, propylene glycol-containing samples were sampled before biologically-produced 1,3-propanediol-containing samples, no tasting quality differences were observed. These results suggest that propylene glycol may have a carry-over effect in the mouth to the other samples without propylene glycol and/or was not completely flushed out by saliva.

In the taste tests of the two additive malic acid and sucralose solutions, the direct comparison of biologically-produced 1,3-propanediol to propylene glycol revealed that the biologically-produced 1,3-propanediol-containing samples exhibited better tasting qualities than those with propylene glycol. In contrast, sampling the propylene glycol-containing samples before the biologically-produced 1,3-propanediol-containing samples revealed that the biologically-produced 1,3-propanediol-containing samples tasted marginally better than the propylene glycol-containing samples. Differences in taste perception were also observed depending on whether distilled water was sipped before the sample. When distilled water was sipped prior to sipping the samples containing propylene glycol at 0.01 and 0.1%, these samples exhibited a very similar taste quality to the samples containing the corresponding concentrations of biologically-produced 1,3-propanediol but without prior distilled water sipping. When distilled water was sipped before the samples that included biologically-produced 1,3-propanediol, these samples clearly exhibited stronger, positive tasting qualities and intensity in terms of sourness, over sweetness, and were more similar to the control without propylene glycol or biologically-produced 1,3-propanediol. The control exhibited a similar tasting quality regardless of whether distilled water was sipped before the control samples. Without wishing to be bound, the inventors hypothesize that propylene glycol may have more saliva protein interactions that cause the tasting quality to display a "big finish" that changes the overall tasting quality to compare unfavorably to samples that include biologically-produced 1,3-propanediol. Another non-limiting hypothesis is that biologically-produced 1,3-propanediol has more direct effect on the taste receptors' downstream mechanism than propylene glycol. See Yu et al., Protein Sci. 25:433-41 (2016). In sum, including biologically-produced 1,3-propanediol in these compositions has demonstrated a positive taste modulation effect, especially of the sourness of compositions that have mega-doses of malic acid.

In the taste tests of the two additive caffeine and malic acid solutions, direct comparison of samples containing biologically-produced 1,3-propanediol and propylene glycol exhibited no differences at 0.01%, but at 0.1% the sample containing biologically-produced 1,3-propanediol had less overall bitterness than the propylene glycol-containing sample. However, the biologically-produced 1,3-propanediol-containing sample also seemed to have less overall sourness, because the bitterness lingered. Repeat tests with the same sampling order have shown that the 0.1% biologically-produced 1,3-propanediol containing samples exhibit less sourness but not less bitterness, indicating a very tricky taste perception and high sensory protocol sensitivity. In contrast, when propylene glycol-containing samples were tasted first, the samples that included 0.1% and 0.1% biologically-produced 1,3-propanediol seemed to have less off-taste bitterness than the propylene glycol containing samples. Consequently, the positive taste modulation of 0.1% biologically-produced 1,3-propanediol was observed more frequently than for propylene glycol at the levels studied. Thus, including about 0.1% biologically-produced 1,3-propane diol in the compositions yielded the most consistent reduction in unpleasant taste/masking off-tastes.

Including 1% biologically-produced 1,3-propanediol sometimes imparted a smoke and/or off-flavor (shown in underlined text in the tables below). This smoky off-flavor taste became apparent in the two additive caffeine and sucralose solutions as shown in Table 25. Subsequent retests in similar and different formulations, however, revealed no repeated smoky off-flavor observation.

This off-flavor was also apparent in the 1.0% biologically-produced 1,3-propanediol solutions containing malic acid with caffeine and/or sucralose. Without wishing to be bound, the inventors hypothesize that the biologically-produced 1,3-propane diol is unlikely to react with malic acid or to have a low pH effect. Rather, the inventors hypothesize that the biologically-produced 1,3-propanediol could be reacting/interacting with saliva, and that mega-doses of malic acid suppress this reaction/interaction with saliva, taste receptors, and/or brain interaction factors. Surprisingly, the 1.0% biologically-produced 1,3-propanediol and 10,500 ppm malic acid solution in distilled water did not present any expected off-flavor, indicating that the intense sourness may cause the brain to overload and, thus, limit or mask any of the brain's flavor activation/recognition or minimize any reactions of biologically-produced 1,3-propanediol in the sample solution and/or in the mouth with saliva.

TABLE 5

Sensorial description of distilled water (DW) and Berry 5-hour ENERGY ® shot (5HE Berry) with 0.01% to 1.0% propylene glycol (PG) or 1,3-propanediol (PDO) at room temperature (RT).

| | Sample | PG | PDO | Sensorial Description |
|---|---|---|---|---|
| 1 | DW | | | Tasteless, weak dry aftertaste. |
| 2 | 5HE Berry | | | Extreme sweetness, (+~20% SE), very strong sweet lingering, not pleasant taste quality. No recognized bitterness other than off-taste qualities. |
| 3 | 5HE Berry | 0.01% | | Similar to Control #2, slight bitterness especially later and aftertaste to show up, appeared to slight reduce sweet - hard to measure due to over 10% SE. |
| 4 | 5HE Berry | 0.1% | | Significantly less sweet and aftertaste and sweet lingering than 0.01% PG, slight-medium bitterness/sourness mixture across the taste, not pleasant. |
| 5 | 5HE Berry | 1.0% | | Began to show more sourness across the taste, still overall not pleasant (bad flavor perception) and appeared to be 'off-taste' sourness. |
| 6 | 5HE Berry | | 0.01% | Similar to Control #2, slight bitterness especially later and aftertaste to show up, but different taste qualities, slight better than PG at 0.01%. |
| 7 | 5HE Berry | | 0.1% | Significantly better tasting quality than 0.1% PG, less bitterness, appeared to be just sourness, improved positive tasting quality. Much better in overall than Control #2 and PG. |
| 8 | 5HE Berry | | 1.0% | Similar bad flavor perception as 1.0% PG, no bitterness, less or no 'off-taste' sourness than 1.0% PG. Better taste overall than PG at 1.0% by far. |

TABLE 6

Sensorial description of distilled water (DW) and Red Bull Energy Drink (Red Bull) with 0.01% to 1.0% propylene glycol (PG) or 1,3-propanediol (PDO) at room temperature (RT).

| | Sample | PG | PDO | Sensorial Description |
|---|---|---|---|---|
| 1 | DW | | | Tasteless, weak dry aftertaste. |
| 9 | Red Bull | | | Carbonated, very strong bubblegum flavor, medium off-taste (carbonic acid, bitterness, sourness), low sweetness, slight astringent or dry on tongue especially aftertaste. |
| 10 | Red Bull | 0.01% | | Much better taste quality overall significantly less off-tastes than Control #9, still astringent/dry on tongue and aftertaste, slight less bubblegum flavor. |
| 11 | Red Bull | 0.1% | | Note: Loss of carbonation. Medium flavor level, less astringent/dry off-taste but not completely, slightly more bubblegum flavor than 0.01% PG, better overall taste quality. Prepared fresh (full carbonation): Weak/slight but not best flavor quality of bubblegum flavor, significantly less or no astringent/dry aftertaste than 0.01% PG. |
| 12 | Red Bull | 1.0% | | Note: significantly less or no carbonation. Low bubblegum flavor, kind of polarized flavor (blank-like but bubblegum flavor background), no off-taste. Prepared fresh sample (full carbonation): significantly less bubblegum flavor, weak astringent/dry aftertaste, no polarized bubblegum flavor. |

TABLE 6-continued

Sensorial description of distilled water (DW) and Red Bull Energy Drink (Red Bull) with 0.01% to 1.0% propylene glycol (PG) or 1,3-propanediol (PDO) at room temperature (RT).

| | Sample | PG | PDO | Sensorial Description |
|---|---|---|---|---|
| 13 | Red Bull | | 0.01% | Better taste overall and less off taste than 0.01% PG, significantly less bubblegum than Control #9 and slight less flavor than 0.01% PG, significantly less astringent/dry effect than 0.01% PG. |
| 14 | Red Bull | | 0.1% | Note: Significant loss of carbonation. Still slight-medium bubblegum flavor, no off-taste of ast./dry, better tasting quality than 0.01% PDO. Prepared fresh (full carbonation): weak but good bubblegum flavor quality, similar astringent/dry aftertaste as 0.1% PG, better flavor quality than 0.1% PG. |
| 15 | Red Bull | | 1.0% | Note: significantly less or no carbonation. <u>Significant off flavor</u>, low bubblegum flavor - same as 1.0% PG, taste awful due off-flavor. Prepared fresh sample (full carbonation): Off flavor significant, similar ast./dry aftertaste as 1.0% PG. |

TABLE 7

Sensorial description of distilled water (DW) and Monster Energy drink (Monster) with 0.01% to 1.0% propylene glycol (PG) or 1,3-propanediol (PDO) at room temperature (RT).

| | Sample | PG | PDO | Sensorial Description |
|---|---|---|---|---|
| 1 | DW | | | Tasteless, weak dry aftertaste. |
| 16 | Monster | | | Very strong carbonation (more than Red Bull control #9), moderate sweetness, carbonic acid off-taste note, strong flavors including low background of bubblegum flavor, ~10% SE, broad sweet temporal profile, moderate sourness. |
| 17 | Monster | 0.01% | | Note: Loss of carbonation. Significantly less carbonic acid off-taste, strong flavors, moderate sweetness, ~8-9%, significantly less sourness than Control #16. |
| 18 | Monster | 0.1% | | Note: Loss of carbonation. Similar carbonic acid off-taste as 0.01% PG, ~8-9% SE, not much difference but more smooth tasting quality than PG 0.01%, significantly less sourness but still sourness than 0.01% PG. |
| 19 | Monster | 1.0% | | Note: Little carbonation. Little or no sourness, very flat taste quality. |
| 20 | Monster | | 0.01% | Note: Loss of carbonation. No carbonic acid off-taste, strong flavors, very smooth quality, good sourness but significantly less sourness than Control #16. |
| 21 | Monster | | 0.1% | Note: Loss of carbonation. Similar to 0.01% PDO, significant less sourness intensity but good sourness quality than 0.01% PDO, more flat taste quality. |
| 22 | Monster | | 1.0% | Note: Little carbonation. <u>Significant undescribed off-flavor at later time, not acceptable other than in respect of other taste qualities.</u> Has little sourness. |

TABLE 8

Sensorial description of distilled water (DW) and Red Bull Sugar Free with 0.01% to 1.0% propylene glycol (PG) or 1,3-propanediol (PDO) at room temperature (RT).

| | Sample | PG | PDO | Sensorial Description |
|---|---|---|---|---|
| 1 | DW | | | Tasteless, weak dry aftertaste. |
| 23 | Red Bull Sugar Free | | | Significantly less bubblegum flavor than its Original drink, strong flavor and bubblegum, significant off-taste - very bitter, low sweetness, first flavor, second bitter and then $3^{rd}$ sourness appearance over tasting time, not good overall tasting quality, less carbonation than Monster Energy Original drink, significantly delayed sweetness (overlapped with sourness), kind of non-strong sweetness intensity. |
| 24 | Red Bull Sugar Free | 0.01% | | Significantly less off-tastes, still different off-taste quality, not pleasant, significantly less sourness, med-mod flavor. |
| 25 | Red Bull Sugar Free | 0.1% | | Flatter, smoothness, still different off-taste as 0.01% PG, medium flavor. |
| 26 | Red Bull Sugar Free | 1.0% | | Medium off-flavor (not described) in middle tasting time, little sourness, no better quality. |
| 27 | Red Bull Sugar Free | | 0.01% | Much better overall tasting quality, significantly less off-taste (not as much as 0.01% PG but different off-tastes), still flavor and sourness (med-mod). Best quality. |
| 28 | Red Bull Sugar Free | | 0.1% | Flatter than 0.01% PDO, low-med flavor, low-med sourness, low sweetness? |
| 29 | Red Bull Sugar Free | | 1.0% | Off flavor, flatter, blank background sourness? In middle tasting time, not acceptable. |

TABLE 9

Sensorial description of distilled water (DW) and Monster Energy Zero Ultra (Monster Zero Ultra) with 0.01% to 1.0% propylene glycol (PG) or 1,3-propanediol (PDO) at room temperature (RT).

| | Sample | PG | PDO | Sensorial Description |
|---|---|---|---|---|
| 1 | DW | | | Tasteless, weak dry aftertaste. |
| 30 | Monster Zero Ultra | | | Strong citrus flavor, very broad and strong sweetness, significantly delayed sweet onset, moderate sourness, slight bitter-like aftertaste, very strong but low sweetness lingering aftertaste. |
| 31 | Monster Zero Ultra | 0.01% | | Significant less off-taste, less sourness, significantly less flavor, significantly less sweetness intensity, significantly less sweet linger, little bitterness. |
| 32 | Monster Zero Ultra | 0.1% | | More smooth tasting quality, less sourness, no bitter, less flavor. |
| 33 | Monster Zero Ultra | 1.0% | | Very smooth, flat tasting quality of basic tastes, no bitter, no sweet lingering, still sourness, moderate flavor. |
| 34 | Monster Zero Ultra | | 0.01% | Significantly less off-taste, still strong sweetness and its lingering, moderate sourness. Vs 0.01% PG - more similar but better sourness quality and/or intensity than PG. |
| 35 | Monster Zero Ultra | | 0.1% | More suitable tasting quality (less than 1% but more than 0.01%, significantly less sourness, sweet and their lingering. |
| 36 | Monster Zero Ultra | | 1.0% | Smoother, medium off flavor at middle tasting time, not pleasant and acceptable, still sweet (medium) and sweet lingering, less sourness than PG, but similar flavor and sweet. |

TABLE 10

Sensorial description of distilled water (DW) and NOS High Performance Energy Drink (NOS) with 0.01% to 1.0% propylene glycol (PG) or 1,3-propanediol (PDO) at room temperature (RT).

|    | Sample | PG    | PDO   | Sensorial Description |
|----|--------|-------|-------|------------------------|
| 1  | DW     |       |       | Tasteless, weak dry aftertaste. |
| 37 | NOS    |       |       | Appeared to be moderate carbonation, strong citrus-based flavor, broad but low-medium sweet profile, low-medium sourness, not much bitter, citric acid-like sourness (fast onset and then gone), nothing lingering including flavor. |
| 38 | NOS    | 0.01% |       | Significantly less sourness and flavor, less sweet. |
| 39 | NOS    | 0.1%  |       | No bitterness, smoother, still flavor and sweet, less sourness than 0.01% PG. |
| 40 | NOS    | 1.0%  |       | Smoother than 0.1% PG, low-medium flavor, low sweetness, no sourness? |
| 41 | NOS    |       | 0.01% | Less Sweet, smoother, no off-taste, significant less sourness. Similar qualities as 0.01% PG. |
| 42 | NOS    |       | 0.1%  | More smoothness, weak sourness, still flavor and sweet, slightly better overall tasting quality than 0.1% PG. |
| 43 | NOS    |       | 1.0%  | Off-flavor in middle taste, no or low sourness, not acceptable, smoother than 0.1% PDO. |

TABLE 11

Sensorial description of distilled water (DW) and Rockstar Original energy drink (Rockstar) with 0.01% to 1.0% propylene glycol (PG) or 1,3-propanediol (PDO) at room temperature (RT).

|    | Sample   | PG    | PDO   | Sensorial Description |
|----|----------|-------|-------|------------------------|
| 1  | DW       |       |       | Tasteless, weak dry aftertaste. |
| 44 | Rockstar |       |       | Strongest carbonation of all energy drinks, unpleasant flavor, medium-moderate off-flavor, sourness, medium sweetness, bitter, not good overall, has bubblegum flavor in background, not upfront. |
| 45 | Rockstar | 0.01% |       | Clearer off-flavor than sweet/sour, less sourness but still broad, not good overall. |
| 46 | Rockstar | 0.1%  |       | Still off-flavor but less, little sourness across, not good overall, slight sourness lingering. |
| 47 | Rockstar | 1.0%  |       | Slight off-flavor (seems like PDO's off flavor), little or no sourness, slight sourness lingering, not good. |
| 48 | Rockstar |       | 0.01% | Slight off-flavor, significantly less sourness, still sourness/dry-like lingering, similar sourness quality as 0.01% PG, clearly less off-flavor intensity than 0.01% PG. |
| 49 | Rockstar |       | 0.1%  | Weak (less) off-flavor, similar sourness quality as 0.1% PG, clearly less off-flavor intensity than 0.1% PG. |
| 50 | Rockstar |       | 1.0%  | Similar to 1.0% PG, clearly more off-flavor intensity than 1.0% PG, but not much more intensity compared to past samples with 1.0% PDO. |

TABLE 12

Sensorial description of distilled water (DW) and Bang ® energy drink (Bang) with 0.01% to 1.0% propylene glycol (PG) or 1,3-propanediol (PDO) at room temperature (RT).

|    | Sample | PG | PDO | Sensorial Description |
|----|--------|----|----|------------------------|
| 1  | DW     |    |    | Tasteless, weak dry aftertaste. |
| 51 | Bang   |    |    | No color, clear, very sweet (like 5HE), not strong flavor, significant sweet lingering, bitter in middle tasting time, kind of sourness across the taste, slight dry-like/astringent aftertaste (after multi-sipping), slight carbonic acid note, medium carbonation, good overall quality vs 5HE and other drinks. |

TABLE 12-continued

Sensorial description of distilled water (DW) and Bang ® energy drink (Bang) with 0.01% to 1.0% propylene glycol (PG) or 1,3-propanediol (PDO) at room temperature (RT).

| | Sample | PG | PDO | Sensorial Description |
|---|---|---|---|---|
| 52 | Bang | 0.01% | | Significantly less sweet and its lingering but still moderate sweet lingering, good but still moderate sweet quality, significantly less sourness, little or no bitterness. |
| 53 | Bang | 0.1% | | Similar tasting quality to 0.01% PG, repeated - confirmed, less sourness than 0.01% PG - that's it. Similar on other taste qualities. |
| 54 | Bang | 1.0% | | Similar tasting quality as 0.1% PG, little or no sourness. |
| 55 | Bang | | 0.01% | Still slow onset sourness, less sweetness (more sourness over sweetness), still sweet lingering, significantly more but good sourness than 0.01% PG, better tasting quality than 0.01% PG. |
| 56 | Bang | | 0.1% | Significantly less sourness and sweetness, smoother, still sweet lingering, significantly more but good sourness and better tasting quality than 0.1% PG. |
| 57 | Bang | | 1.0% | Slight and low off-flavor at middle tasting time, low sweetness, still low but still sweet lingering, significantly more but good sourness than 1.0% PG. |

TABLE 13

Sensorial description of distilled water (DW) and Orange 5-hour ENERGY ® shot (5HE Orange) with 0.01% to 1.0% propylene glycol (PG) or 1,3-propanediol (PDO) at room temperature (RT).

| | Sample | PG | PDO | Sensorial Description |
|---|---|---|---|---|
| 1 | DW | | | Tasteless, weak dry aftertaste. |
| 58 | 5HE Orange | | | Little to no orange aroma, strong orange flavor taste, bitter comes right after flavor peak, then both super sweet and sourness, moderate sourness lingering (and/or bitter lingering), not pleasant. |
| 59 | 5HE Orange | 0.01% | | Significantly less flavor and bitterness, still strong sourness and sweetness across the taste. |
| 60 | 5HE Orange | 0.1% | | Less flavor, no bitterness, still strong sourness but less sweetness across taste. |
| 61 | 5HE Orange | 1.0% | | Less flavor, sourness and sweetness, still moderate sourness. |
| 62 | 5HE Orange | | 0.01% | Not significantly less flavor, tasted better than 0.01% PG, moderate sourness, less sweetness, weak bitterness in middle tasting time, better sourness quality than 0.01% PG, more pleasant. |
| 63 | 5HE Orange | | 0.1% | Less flavor but still good flavor taste, slightly less but still moderate sourness, less sweet, no bitter, better sourness taste quality and more sourness intensity than 0.1% PG, more pleasant. |
| 64 | 5HE Orange | | 1.0% | Slight or faint off-flavor in background (non-offensive or non-identifying description), little orange flavor, no bitterness, less sweetness, still moderate sourness. |

TABLE 14

Sensorial description of 3,338 ppm caffeine in distilled water (caffeine shot) with 0.01% to 1.0% propylene glycol (PG) or 1,3-propanediol (PDO) at room temperature (RT).

| | Sample | PG | PDO | Sensorial Description |
|---|---|---|---|---|
| 65 | caffeine shot | | | (small sip): extreme bitterness throughout the mouth and tongue, very strong bitterness lingering and hard to get rid of it. |

TABLE 14-continued

Sensorial description of 3,338 ppm caffeine in distilled water (caffeine shot) with 0.01% to 1.0% propylene glycol (PG) or 1,3-propanediol (PDO) at room temperature (RT).

|    | Sample | PG | PDO | Sensorial Description |
|----|--------|-----|------|----------------------|
| 66 | caffeine shot | 0.01% | | (small sip): similar to Control #65. |
| 67 | caffeine shot | 0.1% | | (small sip): similar to Control #65. |
| 68 | caffeine shot | 1.0% | | (small sip): similar to Control #65, no PG taste (likely due to massive bitterness taste). |
| 69 | caffeine shot | | 0.01% | (small sip): similar to Control #65. |
| 70 | caffeine shot | | 0.1% | (small sip): similar to Control #65. |
| 71 | caffeine shot | | 1.0% | (small sip): similar to Control #65, slightly modified flavor taste (non-description). |

TABLE 15

Sensorial description of 338 ppm caffeine in distilled water (caffeine drink) with 0.01% to 1.0% propylene glycol (PG) or 1,3-propanediol (PDO) at room temperature (RT).

|    | Sample | PG | PDO | Sensorial Description |
|----|--------|-----|------|----------------------|
| 72 | caffeine drink | | | Slow onset of bitterness especially on tongue, slight to medium bitterness intensity and lingering, hard to get rid of its aftertaste. |
| 73 | caffeine drink | 0.01% | | Looked similar to Control #72. |
| 74 | caffeine drink | 0.1% | | Similar to Control #72. |
| 75 | caffeine drink | 1.0% | | Worst quality, more bitterness, medium intensity, slight to medium PG taste. |
| 76 | caffeine drink | | 0.01% | Similar to Control #72. |
| 77 | caffeine drink | | 0.1% | Stronger bitterness intensity to medium level. |
| 78 | caffeine drink | | 1.0% | Off-flavor taste, delayed onset of bitterness. |

TABLE 16

Sensorial description of B vitamins at concentrations found in 5-hour Energy shots in distilled water (B vitamins) with 0.01% to 1.0% propylene glycol (PG) or 1,3-propanediol (PDO) at room temperature (RT).

|    | Sample | PG | PDO | Sensorial Description |
|----|--------|-----|------|----------------------|
| 79 | B vitamins | | | Almost tasteless, slightly dry aftertaste on tongue (due to DW?). |
| 80 | B vitamins | 0.01% | | Similar to Control #79. |
| 81 | B vitamins | 0.1% | | Similar to Control #79. |
| 82 | B vitamins | 1.0% | | PG flavor taste, similar other qualities as Control #79. |
| 83 | B vitamins | | 0.01% | Slightly different from Control (upfront smooth-like) but nearly similar to Control. |
| 84 | B vitamins | | 0.1% | Similar to 0.01% PDO. |
| 85 | B vitamins | | 1.0% | Slight-medium off-flavor note, similar to 0.1% PDO. |

TABLE 17

Sensorial description of 10,500 ppm malic acid in distilled water (malic acid) with 0.01% to 1.0% propylene glycol (PG) or 1,3-propanediol (PDO) at room temperature (RT).

| | Sample | PG | PDO | Sensorial Description |
|---|---|---|---|---|
| 86 | malic acid | | | Extreme sourness, clean sourness quality, slightly dry on the tongue at later tasting time but not off-taste. |
| 87 | malic acid | 0.01% | | Similar to Control #68 at $2^{nd}$ sip; first sip - less sourness. |
| 88 | malic acid | 0.1% | | Similar to Control #68 at $2^{nd}$ sip; first sip - less sourness. |
| 89 | malic acid | 1.0% | | Similar to Control #68 at $2^{nd}$ sip; first sip - less sourness; weak PG taste note. |
| 90 | malic acid | | 0.01% | Similar to Control #68 at $2^{nd}$ sip; first sip - less sourness. |
| 91 | malic acid | | 0.1% | Similar to Control #68 at $2^{nd}$ sip; first sip - less sourness. |
| 92 | malic acid | | 1.0% | No off-flavor for sure, however possible Invisible-like flavor (non-description). Similar quality as 0.1% PDO. |

TABLE 18

Sensorial description of 2,000 ppm sucralose in distilled water (sucralose) with 0.01% to 1.0% propylene glycol (PG) or 1,3-propanediol (PDO) at room temperature (RT).

| | Sample | PG | PDO | Sensorial Description |
|---|---|---|---|---|
| 93 | sucralose | | | (small sip): Extremely sweet, extremely strong sweet lingering, slow onset of sweetness, strongest at later time, kind of off-taste sweet intensity at sweet peak. Based on prior DW sipping. W/O prior DW sipping showed less taste quality than with prior DW sipping of this sample. |
| 94 | sucralose | 0.01% | | (small sip): Significantly less sweetness and lingering, ~40% less at $1^{st}$ half of the taste time, appeared to come back strong at later time (aftertaste). |
| 95 | sucralose | 0.1% | | (small sip): Less overall sweet quality including $2^{nd}$ half of tasting time, ~10-20% less than 0.01% PG, still medium to moderate sweet lingering. |
| 96 | sucralose | 1.0% | | (small sip): Similar to 0.1% PG. Repeated tests confirmed this and 0.01% PG. Still medium-moderate sweet lingering after 5 min-still there-hard to get rid of it. |
| 97 | sucralose | | 0.01% | (small sip): Similar results as 0.01% PG. Direct comparison with PG w/o DW sipping showed similar tasting qualities. With prior DW sipping: clean and significant improvement of sweet tasting quality, ~45% more SE. |
| 98 | sucralose | | 0.1% | (small sip): Significantly improved sugar-like tasting quality of SUL. Significantly more sweetness equivalence than 0.01% PDO. BUT that result was due to DW sip prior to sip this sample. Direct comparison with PG w/o DW sipping showed similar tasting qualities. With prior DW sipping: clean and significant improvement of sweet tasting quality, ~45% more SE. |
| 99 | sucralose | | 1.0% | (small sip): off-flavor chemical-like note (plastic-like), then the rest of sweet tasting quality similar to PDO at 0.1%, no SUL high intensity off-taste. |

TABLE 19

Sensorial description of (10% Sweetness Equivalents ("SE")) 238 ppm sucralose in distilled water (sucralose) with 0.01% to 1.0% propylene glycol (PG) or 1,3-propanediol (PDO) at room temperature (RT).

| Sample | | PG | PDO | Sensorial Description |
|---|---|---|---|---|
| 100 | sucralose | | | 10% SE, delayed onset of sweetness, very sweet, slight thin sweet tasting quality throughout, still sweet lingering around the mouth - not on tongue. |
| 101 | sucralose | 0.01% | | 6-7% SE, significantly less sweet, still sweet lingering around the mouth, not on the tongue. |
| 102 | sucralose | 0.1% | | ~5-6% SE, slightly less sweetness, appeared to be less lingering. Questionable or still similar to 0.01% SE PG |
| 103 | sucralose | 1.0% | | Slight PG taste, sweet smoother, ~5-6% SE or 10% SE. |
| 104 | sucralose | | 0.01% | Appeared to be a kind of thinner of sweetness that perceived less SE. Direct comparison with PG - not much difference. |
| 105 | sucralose | | 0.1% | Still slightly more sweetness, thinner but still ~9-10%, still moderate sweet lingering. Direct comparison with PG - not much difference. |
| 106 | sucralose | | 1.0% | Off-flavor, thinner-like or chemical-like note, similar other qualities to 0.1% PDO. |

TABLE 20

Sensorial description of (5% SE) 79 ppm sucralose in distilled water (sucralose) with 0.01% to 1.0% propylene glycol (PG) or 1,3-propanediol (PDO) at room temperature (RT).

| Sample | | PG | PDO | Sensorial Description |
|---|---|---|---|---|
| 107 | sucralose | | | Comfortably 5% SE sweet, good sweet quality across the board, not bad sweet lingering (low). |
| 108 | sucralose | 0.01% | | Less sweet at 1$^{st}$ sip but 2nd sip - back to normal as Control #107 - very clear results. |
| 109 | sucralose | 0.1% | | Similar effect and quality as 0.01% PG. |
| 110 | sucralose | 1.0% | | Weak PG taste note, similar sweet quality. |
| 111 | sucralose | | 0.01% | Same as 0.01% PG results. |
| 112 | sucralose | | 0.1% | Similar results as 0.1% PG. |
| 113 | sucralose | | 1.0% | Significant off-flavor note, chemical-like note, similar sweet quality. |

TABLE 21

Sensorial description of Berry flavor in distilled water with 0.01% to 1.0% propylene glycol (PG) or 1,3-propanediol (PDO) at room temperature (RT).

| Sample | | PG | PDO | Sensorial Description |
|---|---|---|---|---|
| 114 | berry flavor | | | Strong berry aroma, berry flavor taste, slight dry on tongue and its aftertaste (due to DW). |
| 115 | berry flavor | 0.01% | | Less dry than Control #114, slight less flavor. |
| 116 | berry flavor | 0.1% | | Less dry than 0.01% PG, slight less flavor. |
| 117 | berry flavor | 1.0% | | Less dry than Control #114, slight less flavor. |
| 118 | berry flavor | | 0.01% | No dry taste effect, slight less flavor. |
| 119 | berry flavor | | 0.1% | Less dry than 0.01% PDO, slight less flavor. |
| 120 | berry flavor | | 1.0% | Moderate chemical-like off-flavor at later tasting time, similar quality as 1.0% PG. |

TABLE 22

Sensorial description of 10,500 ppm malic acid; 2,000 ppm sucralose; and 3,338 ppm caffeine in distilled water with 0.01% to 1.0% propylene glycol (PG) or 1,3-propanediol (PDO) at room temperature (RT).

|     | Sample | PG | PDO | Sensorial Description |
| --- | --- | --- | --- | --- |
| 121 | malic acid sucralose caffeine | | | No bitterness, just good quality but strong sourness and sweet overlapping over time, suspected kind of significant off-taste background but unidentified due to strong sweet and sourness. |
| 122 | malic acid sucralose caffeine | 0.01% | | Noticed change in sourness quality, the rest looked to be the same as Control #121, significantly thinner quality, not pleasant sourness quality (due to less sweetness), significantly less sourness quality than in PDO. |
| 123 | malic acid sucralose caffeine | 0.1% | | Similar effect as 0.01% PG but less. The rest looked the same as Control #121, some kind of thinner sourness quality. |
| 124 | malic acid sucralose caffeine | 1.0% | | Stronger, thinner sourness quality. |
| 125 | malic acid sucralose caffeine | | 0.01% | Significantly less sweet intensity, less and different sourness quality, both still at moderate levels, significantly better and more sourness quality than 0.01% PG. |
| 126 | malic acid sucralose caffeine | | 0.1% | Less sweetness and sourness than 0.01% PDO but still high, significantly better and more sourness quality than 0.1% PG, best sourness quality of all. |
| 127 | malic acid sucralose caffeine | | 1.0% | Very weak off-flavor note, thinner sourness, less sweetness but still high. |

TABLE 23

Sensorial description of 10,500 ppm malic acid and 2,000 ppm sucralose in distilled water with 0.01% to 1.0% propylene glycol (PG) or 1,3-propanediol (PDO) at room temperature (RT).

|     | Sample | PG | PDO | Sensorial Description |
| --- | --- | --- | --- | --- |
| 128 | malic acid sucralose | | | Super sweetness and sourness, VERY clean and good sweetness and sourness qualities (Unlike MA + SUL + CAF samples), significant sweet lingering. |
| 129 | malic acid sucralose | 0.01% | | Less sweetness and sourness intensities (different sourness quality than Control #128), but still high, very sweet lingering. Not better than 0.01% PDO. |
| 130 | malic acid sucralose | 0.1% | | Similar but slightly less on both sweet and sour intensities, similar taste qualities as Control #128. |
| 131 | malic acid sucralose | 1.0% | | PF taste note, similar qualities as 0.1% PG. |
| 132 | malic acid sucralose | | 0.01% | Little to no sweetness and sourness, similar sweetness/sourness taste qualities as Control #128. But still better taste quality than 0.01% PG. |
| 133 | malic acid sucralose | | 0.1% | Significant taste quality change in regard to sourness quality but still good (significantly better than 0.1% PG), less sweet but still high sweetness. Seems to display 'less' sweetness than 'less' sourness in 0.1% PDO, not in 0.01% PDO. Best taste quality, better than 0.1% PG. |
| 134 | malic acid sucralose | | 1.0% | Weak off-flavor across the taste, similar qualities of sweet and sour as 0.1% PDO. |

TABLE 24

Sensorial description of 10,500 ppm malic acid and 3,338 ppm caffeine in distilled water with 0.01% to 1.0% propylene glycol (PG) or 1,3-propanediol (PDO) at room temperature (RT).

| | Sample | PG | PDO | Sensorial Description |
|---|---|---|---|---|
| 135 | malic acid caffeine | | | (Very small sip): extreme bitterness, more so than sourness; sourness lingering, also off-taste-like sourness lingering and quality. |
| 136 | malic acid caffeine | 0.01% | | (Very small sip): similar to Control #135. |
| 137 | malic acid caffeine | 0.1% | | (Very small sip): similar to Control #135. |
| 138 | malic acid caffeine | 1.0% | | (Very small sip): similar to Control #135, slight PG taste note. |
| 139 | malic acid caffeine | | 0.01% | (Very small sip): similar to Control #135. |
| 140 | malic acid caffeine | | 0.1% | (Very small sip): Less bitterness. (Confirmed in repeated tests), similar sourness as Control #135. |
| 141 | malic acid caffeine | | 1.0% | (Very small sip): weak off-flavor, similar quality to but less bitterness than Control. |

TABLE 25

Sensorial description of 2,000 ppm sucralose and 3,338 ppm caffeine in distilled water with 0.01% to 1.0% propylene glycol (PG) or 1,3-propanediol (PDO) at room temperature (RT).

| | Sample | PG | PDO | Sensorial Description |
|---|---|---|---|---|
| 142 | sucralose caffeine | | | Super sweet. Sweet intensity over time was more evident than bitterness (not really pure bitterness, more like unpleasant off-taste note), that off-taste is not pleasant, Sweet lingering (off-taste was gone). |
| 143 | sucralose caffeine | 0.01% | | Slightly different taste quality, hard to describe specifically, appeared to be slight less off-taste note. Strong sweet lingering. Direct taste of PG vs PDO: 0.01 PDO tasted slightly better than PG and at 0.1% not much difference. |
| 144 | sucralose caffeine | 0.1% | | Significantly less off-taste note than Control #142, strong sweet lingering but less than 0.01% PG. Hard to tell if less sweet but likely slightly less sweetness. Strong sweet lingering outside tongue. |
| 145 | sucralose caffeine | 1.0% | | Appeared to have slightly more off-taste but maybe similar to 0.1% PG. Appeared to be significantly less sweet than Control because slightly more off-taste quality. Strong sweet lingering outside tongue. |
| 146 | sucralose caffeine | | 0.01% | Significantly less off-taste, slightly less or less sweetness than Control #142. Direct taste of PDO vs PG: 0.01 PDO tasted better than PG and at 0.1% not much difference. |
| 147 | sucralose caffeine | | 0.1% | More off-taste note than PDO 0.01%. But less sweetness than 0.01% PDO, strong sweet lingering outside tongue. |
| 148 | sucralose caffeine | | 1.0% | Smoky flavor across the taste, more off-flavor note than 0.1% PDO, strong sweet linger on outside tongue. |

For the first time, biologically-produced 1,3-propanediol has been shown to modulate the taste of beverages having concentrated complex taste qualities. These results are unexpected at least in part due to the fact that neither propylene glycol, nor biologically-produced 1,3-propanediol modulated the taste of single additive caffeine, malic acid, and sucralose solutions at their mega-dose levels. These results indicate that there might be a potential interaction between 1,3-propanediol and saliva, strong and different taste additives, taste receptors/mechanisms under concentrated matrix systems, and/or with the brain response.

The positive effect of biologically-produced 1,3-propanediol within the 9,900 ppm range studied suggests that the reduction in unpleasant flavors is limited to the concentration range from about 0.01% (100 ppm) to about 0.1% (1,000 ppm). Increasing the concentration of the biologically-produced 1,3-propanediol to 1.0% (10,000 ppm) yielded no further improvement in taste perception, and in some instances introduced a smoky off-flavor. This suggests a maximum useful biologically-produced 1,3-propanediol concentration of 0.5% (5,000 ppm) across a broad range of food, beverage, and confection compositions.

The inventors further hypothesize that interaction between biologically-produced 1,3-propanediol and potassium sorbate, sodium benzoate, and/or EDTA (e.g., EDTA, calcium disodium EDTA) may also reduce unpleasant tastes. The combination of 1,3-propanediol and salts, umami additives, bitter sweeteners, and other sour additives are also expected to positively modulate tastes/reduce unpleasant tastes.

Example 2—Descriptive Analysis of 5 Hour Energy (5HE) SHOT Prototype Drinks (with & without bioPDO)

Two 5HE SHOT prototype drinks were assessed (with & without bioPDO), 5HE shot prototype without bioPDO-Sample #1A and 5HE shot prototype with bioPDO—Sample #1B. All samples were served to panelists at ambient temperature 20±2° C.

Sensory Panel

A qualified descriptive panel of 8 panelists, experienced in the sensory analysis of a range of products, was used for this research.

Descriptive Analysis Protocol

The protocol for descriptive analysis was divided into two distinct phases. 1) During the panel orientation phase, panelists tasted the samples and formulated a lexicon of descriptive taste, mouthfeel, aftertaste and after feel attributes to describe them. A final list of 3 taste, 3 mouthfeel, 3 aftertaste and 1 after feel attributes were determined (Table 26). During the sample testing phase, which took place over 2 separate days, the products were evaluated in triplicate (total evaluations n=24).

All samples were coded with randomly selected three-digit codes, and 30 ml was served 'blind' to panelists in clear shot cups. Before each session and to ensure caffeine ingestion levels were not exceeded, all panelists practiced and confirmed that sips of less than 5 ml were taken. Each panelist was provided with low mineral bottled water as a palate cleanser between samples and had a ten-minute break between samples.

Following consumption of the 1st sip, panelists assessed the attribute 'initial harshness mouthfeel'. The remaining attributes (including 'harshness mouthfeel') were then measured by panelists on the 2nd sip. Aftertaste/feel attributes were measured 30 seconds after ingestion of the 2nd sip. The following tasting protocol was used by panelists throughout:

Rinse mouth with water and swallow.
Take 1st sip and immediately evaluate the attribute 'initial harshness mouthfeel'.
Wait 10 seconds from 1st sip and take 2nd sip.
Evaluate attributes ('sweet taste', 'sour taste', 'bitter taste', 'harshness mouthfeel' an 'astringent mouthfeel').
30 seconds after 2nd sip evaluate attributes ('sweet aftertaste', 'sour aftertaste', 'bitter aftertaste', and 'drying after feel').
Rinse with water.

The sensory attributes of the products were scored on unstructured 10 cm line scales labelled at both ends with extremes of each descriptive term. A list of definitions for each of the attributes included in the final vocabulary was also available to each panelist. Assessments were conducted at the certified ISO9001 sensory laboratory at SRL in the University College Cork, Ireland.

Data Analysis

Panel scores from descriptive sensory analysis were subjected to Analysis of Variance (ANOVA) and reported at a significance the level of $p \leq 0.1$, $p \leq 0.05$ & $p \leq 0.01$ (90%, 95% & 99% confidence) respectively to determine which terms were effective at differentiating between the prototypes.

TABLE 26

Descriptive vocabulary and definitions used by the panelists to evaluate the sensory characteristics of the samples

| Attribute | Evaluation time: | Definition: |
| --- | --- | --- |
| Initial harsh mouthfeel | Evaluated immediately following $1^{st}$ sip | An aggressive, penetrating mouthfeel. |
| Sweet taste | Evaluated immediately following $2^{nd}$ sip | The basic sweet taste associated with sugar substitute. |
| Sour taste | | The basic sour taste associated with citric acid. |
| Bitter taste | | The basic bitter taste associated with caffeine. |
| Harsh mouthfeel | | An aggressive, penetrating mouthfeel. |
| Astringent mouthfeel | | The complex of drying, puckering and shrinking sensations in the oral cavity causing contraction of the body tissues. |
| Sweet aftertaste | Evaluated 30 seconds after $2^{nd}$ sip | The basic sweet taste associated with sugar substitute. |
| Sour aftertaste | | The basic sour taste associated with citric acid. |
| Bitter aftertaste | | The basic bitter taste associated with caffeine. |
| Drying after feel | | Perception of dryness left in the mouth. |

Results

Figure 2:
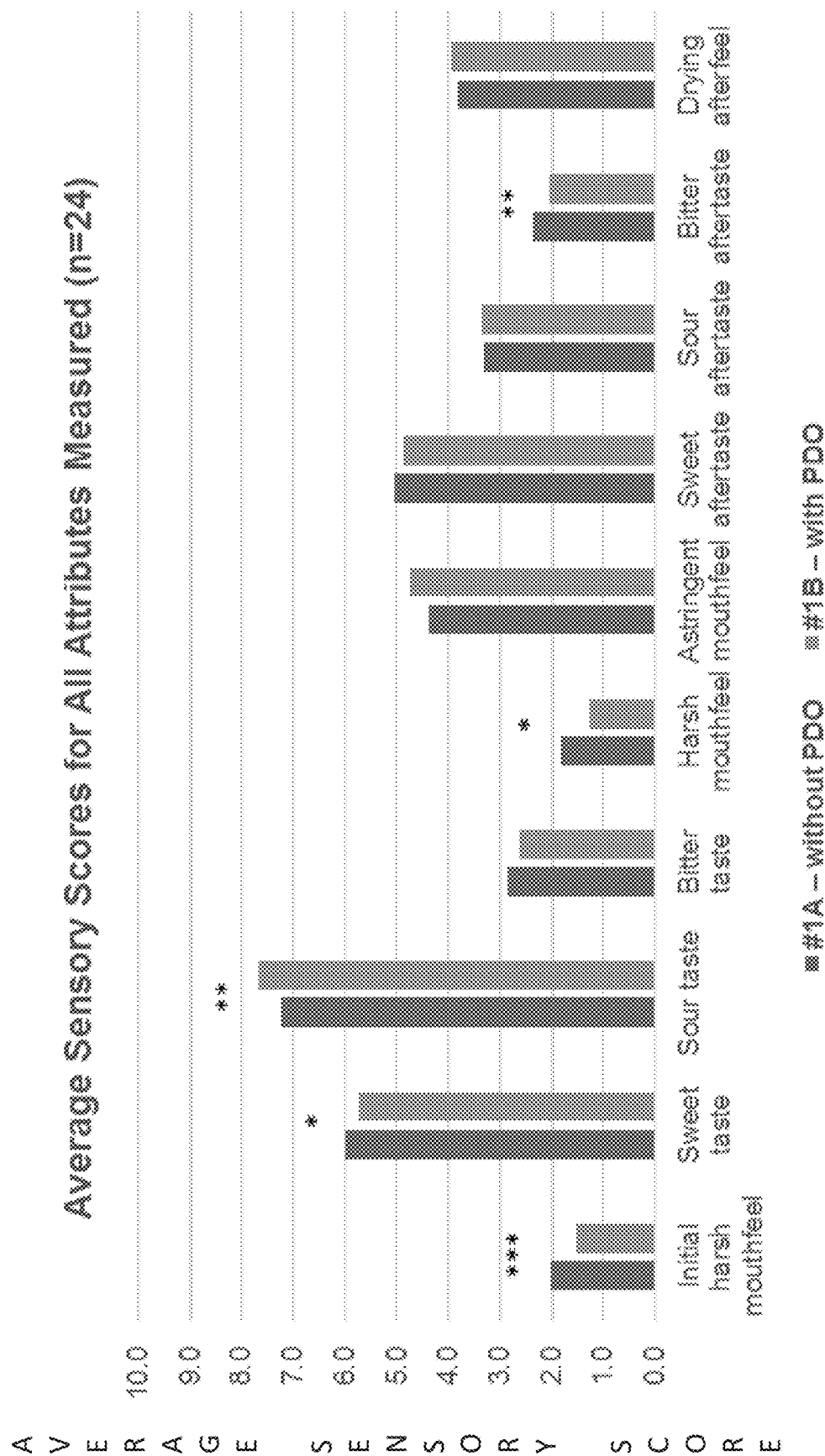
FIG. 2 shows a bar graph illustration of the average sensory scores for all attributes measured in Example 2 (n=24). *Significantly different at p≤0.1 (90% confidence). Significantly different at p≤0.05 (95% confidence. *Significantly different at p≤0.01 (99% confidence). Left bar without bioPDO, right bar with bioPDO.

Table 27 shows the average sensory scores (n=24) for the 10 attributes measured for the two samples. Following on from this table, the attributes are graphically illustrated (FIGS. 1 and 2).

Key Points

The panelists differentiated between the samples in terms of 2 of the 10 attributes measured at 90% confidence, 2 of the attributes measured at 95% confidence and 1 of the attributes measured at 99% confidence.

Initial Taste (1' Sip):

The samples were differentiated by their harsh mouthfeel. 5HE SHOT prototype without bioPDO had a significantly ($p \leq 0.01$) greater harsh mouthfeel than that of 5HE SHOT prototype with bioPDO.

$2^{nd}$ Sip:

The samples were differentiated by sweet taste measured at 90% confidence. 5HE SHOT prototype without bioPDO was significantly ($p \leq 0.1$) sweeter than that of 5HE SHOT prototype with bioPDO. The samples were differentiated by sour taste measured at 95% confidence. 5HE SHOT prototype without bioPDO was significantly ($p \leq 0.05$) less sour than that of 5HE SHOT prototype with bioPDO. 5HE SHOT prototype without bioPDO was slightly more bitter than that of 5HE SHOT prototype with bioPDO.

Mouthfeel

5HE SHOT prototype without bioPDO had a significantly greater harsh mouthfeel than 5HE SHOT prototype with bioPDO at 1st sip (p≤0.01) and at 2nd sip (p≤0.1). The samples were not significantly differentiated by their astringent mouthfeel. 5HE SHOT prototype with bioPDO was slightly more astringent than 5HE SHOT prototype without bioPDO.

Aftertaste at 30 Seconds

The samples were not significantly differentiated by sweet or sour aftertaste. The aftertaste of 5HE SHOT prototype without bioPDO was slightly sweeter than that of 5HE SHOT prototype with bioPDO. 5HE SHOT prototype without bioPDO was slightly less sour than that of 5HE SHOT prototype with bioPDO. Bitter aftertaste of 5HE SHOT prototype without bioPDO was significantly (p≤0.05) more bitter than that of 5HE SHOT prototype with bioPDO.

After Feel at 30 Seconds

The samples were not differentiated by drying after feel.

TABLE 27

Average sensory scores for all attributes measured

| | Samples | | |
|---|---|---|---|
| Attributes | 5HE SHOT prototype #1A - without bioPDO Scores[1] | 5HE SHOT prototype #1B - with bioPDO | p-value |
| Initial harsh mouthfeel | 2.0 | 1.5 | 0.0020*** |
| Sweet taste | 6.0 | 5.7 | 0.0517* |
| Sour taste | 7.2 | 7.7 | 0.0136** |
| Bitter taste | 2.9 | 2.6 | 0.1023 |
| Harsh mouthfeel | 1.8 | 1.3 | 0.0640* |
| Astringent mouthfeel | 4.4 | 4.7 | 0.1742 |
| Sweet aftertaste | 5.1 | 4.9 | 0.2597 |
| Sour aftertaste | 3.3 | 3.4 | 0.4481 |
| Bitter aftertaste | 2.4 | 2.0 | 0.0286** |
| Drying after feel | 3.8 | 4.0 | 0.2340 |

[1]Average score of 8 panelists measuring attributes on defined 10 cm line scales (n = 24).
*Significantly different at p ≤ 0.1 (90% confidence)
**Significantly different at p ≤ 0.05 (95% confidence)
***Significantly different at p ≤ 0.01 (99% confidence)

Key Findings

The initial harsh mouthfeel measured after the 1st sip (p≤0.01) and 2nd sip (p≤0.1) of 5HE SHOT prototype without bioPDO was significantly greater than that of 5HE SHOT prototype with bioPDO.

5HE SHOT prototype with bioPDO was significantly less sweet (p≤0.1), more sour (p≤0.05) and had significantly less bitter aftertaste ((p≤0.05) than that of 5HE SHOT prototype without bioPDO.

Example 3—Descriptive Analysis of BANG Prototype Drinks (with & without bioPDO)

Two BANG prototype drinks were assessed (with & without PDO), BANG prototype without bioPDO-Sample #2A and BANG prototype with bioPDO—Sample #2B. All samples were served to panelists at ambient temperature 20±2° C.

Sensory Panel

A qualified descriptive panel of 8 panelists, experienced in the sensory analysis of a range of products, was used for this research.

Descriptive Analysis Protocol

The protocol for descriptive analysis was divided into two distinct phases. 1) During the panel orientation phase, panelists tasted the samples and formulated a lexicon of descriptive taste, mouthfeel, aftertaste and after feel attributes to describe them. A final list of 3 taste, 3 mouthfeel, 3 aftertaste and 1 after feel attributes were determined (Table 28). During the sample testing phase, which took place over 2 separate days, the products were evaluated in triplicate (total evaluations n=24).

All samples were coded with randomly selected three-digit codes, and 30 ml was served 'blind' to panelists in clear shot cups. Before each session and to ensure caffeine ingestion levels were not exceeded, all panelists practiced and confirmed that sips of less than 5 ml were taken. Each panelist was provided with low mineral bottled water as a palate cleanser between samples and had a ten-minute break between samples.

Following consumption of the 1st sip, panelists assessed the attribute 'initial harshness mouthfeel'. The remaining attributes (including 'harshness mouthfeel') were then measured by panelists on the 2nd sip. Aftertaste/feel attributes were measured 30 seconds after ingestion of the 2nd sip. The following tasting protocol was used by panelists throughout:

Rinse mouth with water and swallow.

Take 1st sip and immediately evaluate the attribute 'initial harshness mouthfeel'.

Wait 10 seconds from 1st sip and take 2nd sip.

Evaluate attributes ('sweet taste', 'sour taste', 'bitter taste', 'harshness mouthfeel' an 'astringent mouthfeel').

30 seconds after 2nd sip evaluate attributes ('sweet aftertaste', 'sour aftertaste', 'bitter aftertaste', and 'drying after feel').

Rinse with water.

The sensory attributes of the products were scored on unstructured 10 cm line scales labelled at both ends with extremes of each descriptive term. A list of definitions for each of the attributes included in the final vocabulary was also available to each panelist. Assessments were conducted at the certified ISO9001 sensory laboratory at SRL in the University College Cork, Ireland.

Data Analysis

Panel scores from descriptive sensory analysis were subjected to Analysis of Variance (ANOVA) and reported at a significance the level of p≤0.1, p≤0.05 & p≤0.01 (90%, 95% & 99% confidence) respectively to determine which terms were effective at differentiating between the prototypes.

TABLE 28

Descriptive vocabulary and definitions used by the panelists
to evaluate the sensory characteristics of the samples

| Attribute | Evaluation time: | Definition: |
|---|---|---|
| Initial harsh mouthfeel | Evaluated immediately following $1^{st}$ sip | An aggressive, penetrating mouthfeel. |
| Sweet taste | Evaluated immediately following $2^{nd}$ sip | The basic sweet taste associated with sugar substitute. |
| Sour taste | | The basic sour taste associated with citric acid. |
| Bitter taste | | The basic bitter taste associated with caffeine. |
| Harsh mouthfeel | | An aggressive, penetrating mouthfeel. |
| Astringent mouthfeel | | The complex of drying, puckering and shrinking sensations in the oral cavity causing contraction of the body tissues. |
| Sweet aftertaste | Evaluated 30 seconds after $2^{nd}$ sip | The basic sweet taste associated with sugar substitute. |
| Sour aftertaste | | The basic sour taste associated with citric acid. |
| Bitter aftertaste | | The basic bitter taste associated with caffeine. |
| Drying after feel | | Perception of dryness left in the mouth. |

Results

Figure 3:
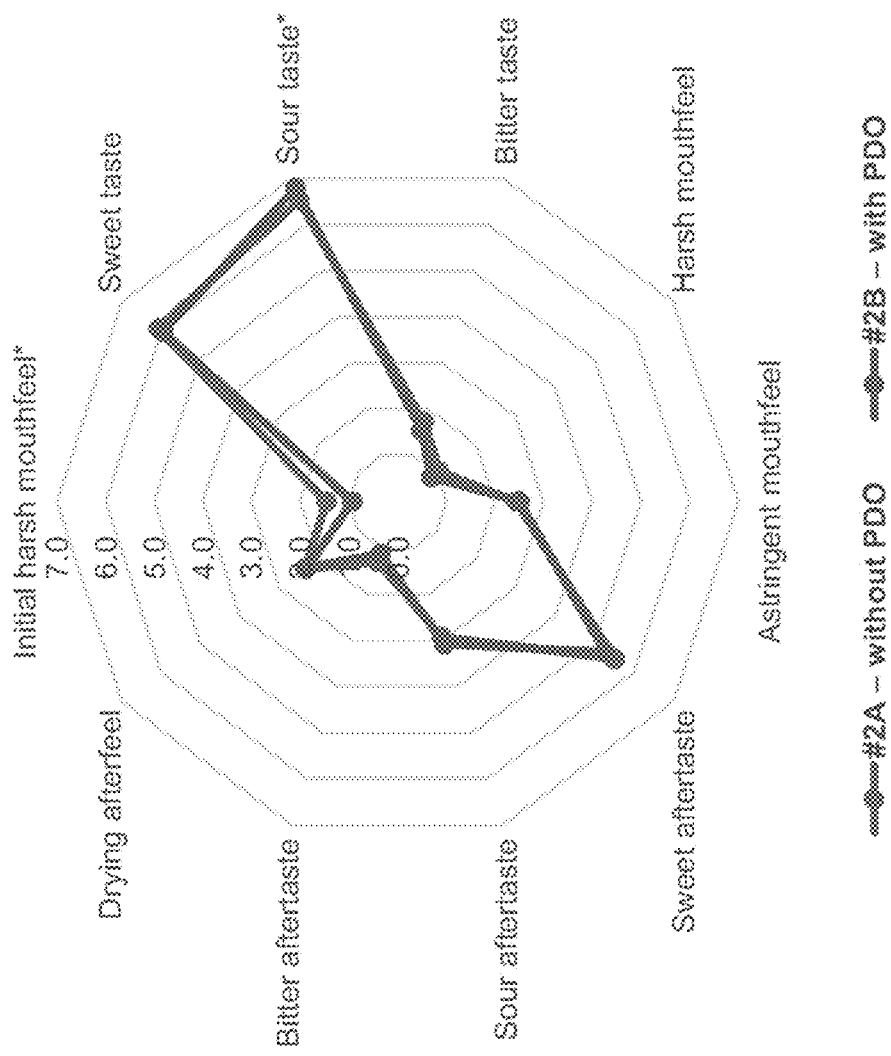
FIG. 3 shows a graphical illustration of the average sensory scores for all attributes measured in Example 3 (n=24). *Significantly different at p≤0.1 (90% confidence). Significantly different at p≤0.05 (95% confidence. *Significantly different at p≤0.01 (99% confidence).
Figure 4:
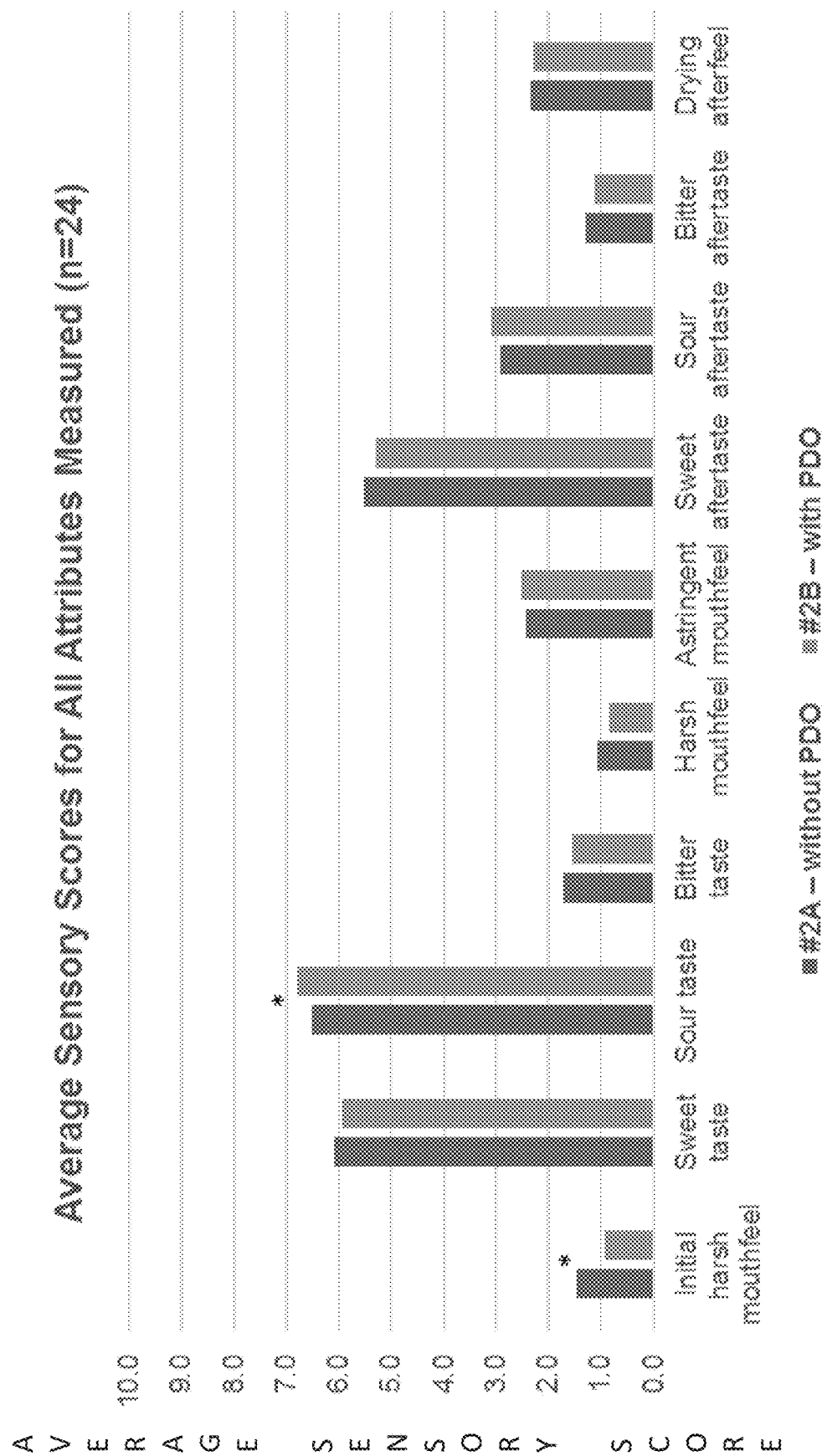
FIG. 4 shows a bar graph illustration of the average sensory scores for all attributes measured in Example 3 (n=24). *Significantly different at p≤0.1 (90% confidence). Significantly different at p≤0.05 (95% confidence. *Significantly different at p≤0.01 (99% confidence). Left bar without bioPDO, right bar with bioPDO.

Table 29 shows the average sensory scores (n=24) for the 10 attributes measured for the two samples. Following on from this table the attributes are graphically illustrated (FIGS. 3 and 4).

Key Points

The panelists differentiated between the samples in terms of 2 of the 10 attributes measured at 90% confidence.

Initial Taste ($1^{st}$ Sip):

The samples were differentiated by their harsh mouthfeel. BANG prototype without bioPDO had a significantly ($p \leq 0.1$) greater harsh mouthfeel than that of BANG prototype with bioPDO.

$2^{nd}$ Sip:

The samples were differentiated by sweet taste measured at 90% confidence. BANG prototype without bioPDO was significantly ($p \leq 0.1$) less sour than that of BANG prototype with bioPDO. Neither sweet nor bitter taste significantly differentiated between the samples. BANG prototype without bioPDO was slightly sweeter than that of BANG prototype with bioPDO. BANG prototype without bioPDO was also slightly more bitter than that of BANG prototype with bioPDO.

Mouthfeel

BANG prototype without bioPDO had a significantly greater harsh mouthfeel than BANG prototype with bioPDO at $1^{st}$ sip and a slightly greater harsh mouthfeel than BANG prototype at $2^{nd}$ sip. The samples were not significantly differentiated by their astringent mouthfeel.

Aftertaste at 30 Seconds

The samples were not significantly differentiated by sweet or sour aftertaste. The sweet aftertaste of BANG prototype without bioPDO was slightly sweeter than that of BANG prototype with bioPDO. BANG prototype without bioPDO was slightly less sour than that of BANG prototype with bioPDO. Bitter aftertaste of BANG prototype without bioPDO slightly more bitter than that of BANG prototype with bioPDO.

After Feel at 30 Seconds

The samples were not differentiated by drying after feel.

TABLE 29

Average sensory scores for all attributes measured

| | Samples | | |
|---|---|---|---|
| | BANG prototype #2A - without bioPDO | BANG prototype #2B - with bioPDO | |
| Attributes | Scores[1] | | p-value |
| Initial harsh mouthfeel | 1.5 | 0.9 | 0.0678* |
| Sweet taste | 6.1 | 5.9 | 0.2719 |
| Sour taste | 6.5 | 6.8 | 0.0644* |
| Bitter taste | 1.7 | 1.5 | 0.2240 |
| Harsh mouthfeel | 1.1 | 0.9 | 0.1467 |
| Astringent mouthfeel | 2.4 | 2.5 | 0.4981 |
| Sweet aftertaste | 5.5 | 5.3 | 0.1764 |
| Sour aftertaste | 2.9 | 3.1 | 0.2599 |
| Bitter aftertaste | 1.3 | 1.1 | 0.1782 |
| Drying after feel | 2.4 | 2.3 | 0.5504 |

[1]Average score of 8 panelists measuring attributes on defined 10 cm line scales (n = 24).
*Significantly different at $p \leq 0.1$ (90% confidence)
**Significantly different at $p \leq 0.05$ (95% confidence)
***Significantly different at $p \leq 0.01$ (99% confidence)

Key Findings

The initial harsh mouthfeel measured after the 1st sip ($p \leq 0.1$) of BANG prototype without bioPDO was significantly greater than that of BANG prototype with bioPDO.

BANG prototype with bioPDO was significantly more sour ($p \leq 0.1$) than that of BANG prototype without bioPDO.

Example 4—Descriptive Analysis of Energy Shot Prototype Drinks (with & without bioPDO)

Two energy shot prototype drinks were assessed (with & without PDO), energy shot prototype without bioPDO- Sample #3A and energy shot prototype with bioPDO—Sample #3B. All samples were served to panelists at ambient temperature 20±2° C.

Sensory Panel

A qualified descriptive panel of 8 panelists, experienced in the sensory analysis of a range of products, was used for this research.

Descriptive Analysis Protocol

The protocol for descriptive analysis was divided into two distinct phases. 1) During the panel orientation phase, panelists tasted the samples and formulated a lexicon of descriptive taste, mouthfeel, aftertaste and after feel attributes to describe them. A final list of 3 taste, 3 mouthfeel, 3 aftertaste and 1 after feel attributes were determined (Table 30). During the sample testing phase, which took place over 2 separate days, the products were evaluated in triplicate (total evaluations n=24).

All samples were coded with randomly selected three-digit codes, and 30 ml was served 'blind' to panelists in clear shot cups. Before each session and to ensure caffeine ingestion levels were not exceeded, all panelists practiced and confirmed that sips of less than 5 ml were taken. Each panelist was provided with low mineral bottled water as a palate cleanser between samples and had a ten-minute break between samples.

Following consumption of the 1st sip, panelists assessed the attribute 'initial harshness mouthfeel'. The remaining attributes (including 'harshness mouthfeel') were then measured by panelists on the 2nd sip. Aftertaste/feel attributes were measured 30 seconds after ingestion of the 2nd sip. The following tasting protocol was used by panelists throughout:

Rinse mouth with water and swallow.

Take 1st sip and immediately evaluate the attribute 'initial harshness mouthfeel'.

Wait 10 seconds from 1st sip and take 2nd sip.

Evaluate attributes ('sweet taste', 'sour taste', 'bitter taste', 'harshness mouthfeel' an 'astringent mouthfeel').

30 seconds after 2nd sip evaluate attributes ('sweet aftertaste', 'sour aftertaste', 'bitter aftertaste', and 'drying after feel').

Rinse with water.

The sensory attributes of the products were scored on unstructured 10 cm line scales labelled at both ends with extremes of each descriptive term. A list of definitions for each of the attributes included in the final vocabulary was also available to each panelist. Assessments were conducted at the certified ISO9001 sensory laboratory at SRL in the University College Cork, Ireland.

Data Analysis

Panel scores from descriptive sensory analysis were subjected to Analysis of Variance (ANOVA) and reported at a significance the level of $p \leq 0.1$, $p \leq 0.05$ & $p \leq 0.01$ (90%, 95% & 99% confidence) respectively to determine which terms were effective at differentiating between the prototypes.

TABLE 30

Descriptive vocabulary and definitions used by the panelists to evaluate the sensory characteristics of the samples

| Attribute | Evaluation time: | Definition: |
|---|---|---|
| Initial harsh mouthfeel | Evaluated immediately following $1^{st}$ sip | An aggressive, penetrating mouthfeel. |
| Sweet taste | Evaluated immediately following $2^{nd}$ sip | The basic sweet taste associated with sugar substitute. |
| Sour taste | | The basic sour taste associated with citric acid. |
| Bitter taste | | The basic bitter taste associated with caffeine. |
| Harsh mouthfeel | | An aggressive, penetrating mouthfeel. |
| Astringent mouthfeel | | The complex of drying, puckering and shrinking sensations in the oral cavity causing contraction of the body tissues. |
| Sweet aftertaste | Evaluated 30 seconds after $2^{nd}$ sip | The basic sweet taste associated with sugar substitute. |
| Sour aftertaste | | The basic sour taste associated with citric acid. |
| Bitter aftertaste | | The basic bitter taste associated with caffeine. |
| Drying after feel | | Perception of dryness left in the mouth. |

Results

Figure 5:
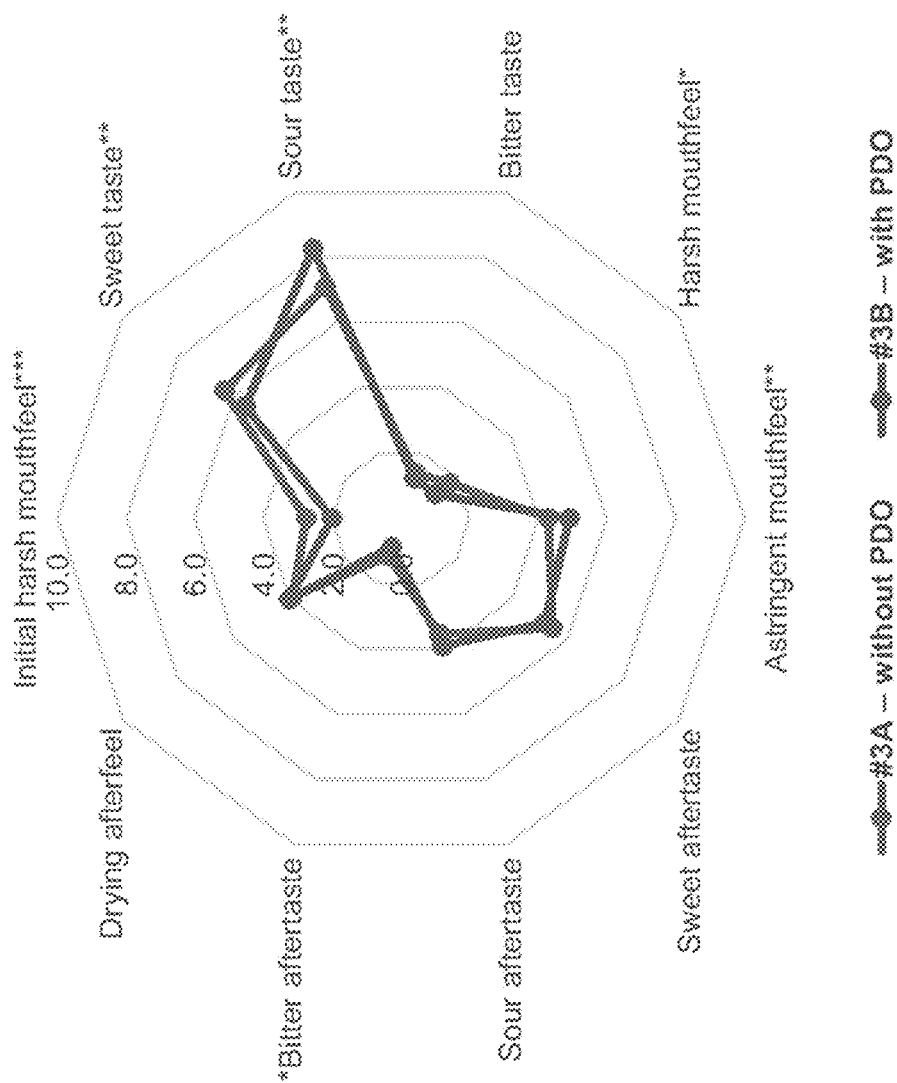
FIG. 5 shows a graphical illustration of the average sensory scores for all attributes measured in Example 4 (n=24). *Significantly different at p≤0.1 (90% confidence). Significantly different at p≤0.05 (95% confidence. *Significantly different at p≤0.01 (99% confidence).
Figure 6:
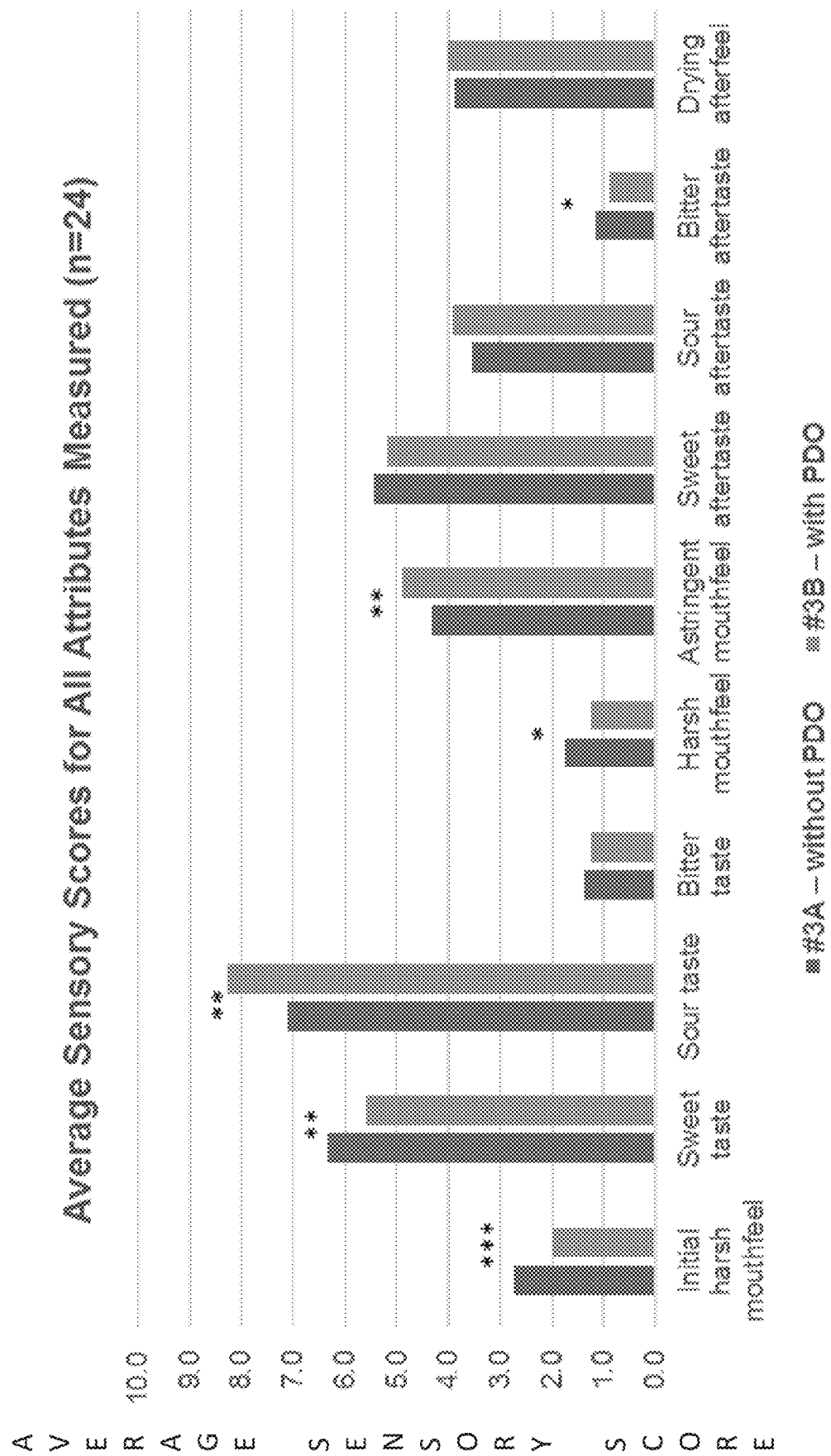
FIG. 6 shows a bar graph illustration of the average sensory scores for all attributes measured in Example 4 (n=24). *Significantly different at p≤0.1 (90% confidence). Significantly different at p≤0.05 (95% confidence. *Significantly different at p≤0.01 (99% confidence). Left bar without bioPDO, right bar with bioPDO.

Table 31 shows the average sensory scores (n=24) for the 10 attributes measured for the two samples. Following on from this table the attributes are graphically illustrated (FIGS. 5 and 6).

Key Points

The panelists differentiated between the samples in terms of 2 of the 10 attributes measured at 90% confidence, 3 of the attributes measured at 95% confidence and 1 of the attributes measured at 99% confidence.

Initial Taste (1' sip):

The samples were differentiated by their harsh mouthfeel. Energy shot prototype without bioPDO had a significantly ($p \leq 0.01$) greater harsh mouthfeel than that of energy shot prototype with bioPDO.

$2^{nd}$ Sip:

The samples were differentiated by sweet taste measured at 95% confidence. Energy shot prototype without bioPDO was significantly ($p \leq 0.05$) sweeter than that of energy shot prototype with bioPDO. The samples were differentiated by sour taste measured at 95% confidence. Energy shot prototype without bioPDO was significantly ($p \leq 0.05$) less sour than that of energy shot prototype with bioPDO. Bitter taste did not significantly differentiate between the samples. Energy shot prototype without bioPDO was slightly more bitter than that of energy shot prototype with bioPDO.

Mouthfeel

The samples were significantly differentiated by their mouthfeel characteristics. Energy shot prototype without bioPDO had a significantly greater ($p \leq 0.01$ and $p \leq 0.1$) harsh mouthfeel than energy shot prototype with bioPDO at 1st and 2nd sip, respectively. Energy shot prototype without bioPDO was significantly (p≤0.05) less astringent than that of energy shot prototype with bioPDO.

Aftertaste at 30 Seconds

The samples were not significantly differentiated by sweet or sour aftertaste. The sweet aftertaste of energy shot prototype without bioPDO was slightly sweeter than that of energy shot prototype with bioPDO. Energy shot prototype without bioPDO was slightly less sour than that of energy shot prototype with bioPDO. Bitter aftertaste of energy shot prototype without bioPDO was significantly (p≤0.1) more bitter than that of energy shot prototype with bioPDO.

After Feel at 30 Seconds

The samples were not differentiated by drying after feel.

TABLE 31

Average sensory scores for all attributes measured

| | Samples | | |
|---|---|---|---|
| Attributes | Energy shot prototype #3A - without bioPDO Scores[1] | Energy shot prototype #3B - with bioPDO | p-value |
| Initial harsh mouthfeel | 2.8 | 2.0 | <0.0001*** |
| Sweet taste | 6.3 | 5.6 | 0.0115** |
| Sour taste | 7.1 | 8.3 | 0.0164** |
| Bitter taste | 1.4 | 1.2 | 0.4816 |
| Harsh mouthfeel | 1.8 | 1.2 | 0.0675* |
| Astringent mouthfeel | 4.3 | 4.9 | 0.0308** |
| Sweet aftertaste | 5.5 | 5.2 | 0.1938 |
| Sour aftertaste | 3.6 | 3.9 | 0.1954 |
| Bitter aftertaste | 1.2 | 0.9 | 0.0983* |
| Drying after feel | 3.9 | 4.0 | 0.4942 |

[1]Average score of 8 panelists measuring attributes on defined 10 cm line scales (n = 24).
*Significantly different at p ≤ 0.1 (90% confidence)
**Significantly different at p ≤ 0.05 (95% confidence)
***Significantly different at p ≤ 0.01 (99% confidence)

Key Findings

The initial harsh mouthfeel measured after the 1st sip (p≤0.01), and the harsh mouthfeel measured after the 2nd sip (p≤0.1) of Energy shot prototype without bioPDO was significantly greater than that of Energy shot prototype with bioPDO.

Energy shot prototype with bioPDO was significantly less sweet (p≤0.05), more sour (p≤0.05), more astringent (p≤0.05) and had a less bitter aftertaste ((p≤0.1) than that of energy shot prototype without bioPDO.

Example 5—Sensorial Comparison of Energy Shot Prototypes at Various Malic Acid and Sucralose Levels with and without bioPDO Examples 2-4 above showed success in the use of bioPDO for removing the off-taste associated with the noted energy drinks. Examples 2-4 also revealed that when the off-taste was removed, a significantly higher sourness intensity and lower sweetness intensity with the presence of bioPDO.

It is well documented that higher sourness can suppress sweetness (Pangborn, J. Food Sci. 26:648-55 (1961); Bonnans et al., Chem. Senses 18:273-83 (1993)). Thus, we analyzed whether reduction of malic acid and/or sucralose in the samples could result in the potential reduction of sourness and/or increase of sweetness in the bioPDO samples while retaining improved mouthfeel (i.e. no off-taste). Additionally, any reduced amounts of malic acid and/or sucralose in the presence of bioPDO will translate into beneficial raw material cost savings, is additional proof of positive marketing, and confirms a non-negative taste modulator.

Materials used in this example are listed in Table 32.

TABLE 32

List of Materials

| Material | Supplier | Description | Comments |
|---|---|---|---|
| Malic Acid | Bartek | DL-malic acid, FCC | Lot # 1/16 Unit # 370 |
| Caffeine | Prinova | Caffeine NAT | Lot # 140722-P-165 |
| Sucralose | Tate & Lyle | Splenda ® Sucralose | Lot # RP16D92110 |
| bioPDO | DuPont Tate & Lyle BioProducts | Zemea ® Select Propanediol (bioPDO) | Lot # LP19D00232 |
| Distilled Water | Walmart | Great Value Distilled Water | Lot # PKD08161719:26 |

Sensory Protocol

Sample mixtures were prepared and moderately stirred until materials were completely dispersed and dissolved at room temperature (RT). Samples were evaluated starting with the controls and then followed by the lowest to highest bioPDO level progression for determination of taste qualities using a controllable, multi-sip-and-swallow taste method described below by an experienced and trained panelist:

Sample Evaluation:

1. Take $1^{st}$ sip from a full 30 mL medicine cup, taste and swallow the $1^{st}$ sample, wait 10 seconds, then take a $2^{nd}$ sip and lock it into memory. Wait for 10 seconds.

2. Proceed with $2^{nd}$ sample. Taste $1^{st}$ sip of the $2^{nd}$ sample, wait for 10 seconds, and then use the $2^{nd}$ sip to compare to the $2^{nd}$ sip (or $3^{rd}$ sip) of the $1^{st}$ sample.

Each paired sample evaluation was repeated in triplicate with at least a 10-minute break and a carbon-treated water rinse.

Results

The theory is to try to establish a reduced amount (concentration) of malic acid to match its sourness intensity of our energy shot prototype w/ bioPDO to the control, energy shot prototype without bioPDO. Secondly, if this adjustment of lowering the malic acid concentration results in increasing sweetness, an additional step will be performed to reduce the amount of sucralose until both sourness and sweetness taste match that of the control w/o bioPDO. Below are the comparative sensorial evaluation results in Tables 33-36 including their specific sample formulations, observations, and results. Keywords of SUL, MA and CAF are sucralose, malic acid, and caffeine, respectively.

TABLE 33

Sensorial results of various malic acid levels in energy shot prototypes with and without bioPDO at room temperature

| Sample Name/Formulation | Sensorial Description |
| --- | --- |
| Shot Prototype w/o bioPDO (Control): 2,000 ppm SUL, 10,500 ppm MA and 3,338 ppm CAF | Very strong sweetness and sourness, strong unpleasant overall tasting quality. |
| Shot Prototype w/bioPDO (Exp #1): 2,000 ppm SUL, 10,500 ppm MA and 3,338 ppm CAF | Significantly more sourness than Control. |
| Prototype w/0.1% bioPDO (Exp #2): 2,000 ppm SUL, 9,400 ppm MA (−10%) and 3,338 ppm CAF | More sourness and slightly sweeter than Control clearly. Initially, perception was similar tastes with Control. |
| Prototype w/0.1% bioPDO (Exp #3): 2,000 ppm SUL, 8,400 ppm MA (−20%) and 3,338 ppm CAF | More similar sourness but maybe slightly more sourness than Control; more sweetness than Control; less sweetness and more sourness than Exp #4. RESULT: most similar overall sourness sample to Control. |
| Prototype w/0.1% bioPDO (Exp #4): 2,000 ppm SUL, 7,350 ppm MA (−30%) and 3,338 ppm CAF | Less sourness and more sweetness than Control but still more sweetness than Exp #3; has less sourness but more sweetness than Exp #3. |

Step 1 clearly revealed that any decreasing malic acid levels would increase sweetness (Higher sourness factor). For Step 2, the sucralose amounts were reduced while maintaining a fixed 20% less malic acid concentration.

and sweetness as the control without PDO. This sample does not have a pleasant taste quality overall. Step 3 is an attempt to furthering lower the malic acid concentration beyond a 20%

TABLE 34

Sensorial results of various sucralose levels in energy shot prototypes with and without bioPDO at room temperature

| Sample Name/Formulation | Sensorial Description |
| --- | --- |
| Shot Prototype w/o bioPDO (Control): 2,000 ppm SUL, 10,500 ppm MA and 3,338 ppm CAF | Very strong sweetness and sourness, strong unpleasant overall tasting quality. |
| Prototype w/0.1% bioPDO (Exp #5): 1,800 ppm SUL (−10%), 8,400 ppm MA (−20%) and 3,338 ppm CAF | More similar sweetness as Control; slightly less sourness than Control; Exp #3 sample has more sweetness and less sourness than Exp #5 when tasted Exp #3 first. When vice versa, less sweetness in Exp #5 than Exp #3. Repeated tests showed more similar overall sweetness and sourness taste quality as the Control. It is still not pleasant tasting quality overall (sourness still went too much over sweetness taste profile). RESULT: Most similar taste quality overall (sourness & sweetness) to Control. |
| Prototype w/0.1% bioPDO (Exp #6): 1,600 ppm SUL (−20%), 8,400 ppm MA (−20%) and 3,338 ppm CAF | Significantly less sweetness than Control; slightly more sourness than Control. |
| Prototype w/0.1% bioPDO (Exp #7): 1,400 ppm SUL (−30%), 8,400 ppm MA (−20%) and 3,338 ppm CAF | Significantly less sweetness; not a good balance of sweetness and sourness; more bland but strong sourness-like quality note. |

The results of Step 2 expressed in Table 3 revealed that the energy shot prototype with PDO containing 10% less sucralose and 20% less malic acid resulted in similar sourness reduction while maintaining at fixed 10% less sucralose level as compared to the Control. The results are expressed in Table 35.

TABLE 35

Sensorial results of various malic acid and sucralose levels in energy shot prototypes with and without bioPDO at room temperature

| Sample Name/Formulation | Sensorial Description |
| --- | --- |
| Shot Prototype w/o bioPDO (Control): 2,000 ppm SUL, 10,500 ppm MA and 3,338 ppm CAF | Very strong sweetness and sourness, strong unpleasant overall tasting quality. |
| Prototype w/0.1% bioPDO (Exp #8): 1,800 ppm SUL (−10%), 7,350 ppm MA (−30%) and | Clean harsh mouthfeel and more pleasant tasting quality with a much better balance of |

TABLE 35-continued

Sensorial results of various malic acid and sucralose levels in energy shot prototypes with and without bioPDO at room temperature

| Sample Name/Formulation | Sensorial Description |
| --- | --- |
| 3,338 ppm CAF | good sweetness and sourness. Significantly better taste quality overall than both Control and Exp #5. RESULT: It is the best rough formulation for energy shot prototype. |

Step 3 expressed in Table 35 revealed that the energy shot prototype with bioPDO at 10% less sucralose and 30% malic acid has yielded the most pleasant taste qualities and better balance of sourness and sweetness. One additional attempt (Step 4) for improved overall taste quality and sourness and sweetness balance by further reducing the sucralose and malic acid concentrations by 25% at same ratio based on Exp. #8 sample (Table 35, −10% SUL and −30% MA).

TABLE 36

Sensorial results of various malic acid and sucralose levels in energy shot prototypes with and without bioPDO at room temperature

| Sample Name/Formulation | Sensorial Description |
| --- | --- |
| Shot Prototype w/o bioPDO (Control): 2,000 ppm SUL, 10,500 ppm MA and 3,338 ppm CAF | Very strong sweetness and sourness, strong unpleasant overall tasting quality. |
| Prototype w/0.1% bioPDO (Exp #9): 1,360 ppm SUL (−32%), 5,520 ppm MA (−47%) and 3,338 ppm CAF | Significantly more but low harsh mouthfeel quality; pleasant sweet and sour tasting quality than Exp #8 and Control. |
| Prototype w/0.2% bioPDO (Exp #10): 1,360 ppm SUL (−32%), 5,520 ppm MA (−47%) and 3,338 ppm CAF | Similar sensorial results as Exp #9. |

Conclusions

A significant 20% reduction in malic acid of the energy shot prototype with 0.1% bioPDO was initially observed as an initial match for sourness intensity to the energy shot prototype without bioPDO, Control. This in our energy shot prototype with bioPDO that resulted in lowering sourness intensity, but its sweetness intensity was also found to be increasing.

Significant reduction of sucralose by 10% in our energy shot prototype with 0.1% bioPDO and 20% less malic acid was found to match the sweetness intensity to that of the energy shot prototype without bioPDO, Control. Unfortunately, its overall tasting quality was still poor and substandard to the control.

Additionally, with 30% and 10% reductions of malic acid and sucralose levels, respectively, was found to yield a much better and more pleasant balance of sourness and sweetness taste quality than the same energy shot prototype with bioPDO, 20% less malic acid and 10% less sucralose.

A 0.2% addition of bioPDO failed to further improve a taste quality of Exp #8 sample with very significant fewer quantities of sucralose and malic acid by 32% and 47%, respectively.

This study clearly demonstrated a better taste quality of energy shot prototype (and 5-Hour Energy) can be achieved by adding 0.1% bioPDO to reduce the caffeine's strong off-taste (harsh mouthfeel) and reduce the sweetener (sucralose) and acidulant (malic acid) concentrations by as much as 20% and 38%, respectively to improve the overall tasting quality and develop a better balance of sourness and sweetness (in the absence of off-taste). The reduction quantities for sucralose and malic were determined based on initial harsh mouthfeel comparisons of Exp #8 and Exp #9 and arriving at a midpoint between these two samples.

Example 6—Descriptive Analysis of 5HE, BANG, and Energy Shot Prototype Drinks (with & without bioPDO)

A formal sensory testing called descriptive analysis (DA) was performed by 8 trained panelists in triplicate (n=24) on energy shot prototype, BANG prototype samples, and 5HE SHOT prototype samples with & without bioPDO. All samples were served to panelists at ambient temperature 20±2° C.

Sensory Panel

A qualified descriptive panel of 8 panelists, experienced in the sensory analysis of a range of products, was used for this research.

Descriptive Analysis Protocol

The protocol for descriptive analysis was divided into two distinct phases. 1) During the panel orientation phase, panelists tasted the samples and formulated a lexicon of descriptive taste, mouthfeel, aftertaste and after feel attributes to describe them. A final list of 3 taste, 3 mouthfeel, 3 aftertaste and 1 after feel attributes were determined (Table 37). During the sample testing phase, which took place over 2 separate days, the products were evaluated in triplicate (total evaluations n=24).

All samples were coded with randomly selected three-digit codes, and 30 ml was served 'blind' to panelists in clear shot cups. Before each session and to ensure caffeine ingestion levels were not exceeded, all panelists practiced and confirmed that sips of less than 5 ml were taken. Each panelist was provided with low mineral bottled water as a palate cleanser between samples and had a ten-minute break between samples.

Following consumption of the $1^{st}$ sip, panelists assessed the attribute 'initial harshness mouthfeel'. The remaining attributes (including 'harshness mouthfeel') were then measured by panelists on the $2^{nd}$ sip. Aftertaste/feel attributes were measured 30 seconds after ingestion of the $2^{nd}$ sip. The following tasting protocol was used by panelists throughout:

Rinse mouth with water and swallow.
Take $1^{st}$ sip and immediately evaluate the attribute 'initial harshness mouthfeel'.
Wait 10 seconds from $1^{st}$ sip and take $2^{nd}$ sip.
Evaluate attributes ('sweet taste', 'sour taste', 'bitter taste', 'harshness mouthfeel' an 'astringent mouthfeel').
30 seconds after $2^{nd}$ sip evaluate attributes ('sweet aftertaste', 'sour aftertaste', 'bitter aftertaste', and 'drying after feel').
Rinse with water.

The sensory attributes of the products were scored on unstructured 10 cm line scales labeled at both ends with extremes of each descriptive term. A list of definitions for each of the attributes included in the final vocabulary was also available to each panelist. Assessments were conducted at the certified ISO9001 sensory laboratory at SRL in the University College Cork, Ireland.

Data Analysis

Panel scores from descriptive sensory analysis were subjected to Analysis of Variance (ANOVA) and reported at a significance the level of $p \leq 0.1$, $p \leq 0.05$ & $p \leq 0.01$ (90%, 95% & 99% confidence) respectively to determine which terms were effective at differentiating between the prototypes.

Results—Energy Shot Prototype #3A/B with and without bioPDO

Figure 7:
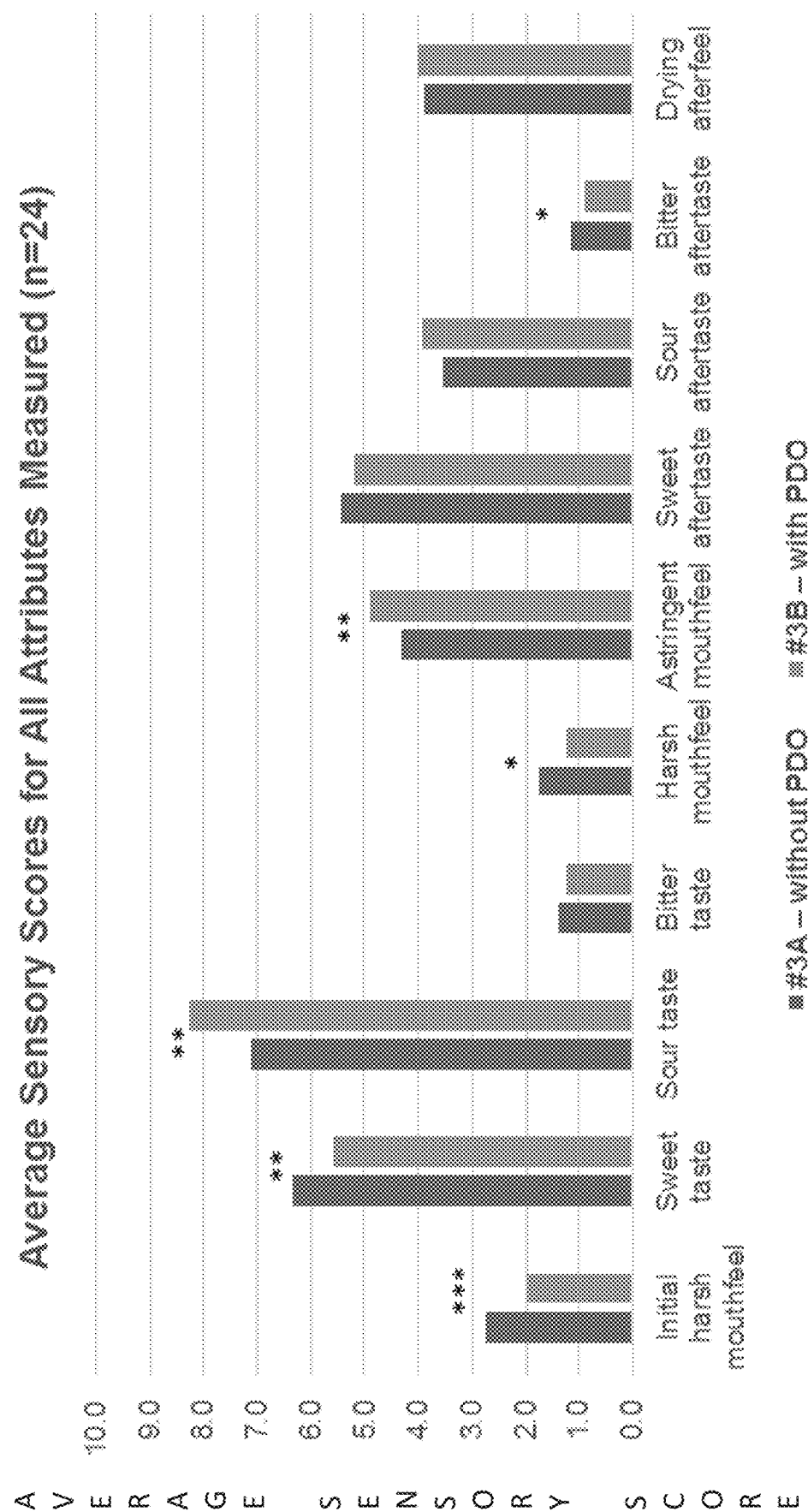
FIG. 7 shows a graphical illustration of energy shot prototype sample attributes in Example 6 (n=24). Significantly different at p≤0.1 (90% confidence); Significantly different at p≤0.05 (95% confidence); *Significantly different at p≤0.01 (99% confidence). Left bar without bioPDO, right bar with bioPDO.

Table 38 shows the average sensory scores (n=24) for the 10 attributes measured for the two samples. Following on from this table the attributes are graphically illustrated (FIG. 7).

Key Points

The panelists differentiated between the samples in terms of 2 of the 10 attributes measured at 90% confidence, 3 of the attributes measured at 95% confidence and 1 of the attributes measured at 99% confidence.

Initial Taste ($1^{st}$ Sip):

The samples were differentiated by their harsh mouthfeel. Energy shot prototype without bioPDO had a significantly ($p \leq 0.01$) greater harsh mouthfeel than that of energy shot prototype with bioPDO.

$2^{nd}$ Sip:

The samples were differentiated by sweet taste measured at 95% confidence. Energy shot prototype without bioPDO was significantly ($p \leq 0.05$) sweeter than that of energy shot prototype with bioPDO. The samples were differentiated by sour taste measured at 95% confidence. Energy shot prototype without bioPDO was significantly ($p \leq 0.05$) less sour than that of energy shot prototype with bioPDO. Bitter taste did not significantly differentiate between the samples. Energy shot prototype without bioPDO was slightly more bitter than that of energy shot prototype with bioPDO.

Mouthfeel

The samples were significantly differentiated by their mouthfeel characteristics. Energy shot prototype without bioPDO had a significantly greater ($p \leq 0.01$ and $p \leq 0.1$) harsh mouthfeel than energy shot prototype with bioPDO at $1^{st}$ and $2^{nd}$ sip, respectively. Energy shot prototype without bioPDO was significantly ($p \leq 0.05$) less astringent than that of energy shot prototype with bioPDO.

Aftertaste at 30 Seconds

The samples were not significantly differentiated by sweet or sour aftertaste. The aftertaste of energy shot prototype

TABLE 37

Descriptive vocabulary and definitions used by the panelists to evaluate the sensory characteristics of the samples

| Attribute | Evaluation time: | Definition: |
|---|---|---|
| Initial harsh mouthfeel | Evaluated immediately following $1^{st}$ sip | An aggressive, penetrating mouthfeel. |
| Sweet taste | Evaluated immediately following $2^{nd}$ sip | The basic sweet taste associated with sugar substitute. |
| Sour taste | | The basic sour taste associated with citric acid. |
| Bitter taste | | The basic bitter taste associated with caffeine. |
| Harsh mouthfeel | | An aggressive, penetrating mouthfeel. |
| Astringent mouthfeel | | The complex of drying, puckering and shrinking sensations in the oral cavity causing contraction of the body tissues. |
| Sweet aftertaste | Evaluated 30 seconds after $2^{nd}$ sip | The basic sweet taste associated with sugar substitute. |
| Sour aftertaste | | The basic sour taste associated with citric acid. |
| Bitter aftertaste | | The basic bitter taste associated with caffeine. |
| Drying after feel | | Perception of dryness left in the mouth. | without bioPDO was slightly sweeter than that of energy shot prototype with bioPDO. Energy shot prototype without bioPDO was slightly less sour than that of energy shot prototype with bioPDO. Bitter aftertaste of energy shot prototype without bioPDO was significantly (p≤0.1) more bitter than that of energy shot prototype with bioPDO.

After Feel at 30 Seconds

The samples were not differentiated by drying after feel.

TABLE 38

Average sensory scores for all attributes measured

| | Samples | | |
|---|---|---|---|
| | Energy shot prototype #3A - without bioPDO | Energy shot prototype #3B - with bioPDO | |
| Attributes | Scores[1] | | p-value |
| Initial harsh mouthfeel | 2.8 | 2.0 | <0.001*** |
| Sweet taste | 6.3 | 5.6 | 0.0115** |
| Sour taste | 7.1 | 8.3 | 0.0164** |
| Bitter taste | 1.4 | 1.2 | 0.4816 |
| Harsh mouthfeel | 1.8 | 1.2 | 0.0675* |
| Astringent mouthfeel | 4.3 | 4.9 | 0.0398*** |
| Sweet aftertaste | 5.5 | 5.2 | 0.1938 |
| Sour aftertaste | 3.6 | 3.9 | 0.1954 |
| Bitter aftertaste | 1.2 | 0.9 | 0.0983* |
| Drying after feel | 3.9 | 4.0 | 0.4942 |

[1]Average score of 8 panelists measuring attributes on defined 10 cm line scales (n = 24).
*Significantly different at p ≤ 0.1 (90% confidence)
**Significantly different at p ≤ 0.05 (95% confidence)
***Significantly different at p ≤ 0.01 (99% confidence)

Results—BANG Prototype #2A/B with and without bioPDO

Figure 8:
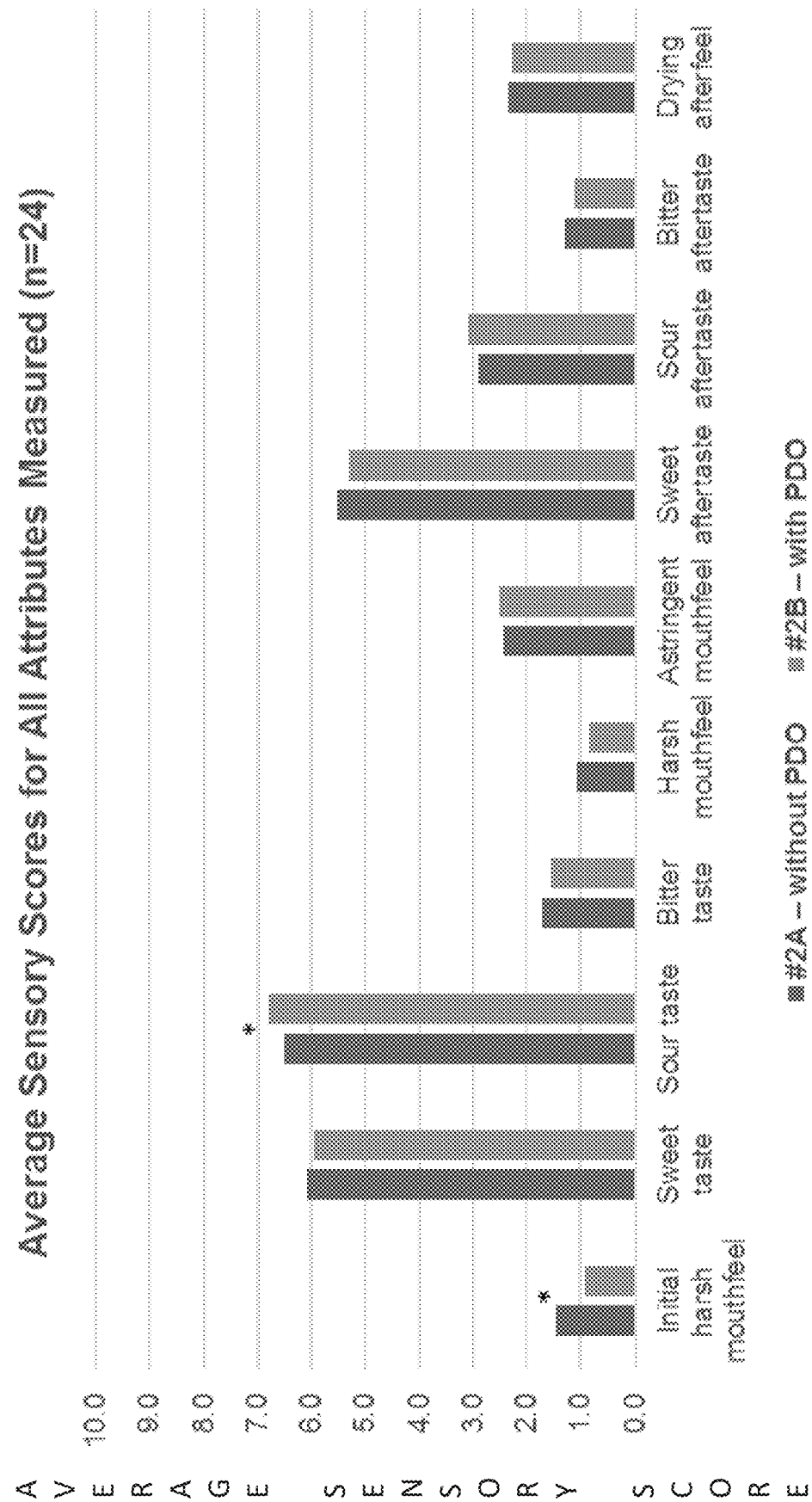
FIG. 8 shows a graphical illustration of BANG prototype sample attributes in Example 6 (n=24). Significantly different at p≤0.1 (90% confidence); Significantly different at p≤0.05 (95% confidence); *Significantly different at p≤0.01 (99% confidence). Left bar without bioPDO, right bar with bioPDO.

Table 39 shows the average sensory scores (n=24) for the 10 attributes measured for the two samples. Following on from this table the attributes are graphically illustrated (FIG. 8).

Key Points

The panelists differentiated between the samples in terms of 2 of the 10 attributes measured at 90% confidence.

Initial Taste (1st Sip):

The samples were differentiated by their harsh mouthfeel. BANG prototype without bioPDO had a significantly (p≤0.1) greater harsh mouthfeel than that of BANG prototype with bioPDO.

2nd Sip:

The samples were differentiated by sour taste measured at 90% confidence. BANG prototype without bioPDO was significantly (p≤0.1) less sour than that of BANG prototype with bioPDO. Neither sweet nor bitter taste significantly differentiated between the samples. BANG prototype without bioPDO was slightly sweeter than that of BANG prototype with bioPDO. BANG prototype without bioPDO was also slightly more bitter than that of BANG prototype with bioPDO.

Mouthfeel

BANG prototype without bioPDO had a significantly greater (p≤0.1) harsh mouthfeel than BANG prototype with bioPDO at 1st sip and a slightly greater harsh mouthfeel than BANG prototype at 2nd sip. The samples were not significantly differentiated by their astringent mouthfeel.

Aftertaste at 30 Seconds

The samples were not significantly differentiated by sweet, sour or bitter aftertaste. The sweet aftertaste of BANG prototype without bioPDO was slightly sweeter than that of BANG prototype with bioPDO. BANG prototype without bioPDO was slightly less sour than that of BANG prototype with bioPDO. Bitter aftertaste of BANG prototype without bioPDO slightly more bitter than that of BANG prototype with bioPDO.

After Feel at 30 Seconds

The samples were not differentiated by drying after feel.

TABLE 39

Average sensory scores for all attributes measured

| | Samples | | |
|---|---|---|---|
| | BANG prototype #2A - without bioPDO | BANG prototype #2B - with bioPDO | |
| Attributes | Scores[1] | | p-value |
| Initial harsh mouthfeel | 1.5 | 0.9 | 0.0678* |
| Sweet taste | 6.1 | 5.9 | 0.2719 |
| Sour taste | 6.5 | 6.8 | 0.0644* |
| Bitter taste | 1.7 | 1.5 | 0.2240 |
| Harsh mouthfeel | 1.1 | 0.9 | 0.1467 |
| Astringent mouthfeel | 2.4 | 2.5 | 0.4981 |
| Sweet aftertaste | 5.5 | 5.3 | 0.1764 |
| Sour aftertaste | 2.9 | 3.1 | 0.2599 |
| Bitter aftertaste | 1.3 | 1.1 | 0.1782 |
| Drying after feel | 2.4 | 2.3 | 0.5504 |

[1]Average score of 8 panelists measuring attributes on defined 10 cm line scales (n = 24).
*Significantly different at p ≤ 0.1 (90% confidence)
**Significantly different at p ≤ 0.05 (95% confidence)
***Significantly different at p ≤ 0.01 (99% confidence)

Results—5HE Prototype #1A/B with and without bioPDO

Figure 9:
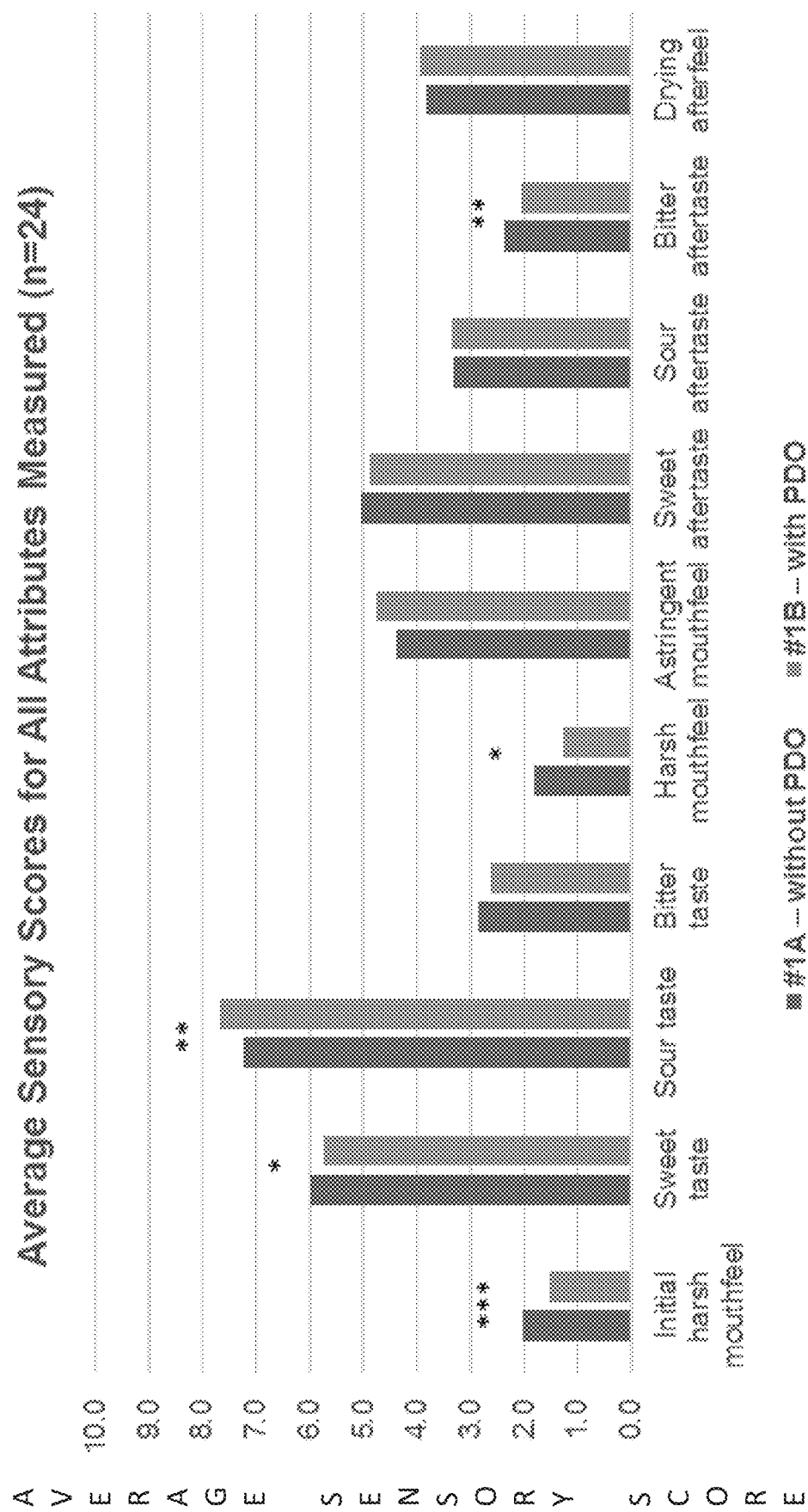
FIG. 9 shows a graphical illustration of 5HE prototype sample attributes in Example 6 (n=24). Significantly different at p≤0.1 (90% confidence); Significantly different at p≤0.05 (95% confidence); *Significantly different at p≤0.01 (99% confidence). Left bar without bioPDO, right bar with bioPDO.

Table 40 shows the average sensory scores (n=24) for the 10 attributes measured for the two samples. Following on from this table the attributes are graphically illustrated (FIG. 9).

Key Points

The panelists differentiated between the samples in terms of 2 of the 10 attributes measured at 90% confidence, 2 of the attributes measured at 95% confidence and 1 of the attributes measured at 99% confidence.

Initial Taste (1st Sip):

The samples were differentiated by their harsh mouthfeel. 5HE SHOT prototype without bioPDO had a significantly (p≤0.01) greater harsh mouthfeel than that of 5HE SHOT prototype with bioPDO.

2nd Sip:

The samples were differentiated by sweet taste measured at 90% confidence. 5HE SHOT prototype without bioPDO was significantly (p≤0.1) sweeter than that of 5HE SHOT prototype with bioPDO. The samples were differentiated by sour taste measured at 95% confidence. 5HE SHOT prototype without bioPDO was significantly (p≤0.05) less sour than that of 5HE SHOT prototype with bioPDO. 5HE SHOT prototype without bioPDO was slightly more bitter than that of 5HE SHOT prototype with bioPDO.

Mouthfeel

5HE SHOT prototype without bioPDO had a significantly greater harsh mouthfeel than 5HE SHOT prototype with bioPDO at 1st sip (p≤0.01) and at 2nd sip (p≤0.1). The samples were not significantly differentiated by their astringent mouthfeel. 5HE SHOT prototype with bioPDO was slightly more astringent than 5HE SHOT prototype without bioPDO.

Aftertaste at 30 Seconds

The samples were not significantly differentiated by sweet or sour aftertaste. The aftertaste of 5HE SHOT prototype without bioPDO was slightly sweeter than that of 5HE SHOT prototype with bioPDO. 5HE SHOT prototype without bioPDO was slightly less sour than that of 5HE SHOT prototype with bioPDO. Bitter aftertaste of 5HE SHOT prototype without bioPDO was significantly ($p \leq 0.05$) more bitter than that of 5HE SHOT prototype with bioPDO.

After Feel at 30 Seconds

The samples were not differentiated by drying after feel.

TABLE 40

Average sensory scores for all attributes measured

| Attributes | 5HE prototype #1A - without bioPDO Scores[1] | 5HE prototype #1B - with bioPDO | p-value |
|---|---|---|---|
| Initial harsh mouthfeel | 2.0 | 1.5 | 0.0020*** |
| Sweet taste | 6.0 | 5.7 | 0.0517* |
| Sour taste | 7.2 | 7.7 | 0.0136** |
| Bitter taste | 2.9 | 2.6 | 0.1023 |
| Harsh mouthfeel | 1.8 | 1.3 | 0.0640* |
| Astringent mouthfeel | 4.4 | 4.7 | 0.1742 |
| Sweet aftertaste | 5.1 | 4.9 | 0.2597 |
| Sour aftertaste | 3.3 | 3.4 | 0.4481 |
| Bitter aftertaste | 2.4 | 2.0 | 0.0286** |
| Drying after feel | 3.8 | 4.0 | 0.2340 |

[1]Average score of 8 panelists measuring attributes on defined 10 cm line scales (n = 24).
*Significantly different at $p \leq 0.1$ (90% confidence)
**Significantly different at $p \leq 0.05$ (95% confidence)
***Significantly different at $p \leq 0.01$ (99% confidence)

Conclusions

Among the 10 taste attributes, the 'harsh mouthfeel' attribute under an off-taste category was newly discovered and identified for the first time. The addition of bioPDO (0.1%) to energy shots/drink significantly improves overall taste quality by identifying and reducing massive off-taste attributes, thus, resulting in a beverage with less $1^{st}$ and $2^{nd}$ sip harsh mouthfeel, reduced and improved sweetness, increased and improved sourness, and a less bitter aftertaste qualities.

Example 7—Comparison of Energy Shot Prototypes with and without Caffeine and bioPDO A list of materials used in this example is listed in Table 41.

TABLE 41

Materials

| Material | Supplier | Description | Comments |
|---|---|---|---|
| Malic Acid | Bartek | DL-malic acid, FCC | Lot # 01/16 Unit # 370 |
| Caffeine | Prinova | Caffeine NAT | Lot # 140722-P-165 |
| Sucralose | Tate & Lyle | Splenda ® Sucralose | Lot # RP16D92110 |
| 1,3-propanediol | DuPont Tate & Lyle Bio Products | Zemea ® Select propanediol (ZS PDO) | Lot # LP19D00232 |
| Distilled Water | Walmart | Great value Distilled Water | Lot # PKD08161719:26 |

Sensory Protocol

Sample mixtures were prepared and moderately stirred until materials were completely dispersed and dissolved at room temperature (RT). Samples were evaluated starting with the controls and then followed by the sample with PDO for determination of taste qualities using a controllable, multi-sip-and-swallow taste method described below:

Sample Evaluation:

1. Take 1st sip from a full 30 mL medicine cup, taste and swallow the 1st sample, wait 10 seconds, then take a 2nd sip and lock it into memory. Wait for 10 seconds.

2. Proceed with 2nd sample. Taste 1st sip of the 2nd sample, wait for 10 seconds, and then use the 2nd sip to compare to the 2nd sip of the 1st sample.

3. Rinse with DW and wait for approximately 15 seconds. Repeat step 2 for each if extra sampling needed, not to exceed four samples at a time.

Each paired sample evaluation was repeated in duplicate with at least a 10-minute break and a carbon-treated water rinse.

The following samples were prepared for this study:

1. Existing Sample #3A (Energy shot prototype) without bioPDO.

2. Existing Sample #3B (Energy shot prototype) with bioPDO.

3. New Sample #4A with similar levels of sucralose and malic acid as Sample #3A, BUT without bioPDO and caffeine as an experimental sample.

4. New Sample #4B with similar levels of sucralose, malic acid and bioPDO as Sample #3B, BUT without caffeine as an experimental sample.

Results

This study was designed so it would be possible to directly identify any other 'off-taste' attribute. The bitterness ratings determined here would be compared to Example 6 results, thus revealing a more accurate assessment of the 'off-taste' taste quality differences. Below are the comparative sensorial evaluation results in Table 42 including their specific sample formulations, observations and results. Keywords of SUL, MA and CAF are sucralose, malic acid and caffeine, respectively.

TABLE 42

Sensorial results of various malic acid levels in Energy Shot prototypes with and without bioPDO at RT

| Sample Name/Formulation | Sensorial Description |
|---|---|
| Energy shot without bioPDO (#3A): 2,000 ppm SUL, 10,500 ppm MA and 3,338 ppm CAF | Very strong sweetness and sourness, strong unpleasant overall tasting quality; When compared the #3A vs #4A, the #3A has a significant and extremely 'hard-to-describe' off-taste note more than #4A, a similar strong sweetness and sourness but not pleasant taste quality, and slight bitterness. |
| Energy shot with bioPDO (#3B): 2,000 ppm SUL, 10,500 ppm MA and 3,338 ppm CAF | Significantly more sourness and less sweetness and 'off-taste' notes than #3A; When compared the #3B vs #4A (and then vs #3A): #3B is kind of halfway between #3A and #4A in terms of off-taste/negative background tasting quality rating, less true bitterness, significantly improved taste quality overall than #3A, and still strong sweetness and sourness across the board. |
| Energy shot without bioPDO (#4A): 2,000 ppm SUL, 10,500 ppm MA and 0 ppm CAF | Very clean and has balance (about 50/50) of strong sweetness and sourness, significant sweet lingering, and no offensive or off-taste taste quality. This confirmed an earlier study of similar observation. |
| Energy shot with bioPDO (#4B): 2,000 ppm SUL, 10,500 ppm MA and 0 ppm CAF | Similar sensorial result as the Sample #4A with slightly less astringency than Sample #4A and a slight sugar-like character despite its strong lingering. This confirmed an earlier assessment that the bioPDO has no significant taste modulation effect on sucralose and malic acid. |

Conclusions

The sample #3A actually contained an extreme 'bitterness-like' taste quality background in front of strong sweetness and sourness. The sample #3A does not actually contain a full, authentic bitterness and, thus, it is rated as low 'true' bitterness. The presence of bioPDO does not positively or negatively modulate the sweet and sour intensities.

As a result of this direct taste comparison study for the first time, there was unexpectedly a very significant and interesting new detailed taste finding, and it confirms the true low bitterness ratings of Example 6.

Example 8—External Consumer Validation Study of Two Energy Shot Prototypes Containing Propylene Glycol and bioPDO Example 1 unexpectedly determined that bioPDO rather than PG effectively modulates the overall positive tasting qualities (sweet, sour and bitter) of commercial energy shots and drinks under their super-concentrated matrix systems, but not individually in distilled water. It was further discovered that various sensory protocols greatly affect the results allowing us to determine the specific taste mechanism and to identify the best protocol for future studies. An optimized concentration range of bioPDO was determined to be from ca. 0.01% to 0.1%, but more preferably at ca. 0.1%. These results revealed a novel taste modulation finding of bioPDO in concentrated matrix system.

A validation study called consumer testing was performed with 62 volunteer consumers with no pre-screening protocol on two energy shot prototypes each with propylene glycol (PG) and bioPDO. The consumer simply tasted two samples and was asked to select the better tasting quality and give a reason why.

Action Standard:
  Prototype taste preferences will be reported at percentage levels.
Product Description:
  Ingredient information:
    bioPDO
    PG
  Beverage Information:
    Energy shot prototype with PG
    Energy shot prototype with bioPDO
Methodology:
Study Design
  Fixed sampling order; first with prototype with PG and then prototype with PDO.
  Each assessor evaluates both products serially. 10 seconds timed breaks between tasting samples.
  Distilled water used before each sample.
  Each respondent will be served sample at room temperature.
Sensory Protocol
  Sensory Panel: Volunteered and un-prescreened consumers, no experience in the sensory analysis of a range of products, were used for this study.
  Consumer Testing Protocol:
  The protocol for consumer testing was simple and straightforward.
  During the sample testing phase, the products were evaluated once per person (total number of evaluations, n=62).
    Both of the two samples were lightly colored (light yellow and light pink) and 30 ml were served 'blind' to consumers in clear shot cups.
    Each consumer was provided with bottled distilled water as a palate cleanser prior to and between samples and had at least a ten-second break between samples.
  The following tasting instruction was used by consumers throughout:
    1. Take a sip of distilled water and wait approximately 5 seconds.
    2. Take 1st sip of Yellow sample from a full 30 mL medicine cup, taste and swallow the sample.
    3. Wait 10 seconds from 1st sip, then take a 2nd sip of the Yellow sample.
    4. Wait for 10 seconds and take a sip of distilled water. Wait for approximately 5 seconds.
    5. Proceed with Pink sample. Taste 1st sip of the sample.

6. Wait approximately 10 seconds, and then use the 2nd sip and compare to the 2nd sip of the Yellow sample.

Respondents: volunteer consumers

Questionnaire Design: Select sample with better taste quality and describe why the taste quality is better.

Statistical Analysis: Qualitative data will be computed with percentages.

A detail of two sample formulations prepared and used in this study is listed in Table 4 3. An addition of one of two color additives at very low concentrations was determined to have no taste effect. This study was used to validate our earlier preliminary positive findings of PDO in energy shot prototypes, Bang prototype drinks, and 5HE SHOT prototype drinks and was carried out by DuPont Tate & Lyle BioProducts (DTL).

TABLE 43

Sample formulation background information

| Ingredients | % WT |
|---|---|
| Distilled Water | 98.047 |
| Sodium Benzoate | 0.026 |
| bioPDO (light Pink) or PG (light Yellow) | 0.138 |
| Disodium EDTA | 0.002 |
| Sucralose | 0.199 |
| Caffeine | 0.337 |
| Taurine | 0.017 |
| Citicoline | 0.017 |
| DL-Malic Acid | 1.027 |
| FD&C Red 50 (bioPDO) or Yellow #6 (PG) | 0.006 |
| Vitamin B6 (Pyridoxine hydrochloride) | 0.003 |
| Vitamin B12 (cyanocobalamin) | $9 \times 10^{-6}$ |
| Berry Flavor | 0.181 |
| TOTAL WT %: | 100.000 |

Results

Table 44 shows the sample selection scores and reasons (n=62) for the better taste quality of one of two samples.

TABLE 44

Energy shot prototypes scores and explanations for better selection and reason.

| Consumer # | Pick PG | Pick PDO | Reasons |
|---|---|---|---|
| 1 | | 1 | More sourness on PDO, which fades away faster. |
| 2 | | 1 | Increased sour/sweet flavors, decreased aftertaste. |
| 3 | | 1 | Better taste quality, less bitterness. |
| 4 | | 1 | Less bitterness and less aftertaste. |
| 5 | | 1 | Less overall aftertaste; more tart/less bitterness. |
| 6 | | 1 | bioPDO tastes like kool-aid - much sweeter - way less bitter. |
| 7 | | 1 | First one tasted exactly like medicine. |
| 8 | | 1 | More sweet, less bitter. |
| 9 | | 1 | More flavor impact and aftertaste. |
| 10 | | 1 | Less bitter. |
| 11 | | 1 | Less inferior taste. |
| 12 | | 1 | Prefers sweet, less bitter. |
| 13 | | 1 | Prefer sweet & sour, not all sweet. |
| 14 | | 1 | Bitter taste. |
| 15 | | 1 | I like how they berry notes display. |
| 16 | | 1 | The feeling in my mouth was smoother and cleaner than the yellow product. |
| 17 | | 1 | More rounded, less acidic. |
| 18 | | 1 | Less carryover of lingering off-notes. |
| 19 | | 1 | Bring sweetness then bitterness. Off-note. |
| 20 | | 1 | Less bitter, better taste. |
| 21 | | 1 | Less "chemical" aftertaste. |
| 22 | | 1 | Less bitterness. |
| 23 | | 1 | Less bitterness. |
| 24 | | 1 | PG sour. |
| 25 | | 1 | PG bitter. |
| 26 | | 1 | Less tart. |
| 27 | | 1 | Improved taste. |
| 28 | | 1 | Improved taste. |
| 29 | | 1 | Smoother, more pleasant; yellow-harsh, but bold. |
| 30 | | 1 | (Unreadable note) |
| 31 | | 1 | Less bitter aftertaste. |
| 32 | | 1 | Less bitter on multiple sips. |
| 33 | | 1 | Nice berry taste. |
| 34 | | 1 | Clean, reacts a lot faster in (unreadable). |
| 35 | | 1 | Less lingering! "savory" |
| 36 | | 1 | Cleaner. |
| 37 | | 1 | Smoother sour flavor. |
| 38 | | 1 | Less bitterness, more tart and better taste. |
| 39 | 1 | | Prefer bitterness and taste. |
| 40 | 1 | | Pink has more citrus and sour. |
| 41 | 1 | | More into the freshness and acidic aftertaste. |
| 42 | 1 | | (Unreadable note), $2^{nd}$ too strong and sweet. |
| 43 | 1 | | Better aftertaste. |
| 44 | 1 | | Smoother finish, less tart. |
| 45 | 1 | | Pink has acid and tart. |
| 46 | 1 | | Initially I tried yellow and it was bitter but after trying red, yellow was better. |
| 47 | 1 | | Sweeter $2^{nd}$ time around. |
| 48 | 1 | | Better flavor. |
| 49 | | 1 | More smooth. |
| 50 | | 1 | Not bitter. |
| 51 | | 1 | Pink was little better. |
| 52 | | 1 | Less harsh aftertaste. |
| 53 | | 1 | Sweeter/less bitter. |
| 54 | | 1 | (Blank) |
| 55 | | 1 | Less bitter! |
| 56 | | 1 | Less bitterness. |
| 57 | | 1 | Less bitter, sweeter. |
| 58 | | 1 | Less syrupy, smoother, more balanced, more pleasant taste. |
| 59 | | 1 | Less bitter, not as strong taste, smoother. |
| 60 | 1 | | Yellow taste was better than pink. |
| 61 | 1 | | Not that direct sour and more sweet. |
| 62 | 1 | | Pink has less sweet. |
| Total: | 13 | 49 | Total 62 |
| %: | 21.0 | 79.0 | 1.0:3.8 ratio |

Key Points

The consumers selected prototype with bioPDO in terms of better taste quality computed at 79% majority versus the prototype with PG at 21%. Reasons for their bioPDO sample selection was commonly mentioned as less bitterness and more sourness and smoothness.

CONCLUSION

The validation testing of energy shot prototypes was carried out using a 'Which is better and why?' wording and determined by 62 volunteered consumers during their taste evaluation. Among 79% of 62 consumers preferred the sample with bioPDO moreover the sample with PG (21%) at a ratio of approximately 4 to 1 and identified it as less bitterness (off-taste) and more sourness and smoothness. As a result of that, it confirmed and validated our earlier, preliminary positive study findings with bioPDO.

The invention claimed is:

1. A method of improving taste and/or off-taste of an energy drink comprising:
   A. providing an energy drink comprising
      About 5,000 ppm to about 15,000 ppm of one or more sour additive(s);
      about 250 ppm to about 4,000 ppm caffeine, caffeine-containing ingredient, or a combination thereof; and
      about 600 ppm to about 3,000 ppm sucralose, sucrose, glucose, sugar, acesulfame potassium, aspartame, erythritol, high fructose corn syrup, or a combination thereof; and
   B. adding an amount of 1,3-propanediol from about 100 ppm to about 1,100 ppm to the energy drink to form a tasteful energy drink, whereby said tasteful energy drink has improved taste and/or off-taste as compared to an energy drink that does not include said amount of 1,3-propanediol, wherein the improved taste or off-taste is a reduction in soapy taste, chemical taste, medical taste, bitter taste, strong sour taste, strong salt taste, strong mouthfeel, harsh mouthfeel, strong sweet taste, sticky taste, coating taste, astringent taste, dry taste, dry after feel, strong savory taste, strong fat taste, metallic, and/or cooling sensation or numb feeling of the tongue or oral cavity that subsides under significant water or food exposure.

2. The method of claim 1, wherein the one or more sour additive(s) comprises malic acid, citric acid, or a combination thereof.

\* \* \* \* \*